US009727824B2

(12) United States Patent
Rose et al.

(10) Patent No.: US 9,727,824 B2
(45) Date of Patent: Aug. 8, 2017

(54) SYSTEMS AND METHODS FOR QUANTUM PROCESSING OF DATA

(71) Applicant: D-Wave Systems Inc., Burnaby (CA)

(72) Inventors: Geordie Rose, Vancouver (CA); Suzanne Gildert, Vancouver (CA); William G. Macready, West Vancouver (CA); Dominic Christoph Walliman, Vancouver (CA)

(73) Assignee: D-Wave Systems Inc., Burnaby, CA (US)

( * ) Notice: Subject to any disclaimer, the term of this patent is extended or adjusted under 35 U.S.C. 154(b) by 527 days.

(21) Appl. No.: 14/316,372

(22) Filed: Jun. 26, 2014

(65) Prior Publication Data
US 2015/0006443 A1    Jan. 1, 2015

Related U.S. Application Data

(60) Provisional application No. 61/841,129, filed on Jun. 28, 2013, provisional application No. 61/873,303, filed on Sep. 3, 2013.

(51) Int. Cl.
| | |
|---|---|
| *G06N 99/00* | (2010.01) |
| *G06K 9/62* | (2006.01) |
| *G06K 9/00* | (2006.01) |

(52) U.S. Cl.
CPC ....... *G06N 99/005* (2013.01); *G06K 9/00986* (2013.01); *G06K 9/6247* (2013.01);
(Continued)

(58) Field of Classification Search
None
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |

(Continued)

FOREIGN PATENT DOCUMENTS

| | | |
|---|---|---|
| KR | 2013010181 A | 1/2013 |
| WO | 2009/120638 A2 | 10/2009 |
| WO | 2010071997 A1 | 1/2010 |

OTHER PUBLICATIONS

Amin, "Effect of Local Minima on Adiabatic Quantum Optimization," *Physical Review Letters 100*, 130503, 2008, 4 pages.
(Continued)

*Primary Examiner* — Paulinho E Smith
*Assistant Examiner* — Benjamin Buss
(74) *Attorney, Agent, or Firm* — Seed IP Law Group LLP

(57) ABSTRACT

Systems, methods and aspects, and embodiments thereof relate to unsupervised or semi-supervised features learning using a quantum processor. To achieve unsupervised or semi-supervised features learning, the quantum processor is programmed to achieve Hierarchal Deep Learning (referred to as HDL) over one or more data sets. Systems and methods search for, parse, and detect maximally repeating patterns in one or more data sets or across data or data sets. Embodiments and aspects regard using sparse coding to detect maximally repeating patterns in or across data. Examples of sparse coding include L0 and L1 sparse coding. Some implementations may involve appending, incorporating or attaching labels to dictionary elements, or constituent elements of one or more dictionaries. There may be a logical association between label and the element labeled such that the process of unsupervised or semi-supervised feature learning spans both the elements and the incorporated, attached or appended label.

36 Claims, 33 Drawing Sheets

(52) U.S. Cl.
CPC ......... *G06K 9/6249* (2013.01); *G06K 9/6255* (2013.01); *G06N 99/002* (2013.01)

(56) References Cited

U.S. PATENT DOCUMENTS

| | | | |
|---|---|---|---|
| 7,533,068 B2 | 5/2009 | Maassen van den Brink et al. | |
| 7,876,248 B2 | 1/2011 | Berkley et al. | |
| 8,008,942 B2 | 8/2011 | van den Brink et al. | |
| 8,035,540 B2 | 10/2011 | Berkley et al. | |
| 2006/0047477 A1* | 3/2006 | Bachrach | F42B 35/00 702/182 |
| 2007/0162406 A1* | 7/2007 | Lanckriet | G06N 99/005 706/20 |
| 2008/0069438 A1 | 3/2008 | Winn et al. | |
| 2008/0176750 A1 | 7/2008 | Rose et al. | |
| 2008/0215850 A1 | 9/2008 | Berkley et al. | |
| 2008/0313430 A1* | 12/2008 | Bunyk | G06N 99/002 712/34 |
| 2009/0077001 A1* | 3/2009 | Macready | G06N 5/02 706/57 |
| 2009/0121215 A1 | 5/2009 | Choi | |
| 2009/0278981 A1* | 11/2009 | Bruna | G06T 3/4007 348/448 |
| 2011/0022820 A1 | 1/2011 | Bunyk et al. | |
| 2011/0047201 A1* | 2/2011 | Macready | G06N 99/002 708/446 |
| 2011/0142335 A1* | 6/2011 | Ghanem | G06K 9/6215 382/165 |
| 2011/0231462 A1* | 9/2011 | Macready | G06N 99/002 708/231 |
| 2011/0238378 A1* | 9/2011 | Allen | G06N 99/002 702/186 |
| 2011/0295845 A1* | 12/2011 | Gao | G06F 17/30864 707/723 |
| 2012/0084235 A1 | 4/2012 | Suzuki et al. | |
| 2012/0149581 A1* | 6/2012 | Fang | A61K 41/0004 505/310 |
| 2012/0215821 A1* | 8/2012 | Macready | G06N 99/002 708/1 |
| 2013/0097103 A1 | 4/2013 | Chari et al. | |
| 2014/0025606 A1* | 1/2014 | Macready | G06N 99/002 706/12 |
| 2014/0152849 A1* | 6/2014 | Bala | G06K 9/036 348/207.1 |
| 2015/0242463 A1* | 8/2015 | Lin | G06K 9/6276 707/769 |
| 2015/0248586 A1* | 9/2015 | Gaidon | G06K 9/00711 382/103 |
| 2016/0307305 A1* | 10/2016 | Madabhushi | G06K 9/0014 |

OTHER PUBLICATIONS

Bell et al., "The "Independent Components" of Natural Scenes are Edge Filters," *Vision Res. 37*(23):3327-3338, 1997.

Lee et al., "Efficient sparse coding algorithms," *NIPS*, pp. 801-808, 2007.

Lovász et al., "Orthogonal Representations and Connectivity of Graphs," *Linear Algebra and its Applications 114/115*:439-454, 1989.

Lovász et al., "A correction: orthogonal representations and connectivity of graphs," *Linear Algebra and its Applications 313*:101-105, 2000.

International Search Report and Written Opinion, mailed Oct. 13, 2014, for PCT/US2014/044421, 13 pages.

* cited by examiner

DICTIONARY ATOMS
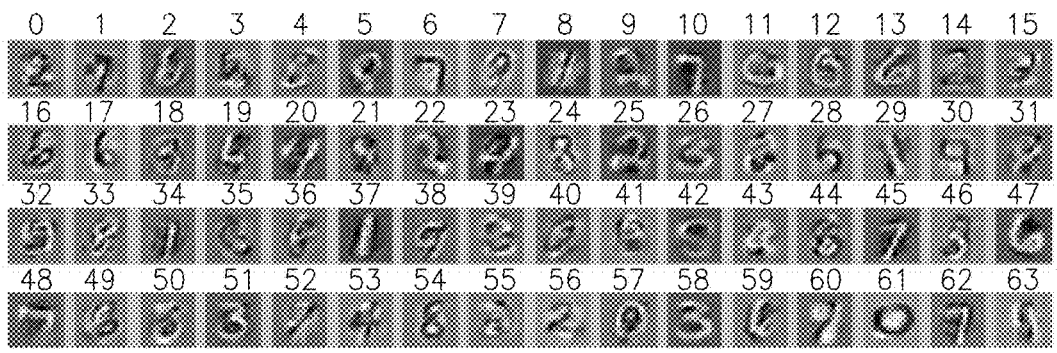
RECONSTRUCTIONS
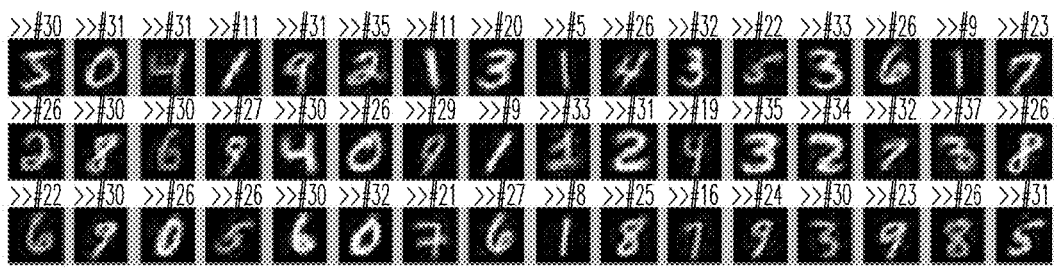
GROUND TRUTHS
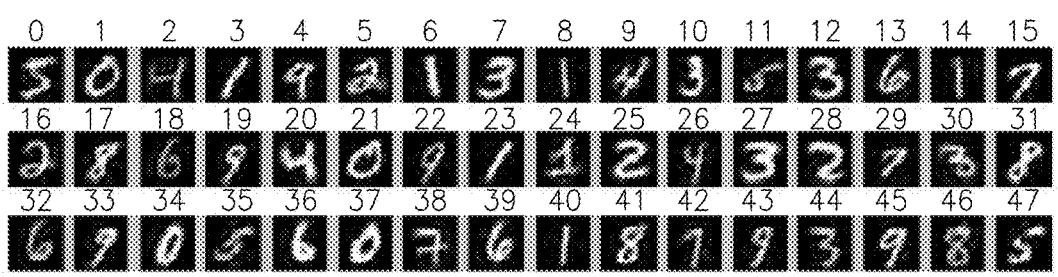
FIG.14

FIG. 22

```
--- Standard User Parameters ------------ ##

'K': 512,
'lambda_value': 0.05,
'unlabeled_solver_flag': 10,
'use_cloud': False,
'dataset': 'mnist',
'biolabels': True,

--- Advanced User Parameters ------------ ##

'local_verbose': False,
'blackbox_num_reads': 1000,
'cplex_to_global_optimality': True,
'unlabeled_solver_timeout': 30,
'time_by_iterations_for_tabu': True,
'tabu_random_tie_breaking': False,
'tabu_iterations_in_roll': 1000,
'tabu_iterations_after_roll': 10000,
'search_depth': 1,
'number_of_rolls': 1,
'exit_threshold': 0.1, 'environment': 'my_butterfly_environment',
'map_jobs_bundle_size': 3000,
'number_of_training_images_to_grab': 59999,
'number_of_svd_modes_to_keep': 50, 'run_name': '020613_my_test',
```

PiCloud
cloud computing simplified

Welcome, Butterfly   Settings   Logout

- Get Started
- Notebook
- Jobs
- Realtime Cores
- Environments
- Bucket
- Crons
- Publish
- Abalytics

Displaying jobs select all   clear   actions:   | kill |   | delete |   | kill all |   | delete all |?   view | 30 ▼ |   with maps | collapsed ▼ | page | 1 |   ◁ ↻ ▷

| | id | parent | key | hostname | function | label | created | status |
|---|---|---|---|---|---|---|---|---|
| ☐ | map[718734,718735] | | 4961 | sgildert-c30 | butterfly_optimization.omega_U_calculator_L1_map at /usr/local/picloud/ap/560d10865bd6e15af0aecd010e1d05b0a05683770a/butterfly_optimization.py:185 | | 2013-03-15 12:18:37 | 0/2 |
| ☐ | map[718733,718733] | 718732 | 4961 | sgildert-c30 | butterfly_initial_dictionary_values.RollOnCloudClass.r all_for_cloud at /usr/local/picloud/ap/560d10865bd6e15af0aecd010e1d05b0a05683770a/butterfly_initial_dictionary_values.py:26 | | 2013-03-15 12:18:06 | 0/1 |
| ☐ | 718732 | | 4961 | sgildert-c30 | butterfly_offline_learning_root.start_offline_learning at C:\Users\\code\Butterfly_MONARCH\butterfly_offline_learning_root.py:14 | | 2013-03-15 12:18:05 | ✻ |

Select a job by ID
Job ID: [     ] | Go |

Filters:
Max Job ID: [     ]

Between Dates:
From: [     ]
To: [     ]

Api Key:
Active
☐ 4571
☐ 4572
☐ 4600

SYSTEMS AND METHODS FOR QUANTUM PROCESSING OF DATA

BACKGROUND

Field

The present disclosure generally relates to analyzing data, for example unsupervised or semi-supervised features learning using a quantum processor.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further detail and embodiments of exemplary quantum processors that may be used in conjunction with the present methods are described in U.S. Pat. Nos. 7,533,068, 8,008,942, US Patent Publication 2008-0176750, US Patent Publication 2009-0121215, and PCT Patent Publication 2009-120638 (now US Patent Publication 2011-0022820).

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the s coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present methods, an "adiabatic" evolution is considered to be an evolution that satisfies the adiabatic condition:

$$\dot{s} |\langle 1 | dH_e/ds | 0 \rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian and therefore quantum annealing may be used to find the solution to such a hard problem. Adiabatic quantum computation is a special case of quantum annealing for which the system, ideally, begins and remains in its ground state throughout an adiabatic evolution. Thus, those of skill in the art will appreciate that quantum annealing methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems are known in the art and applications arise in many different fields, for example machine learning, pattern matching, economics and finance, and statistical mechanics, to name a few.

BRIEF SUMMARY

A method of using a quantum processor to identify maximally repeating patterns in data via Hierarchical Deep Learning (HDL) may be summarized as including receiving a data set of data elements at a non-quantum processor; formulating an objective function based on the data set via the non-quantum processor, wherein the objective function includes a loss term to minimize difference between a first representation of the data set and a second representation of the data set, and includes a regularization term to minimize any complications in the objective function; casting a first set of weights in the objective function as variables using the non-quantum processor; setting a first set of values for a dictionary of the objective function using the non-quantum processor, wherein the first set of values for the dictionary includes a matrix of real values having a number of columns each defining a vector that corresponds to a qubit in the quantum processor, wherein any of the vectors that correspond to unconnected qubits in the quantum processor are orthogonal to each other; and interacting with the quantum processor, via the non-quantum processor, to minimize the objective function. Formulating an objective function may include formulating the objective function where the regularization term is governed by an L0-norm form. Formulating an objective function may include formulating the objective function where the regularization term is governed by an L1-norm form. The regularization term may include a regularization parameter, and formulating an objective function may include selecting a value for the regularization parameter to control a sparsity of the objective function. Receiving a data set of data elements at a non-quantum processor may include receiving image data and audio data.

Interacting with the quantum processor, via the non-quantum processor, to minimize the objective function may further include optimizing the objective function for the first set of values for the weights in the objective function based on the first set of values for the dictionary. Optimizing the objective function for a first set of values for the weights may include mapping the objective function to a first quadratic unconstrained binary optimization ("QUBO") problem and using the quantum processor to at least approximately minimize the first QUBO problem, wherein using the quantum processor to at least approximately minimize the first QUBO problem includes using the quantum processor to perform at least one of adiabatic quantum computation or quantum annealing.

Interacting with the quantum processor, via the non-quantum processor, to minimize the objective function may further include optimizing the objective function for a second set of values for the weights based on a second set of values for the dictionary, wherein optimizing the objective function for a second set of values for the weights includes mapping the objective function to a second QUBO problem and using the quantum processor to at least approximately minimize the second QUBO problem.

Interacting with the quantum processor, via the non-quantum processor, to minimize the objective function may further include optimizing the objective function for a second set of values for the dictionary based on the first set of values for the weights, wherein optimizing the objective function for a second set of values for the dictionary includes using the non-quantum processor to update at least some of the values for the dictionary.

Interacting with the quantum processor, via the non-quantum processor, to minimize the objective function may further include optimizing the objective function for a third set of values for the dictionary based on the second set of values for the weights, wherein optimizing the objective function for a third set of values for the dictionary includes using the non-quantum processor to update at least some of the values for the dictionary.

The method may further include optimizing the objective function for a $t^{th}$ set of values for the weights, where t is an integer greater than 2, based on the third set of values for the dictionary, wherein optimizing the objective function for a $t^{th}$ set of values for the weights includes mapping the objective function to a $t^{th}$ QUBO problem and using the quantum processor to at least approximately minimize the $t^{th}$ QUBO problem; and optimizing the objective function for a $(t+1)^{th}$ set of values for the dictionary based on the $t^{th}$ set of values for the weights, wherein optimizing the objective function for a $(t+1)^{th}$ set of values for the dictionary includes using the non-quantum processor to update at least some of the values for the dictionary.

The method may further include optimizing the objective function for a $(t+1)^{th}$ set of values for the weights based on the $(t+1)^{th}$ set of values for the dictionary, wherein optimizing the objective function for a $(t+1)^{th}$ set of values for the weights includes mapping the objective function to a $(t+1)^{th}$ QUBO problem and using the quantum processor to at least approximately minimize the $(t+1)^{th}$ QUBO problem. Optimizing the objective function for a $(t+1)^{th}$ set of values for the dictionary based on the $t^{th}$ set of values for the weights and optimizing the objective function for a $(t+1)^{th}$ set of values for the weights based on the $(t+1)^{th}$ set of values for the dictionary may be repeated for incremental values of t until at least one solution criterion is met. The at least one solution criterion may include either convergence of the set of values for the weights or convergence of the set of values for the dictionary Minimizing the objective function may include generating features in a learning problem. Generating features in a learning problem may include generating features in at least one of: pattern recognition problem, training an artificial neural network problem, and software verification and validation problem. Generating features in a learning problem may include generating features in at least one of a machine learning problem or an application of artificial intelligence. Minimizing the objective function may include solving a sparse least squares problem.

Setting a first set of values for the dictionary of the objective may further include generating a matrix of real values wherein each entry of the matrix is a random number between positive one and negative one; renormalizing each column of the matrix such that a norm for each column is equal to one; and for each column of the matrix, computing the null space of the column; and replacing the column with a column of random entries in the null space basis of the column. Casting a first set of weights in the objective function as variables using the non-quantum processor may include casting a first set of weights as Boolean variables using the non-quantum processor.

The method may further include incorporating at least one label comprised of at least one label element into the data set, wherein the at least one label is representative of label information which logically identifies a subject represented in the data set at an at least an abstract level or category to which the subject represented in the set of data belongs. Incorporating at least one label may include incorporating at least one label representative of label information which logically identifies the subject represented in the data set as at least one of an alphanumeric character, belonging to a defined set of humans, a make and/or model of a vehicle, a defined set of objects, a defined foreign or suspect object, or a type of anatomical feature. Incorporating at least one label may include incorporating at least one label representative of label information, and the label information may be the same type as the corresponding data element. Receiving a data set of data elements at a non-quantum processor may include receiving a data set expressed as image data, and the incorporated at least one label element may include image data. Incorporating at least one label comprised of at least one label element into the data set may include incorporating at least one label comprised of at least one label element, the at least one label element comprises image data, and a spatial position of the label element at least may partially encode the label information. Formulating an objective function may include formulating an objective function based on both the data set and the incorporated at least one label. Receiving a data set of data elements at a non-quantum processor may include receiving a data set expressed as different types or formats of data. The objective function may be in the form:

$$G(\hat{W}, \hat{D}; \lambda) = \sum_{s=1}^{S} \left\| \vec{z}_s - \sum_{k=1}^{K} w_{ks} \vec{d}_k \right\|^2 + \lambda \sum_{s=1}^{S} \sum_{k=1}^{K} w_{ks}.$$

A system to identify maximally repeating patterns in data via Hierarchical Deep Learning (HDL) may be summarized as including a quantum processor; a non-quantum processor communicatively coupled with the quantum processor; and a processor-readable storage medium that includes processor-executable instructions to: receive a data set of data elements at a non-quantum processor; formulate an objective function based on the data set via the non-quantum processor, wherein the objective function includes a loss term to minimize a difference between a first representation of the data set and a second representation of the data set, and includes a regularization term to minimize any complications in the objective function; cast a first set of weights in the objective function as variables using the non-quantum processor; set a first set of values for a dictionary of the objective function using the non-quantum processor, wherein the first set of values for the dictionary includes a matrix of real values having a number of columns each defining a vector that corresponds to a qubit in the quantum processor, wherein any of the vectors that correspond to unconnected qubits in the quantum processor are orthogonal to each other; and interact with the quantum processor, via the non-quantum processor, to minimize the objective function.

A method to identify maximally repeating patterns in data via Hierarchical Deep Learning (HDL) may be summarized as including receiving a labeled data set of labeled data elements at a non-quantum processor, each labeled data element which incorporates at least one label comprised of at least one label element; formulating an objective function based on the labeled data set via the non-quantum processor; and interacting with a quantum processor, via the non-quantum processor, to minimize the objective function by: casting a set of weights in the objective function as Boolean variables using the non-quantum processor; setting a first set of values for a dictionary using the non-quantum processor; and optimizing the objective function for a first set of values for the Boolean weights based on the first set of values for the dictionary. Optimizing the objective function for a first set of values for the Boolean weights may include mapping the objective function to a first quadratic unconstrained binary optimization ("QUBO") problem and using a quantum processor to at least approximately minimize the first QUBO problem, wherein using the quantum processor to at least approximately minimize the first QUBO problem includes using the quantum processor to perform at least one of adiabatic quantum computation or quantum annealing.

The method may further include optimizing the objective function for a second set of values for the dictionary based on the first set of values for the Boolean weights, wherein optimizing the objective function for a second set of values for the dictionary includes using the non-quantum processor to update at least some of the values for the dictionary.

The method may further include optimizing the objective function for a second set of values for the Boolean weights based on the second set of values for the dictionary, wherein optimizing the objective function for a second set of values for the Boolean weights includes mapping the objective function to a second QUBO problem and using the quantum processor to at least approximately minimize the second QUBO problem.

The method may further include optimizing the objective function for a third set of values for the dictionary based on the second set of values for the Boolean weights, wherein optimizing the objective function for a third set of values for the dictionary includes using the non-quantum processor to update at least some of the values for the dictionary.

A processor-readable storage medium may include processor executable instructions to: receive a data set of data elements at a non-quantum processor; formulate an objective function based on the data set via the non-quantum processor, wherein the objective function includes a loss term to minimize difference between a first representation of the data set and a second representation of the data set, and a regularization term to minimize any complications in the objective function; cast a first set of weights in the objective function as variables using the non-quantum processor; set a first set of values for a dictionary of the objective function using the non-quantum processor, wherein the first set of values for the dictionary includes a matrix of real values having a number of columns each defining a vector that corresponds to a qubit in the quantum processor, wherein any of the vectors that correspond to unconnected qubits in the quantum processor are orthogonal to each other; and interact with the quantum processor, via the non-quantum processor, to minimize the objective function.

A method of automatically labeling data may be summarized as including receiving unlabeled data in at least one processor-readable storage medium; learning, via at least one processor, a dictionary of dictionary atoms using sparse coding on the received unlabeled data; receiving labeled data elements in the at least one processor-readable storage medium, each labeled data element incorporates at least one respective label comprised of at least one respective label element; reconstructing, via at least one processor, the labeled data using the dictionary to generate encoded labeled data elements; executing, via at least one processor, a supervised learning process using the encoded labeled data elements to produce at least one of a classifier or a label assigner; and storing the produced at least one classifier or label assigner in the at least one processor-readable storage medium. Executing, via at least one processor, a supervised learning process may include performing at least one of a perceptron algorithm, a k nearest neighbors (kNN) algorithm, or a linear support vector machine (SVM) with L1 and L2 loss algorithm. Receiving labeled data elements in the at least one processor-readable storage medium may include receiving labeled image data elements, each labeled image data element incorporates at least one respective label comprised of at least one respective image label element. Receiving labeled data elements in the at least one processor-readable storage medium may include receiving labeled data elements each of a specific type or format of data, and each labeled data element may be of the same specific type or format of data as the received respective label element.

A method of using a quantum processor to identify maximally repeating patterns in data via Hierarchical Deep Learning (HDL) may be summarized as including receiving a data set of data elements at a non-quantum processor; formulating an objective function based on the preprocessed data set via the non-quantum processor, wherein the objective function includes a loss term to minimize difference between a first representation of the preprocessed data set and a second representation of the preprocessed data set, and includes a regularization term to minimize any complications in the objective function; casting a first set of weights in the objective function as variables using the non-quantum processor; setting a first set of values for a dictionary of the objective function using the non-quantum processor, wherein the first set of values for the dictionary is constrained such that the objective function matches a connectivity structure of the quantum processor; and interacting with the quantum processor, via the non-quantum processor, to minimize the objective function. Formulating an objective function may include formulating the objective function where the regularization term is governed by an L0-norm form. Formulating an objective function may include formulating the objective function where the regularization term is governed by an L1-norm form. The regularization term may include a regularization parameter, and formulating an objective function may include selecting a value for the regularization parameter to control a sparsity of the objective function. Receiving a data set of data elements at a non-quantum processor may include receiving image data and audio data. Interacting with the quantum processor, via the non-quantum processor, to minimize the objective function may include optimizing the objective function for the first set of values for the weights in the objective function based on the first set of values for the dictionary. Optimizing the objective function for a first set of values for the weights may include mapping the objective function to a first quadratic unconstrained binary optimization ("QUBO") problem and using the quantum processor to at least approximately minimize the first QUBO problem, wherein using the quantum processor to at least approximately minimize the first QUBO problem includes using the quantum processor to perform at least one of adiabatic quantum computation or quantum annealing.

Interacting with the quantum processor, via the non-quantum processor, to minimize the objective function may further include optimizing the objective function for a second set of values for the weights based on a second set of values for the dictionary, wherein optimizing the objective function for a second set of values for the weights includes mapping the objective function to a second QUBO problem and using the quantum processor to at least approximately minimize the second QUBO problem.

Interacting with the quantum processor, via the non-quantum processor, to minimize the objective function may further include optimizing the objective function for a second set of values for the dictionary based on the first set of values for the weights, wherein optimizing the objective function for a second set of values for the dictionary includes using the non-quantum processor to update at least some of the values for the dictionary.

Interacting with the quantum processor, via the non-quantum processor, to minimize the objective function may further include optimizing the objective function for a third set of values for the dictionary based on the second set of values for the weights, wherein optimizing the objective function for a third set of values for the dictionary includes using the non-quantum processor to update at least some of the values for the dictionary.

The method may further include optimizing the objective function for a $t^{th}$ set of values for the weights, where t is an integer greater than 2, based on the third set of values for the dictionary, wherein optimizing the objective function for a $t^{th}$ set of values for the weights includes mapping the objective function to a $t^{th}$ QUBO problem and using the quantum processor to at least approximately minimize the $t^{th}$ QUBO problem; and optimizing the objective function for a $(t+1)^{th}$ set of values for the dictionary based on the $t^{th}$ set of values for the weights, wherein optimizing the objective function for a $(t+1)^{th}$ set of values for the dictionary includes using the non-quantum processor to update at least some of the values for the dictionary.

The method may further include optimizing the objective function for a $(t+1)^{th}$ set of values for the weights based on the $(t+1)^{th}$ set of values for the dictionary, wherein optimizing the objective function for a $(t+1)^{th}$ set of values for the weights includes mapping the objective function to a $(t+1)^{th}$ QUBO problem and using the quantum processor to at least approximately minimize the $(t+1)^{th}$ QUBO problem.

Optimizing the objective function for a $(t+1)^{th}$ set of values for the dictionary based on the $t^{th}$ set of values for the weights and optimizing the objective function for a $(t+1)^{th}$ set of values for the weights based on the $(t+1)^{th}$ set of values for the dictionary are repeated for incremental values of t until at least one solution criterion is met. The at least one solution criterion may include either convergence of the set of values for the weights or convergence of the set of values for the dictionary Minimizing the objective function may include generating features in a learning problem. Generating features in a learning problem may include generating features in at least one of: pattern recognition problem, training an artificial neural network problem, and software verification and validation problem. Generating features in a learning problem may include generating features in at least one of a machine learning problem or an application of artificial intelligence. Minimizing the objective function may include solving a sparse least squares problem. Setting a first set of values for the dictionary of the objective function may include generating a matrix of real values wherein each entry of the matrix is a random number between positive one and negative one; renormalizing each column of the matrix such that a norm for each column is equal to one; and for each column of the matrix, computing the null space of the column; and replacing the column with a column of random entries in the null space basis of the column. Casting a first set of weights in the objective function as variables using the non-quantum processor may include casting a first set of weights as Boolean variables using the non-quantum processor.

The method may further include incorporating at least one label comprised of at least one label element into the data set, wherein the at least one label is representative of label information which logically identifies a subject represented in the data set at an at least an abstract level or category to which the subject represented in the set of data belongs. Incorporating at least one label may include incorporating at least one label representative of label information which logically identifies the subject represented in the data set as at least one of an alphanumeric character, belonging to a defined set of humans, a make and/or model of a vehicle, a defined set of objects, a defined foreign or suspect object, or a type of anatomical feature. Incorporating at least one label may include incorporating at least one label representative of label information, and the label information is the same type as the corresponding data element. Receiving a data set of data elements at a non-quantum processor may include receiving a data set expressed as image data, and the incorporated at least one label element comprises image data. Incorporating at least one label comprised of at least one label element into the data set may include incorporating at least one label comprised of at least one label element, the at least one label element comprises image data, and a spatial position of the label element at least partially may encode the label information. Formulating an objective function may include formulating an objective function based on both the data set and the incorporated at least one label. Receiving a data set of data elements at a non-quantum processor may include receiving a data set expressed as different types or formats of data. The objective function may be in the form:

$$G(\hat{W}, \hat{D}; \lambda) = \sum_{s=1}^{S} \left\| \vec{z}_s - \sum \frac{K}{k=1} w_{ks} \vec{d}_k \right\|^2 + \lambda \sum_{s=1}^{S} \sum_{k=1}^{K} w_{ks}.$$

The method may further include preprocessing the data set of data elements to generate a preprocessed data set. The data set of data elements may include an image data set of image data elements, and preprocessing the data set of data elements may include normalizing at least one of a contrast or a brightness of the image data elements of the image data set. Preprocessing the data set of data elements may include whitening the normalized image data elements of the image data set. Whitening the normalized image data elements of the image data set may include applying zero phase component analysis (ZCA) whitening to the normalized data elements of the image data set. Preprocessing the data set of data elements may include reducing a dimensionality of the normalized image data elements of the image data set. Reducing a dimensionality of the normalized image data elements of the image data set may include applying principal component analysis (PCA) to the normalized data elements of the image data set. Preprocessing the data set of data elements may include reducing a dimensionality of the normalized image data elements of the image data set and whitening the normalized image data elements of the image data set.

The method wherein the data set of data elements includes an image data set of image data elements may include segmenting each of the image data elements into one or more disjoint regions.

The method may further include receiving, by the non-quantum processor, a segmentation parameter indicative of a segmentation characteristic, wherein the segmenting each of the image data elements into one or more disjoint regions is at least partially based on the received segmentation parameter.

A method to identify maximally repeating patterns in data via Hierarchical Deep Learning (HDL) may be summarized as including receiving a labeled data set of labeled data elements at a non-quantum processor, each labeled data element which incorporates at least one label comprised of at least one label element; preprocessing the labeled data set of labeled data elements at the non-quantum processor to generate a preprocessed labeled data set; formulating an objective function based on the preprocessed labeled data set via the non-quantum processor; and interacting with a quantum processor, via the non-quantum processor, to minimize the objective function by: casting a set of weights in the objective function as Boolean variables using the non-quantum processor; setting a first set of values for a dictionary using the non-quantum processor; and optimizing the objective function for a first set of values for the Boolean weights based on the first set of values for the dictionary. Optimizing the objective function for a first set of values for the Boolean weights may include mapping the objective function to a first quadratic unconstrained binary optimization ("QUBO") problem and using a quantum processor to at least approximately minimize the first QUBO problem, wherein using the quantum processor to at least approximately minimize the first QUBO problem includes using the quantum processor to perform at least one of adiabatic quantum computation or quantum annealing.

The method may further include optimizing the objective function for a second set of values for the dictionary based on the first set of values for the Boolean weights, wherein optimizing the objective function for a second set of values for the dictionary includes using the non-quantum processor to update at least some of the values for the dictionary.

The method may further include optimizing the objective function for a second set of values for the Boolean weights based on the second set of values for the dictionary, wherein optimizing the objective function for a second set of values for the Boolean weights includes mapping the objective function to a second QUBO problem and using the quantum processor to at least approximately minimize the second QUBO problem.

The method may further include optimizing the objective function for a third set of values for the dictionary based on the second set of values for the Boolean weights, wherein optimizing the objective function for a third set of values for the dictionary includes using the non-quantum processor to update at least some of the values for the dictionary.

A processor-readable storage medium may be summarized as including processor executable instructions to: receive an image data set of image data elements at a non-quantum processor; normalize the image data set of image data elements to generate a normalized image data set; formulate an objective function based on the normalized data set via the non-quantum processor, wherein the objective function includes a loss term to minimize difference between a first representation of the data set and a second representation of the data set, and a regularization term to minimize any complications in the objective function; cast a first set of weights in the objective function as variables using the non-quantum processor; set a first set of values for a dictionary of the objective function using the non-quantum processor, wherein the first set of values for the dictionary includes a matrix of real values having a number of columns each defining a vector that corresponds to a qubit in the quantum processor, wherein any of the vectors that correspond to unconnected qubits in the quantum processor are orthogonal to each other; and interact with the quantum processor, via the non-quantum processor, to minimize the objective function.

A method of automatically labeling data may be summarized as including receiving unlabeled data in at least one processor-readable storage medium; learning, via at least one processor, a dictionary of dictionary atoms using sparse coding on the received unlabeled data; receiving labeled data elements in the at least one processor-readable storage medium, each labeled data element which incorporates at least one respective label comprised of at least one respective label element; preprocessing the labeled data elements to generate preprocessed labeled data elements; reconstructing, via at least one processor, the preprocessed labeled data elements using the dictionary to generate encoded labeled data elements; executing, via at least one processor, a supervised learning process using the encoded labeled data elements to produce at least one of a classifier or a label assigner; and storing the produced at least one classifier or label assigner in the at least one processor-readable storage medium. The labeled data elements may include labeled image data elements, and preprocessing the labeled data elements to generate preprocessed labeled data elements may include at least one of: normalizing at least one of a contrast or a brightness of the image data elements; whitening the image data elements; applying zero phase component analysis (ZCA) whitening to the image data elements; or reducing a dimensionality of the image data elements. Executing, via at least one processor, a supervised learning process may include performing at least one of a perceptron algorithm, a k nearest neighbors (kNN) algorithm, or a linear support vector machine (SVM) with L1 and L2 loss algorithm. Receiving labeled data elements in the at least one processor-readable storage medium may include receiving labeled image data elements, each labeled image data element incorporating at least one respective label comprised of at least one respective image label element. Receiving labeled data elements in the at least one processor-readable storage medium may include receiving labeled data elements each of a specific type or format of data, and each labeled data element may be of the same specific type or format of data as the received respective label element.

A system to identify maximally repeating patterns in data via Hierarchical Deep Learning (HDL) may be summarized as including a quantum processor; a non-quantum processor communicatively coupled with the quantum processor; and a processor-readable storage medium that includes processor-executable instructions to: receive a data set of data elements at the non-quantum processor; formulate an objective function based on the data set via the non-quantum processor, wherein the objective function includes a loss term to minimize a difference between a first representation of the data set and a second representation of the data set, and includes a regularization term to minimize any complications in the objective function; cast a first set of weights in the objective function as variables using the non-quantum processor; set a first set of values for a dictionary of the objective function using the non-quantum processor; and interact with the quantum processor, via the non-quantum processor, to minimize the objective function.

The processor-readable storage medium may include processor-executable instructions to: formulate the objective function where the regularization term is governed by an L0-norm form. The processor-readable storage medium may include processor-executable instructions to: formulate the objective function where the regularization term is governed by an L1-norm form. The regularization term may include a regularization parameter, and the processor-readable storage medium may include processor-executable instructions to: select a value for the regularization parameter to control a sparsity of the objective function. The processor-readable storage medium may include processor-executable instructions to: receive image data and audio data. The processor-readable storage medium may include processor-executable instructions to: optimize the objective function for the first set of values for the weights in the objective function based on the first set of values for the dictionary. The processor-readable storage medium may include processor-executable instructions to: map the objective function to a first quadratic unconstrained binary optimization ("QUBO") problem and use the quantum processor to at least approximately minimize the first QUBO problem, and use the quantum processor to perform at least one of adiabatic quantum computation or quantum annealing.

The processor-readable storage medium may include processor-executable instructions to: optimize the objective function for a second set of values for the weights based on a second set of values for the dictionary, map the objective function to a second QUBO problem and use the quantum processor to at least approximately minimize the second QUBO problem. The processor-readable storage medium may include processor-executable instructions to: optimize the objective function for a second set of values for the dictionary based on the first set of values for the weights, and use the non-quantum processor to update at least some of the values for the dictionary. The processor-readable storage medium may include processor-executable instructions to: optimize the objective function for a third set of values for the dictionary based on the second set of values for the weights, and use the non-quantum processor to update at least some of the values for the dictionary.

The processor-readable storage medium may include processor-executable instructions to: optimize the objective function for a $t^{th}$ set of values for the weights, where t is an integer greater than 2, based on the third set of values for the dictionary, and map the objective function to a $t^{th}$ QUBO problem and use the quantum processor to at least approximately minimize the $t^{th}$ QUBO problem; and optimize the objective function for a $(t+1)^{th}$ set of values for the dictionary based on the $t^{th}$ set of values for the weights, and use the non-quantum processor to update at least some of the values for the dictionary. The processor-readable storage medium may include processor-executable instructions to: optimize the objective function for a $(t+1)^{th}$ set of values for the weights based on the $(t+1)^{th}$ set of values for the dictionary, and map the objective function to a $(t+1)^{th}$ QUBO problem and use the quantum processor to at least approximately minimize the $(t+1)^{th}$ QUBO problem. The processor-readable storage medium may include processor-executable instructions to: repeatedly optimize the objective function for a $(t+1)^{th}$ set of values for the dictionary based on the $t^{th}$ set of values for the weights and optimize the objective function for a $(t+1)^{th}$ set of values for the weights based on the $(t+1)^{th}$ set of values for the dictionary for incremental values of t until at least one solution criterion is met. The at least one solution criterion may include either convergence of the set of values for the weights or convergence of the set of values for the dictionary. The processor-readable storage medium may include processor-executable instructions to: generate features in a learning problem. The processor-readable storage medium may include processor-executable instructions to: generate features in at least one of: pattern recognition problem, training an artificial neural network problem, and software verification and validation problem. The processor-readable storage medium may include processor-executable instructions to: generate features in at least one of a machine learning problem or an application of artificial intelligence. The processor-readable storage medium may include processor-executable instructions to: solve a sparse least squares problem.

The processor-readable storage medium may include processor-executable instructions to: generate a matrix of real values wherein each entry of the matrix is a random number between positive one and negative one; renormalize each column of the matrix such that a norm for each column is equal to one; and for each column of the matrix, compute the null space of the column; and replace the column with a column of random entries in the null space basis of the column. The processor-readable storage medium may include processor-executable instructions to: cast a first set of weights as Boolean variables using the non-quantum processor.

The processor-readable storage medium may include processor-executable instructions to: incorporate at least one label comprised of at least one label element into the data set, wherein the at least one label is representative of label information which logically identifies a subject represented in the data set at an at least an abstract level or category to which the subject represented in the set of data belongs.

The processor-readable storage medium may include processor-executable instructions to: incorporate at least one label representative of label information which logically identifies the subject represented in the data set as at least one of an alphanumeric character, belonging to a defined set of humans, a make and/or model of a vehicle, a defined set of objects, a defined foreign or suspect object, or a type of anatomical feature. The processor-readable storage medium may include processor-executable instructions to: incorporate at least one label representative of label information, and the label information is the same type as the corresponding data element. The processor-readable storage medium may include processor-executable instructions to: receive a data set expressed as image data, and the incorporated at least one label element comprises image data. The processor-readable storage medium may include processor-executable instructions to: incorporate at least one label comprised of at least one label element, the at least one label element comprises image data, and a spatial position of the label element at least partially encodes the label information. The processor-readable storage medium may include processor-executable instructions to: formulate an objective function based on both the data set and the incorporated at least one label. The processor-readable storage medium may include processor-executable instructions to: receive a data set expressed as different types or formats of data. The objective function may be in the form:

$$G(\hat{W}, \hat{D}; \lambda) = \sum_{s=1}^{S} \left\| \vec{z}_s - \sum_{k=1}^{K} w_{ks} \vec{d}_k \right\|^2 + \lambda \sum_{s=1}^{S} \sum_{k=1}^{K} w_{ks}.$$

The processor-readable storage medium may include processor-executable instructions to: preprocess the data set of data elements at the non-quantum processor to generate a preprocessed data set. The data set of data elements may include an image data set of image data elements, and the processor-readable storage medium may include processor-executable instructions to: normalize at least one of a contrast or a brightness of the image data elements of the image data set. The processor-readable storage medium may include processor-executable instructions to: whitening the normalized image data elements of the image data set. The processor-readable storage medium may include processor-executable instructions to: apply zero phase component analysis (ZCA) whitening to the normalized data elements of the image data set. The processor-readable storage medium may include processor-executable instructions to: reduce a dimensionality of the normalized image data elements of the image data set. The processor-readable storage medium may include processor-executable instructions to: apply principal component analysis (PCA) to the normalized data elements of the image data set. The processor-readable storage medium may include processor-executable instructions to: reduce a dimensionality of the normalized image data elements of the image data set; and whiten the normalized image data elements of the image data set. The processor-readable storage medium may include processor-executable instructions to: segment each of the image data elements into one or more disjoint regions using the non-quantum processor. The processor-readable storage medium may include processor-executable instructions to: receive a segmentation parameter indicative of a segmentation characteristic, wherein the one or more disjoint regions is at least partially based on the received segmentation parameter.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 14 shows a dictionary file, in accordance with at least one embodiment.

FIG. 22 illustrates an aspect of the associated user interface of the HDL framework, in accordance with at least one embodiment.

FIG. 24 illustrates an aspect of the associated user interface of the HDL framework, in accordance with at least one embodiment.

FIG. 26 illustrates an aspect of the associated user interface of the HDL framework, in accordance with at least one embodiment.

FIG. 28 illustrates an aspect of the associated user interface of the HDL framework, in accordance with at least one embodiment.

FIG. 31 illustrates an aspect of the associated user interface of the HDL framework, in accordance with at least one embodiment.

FIG. 32 illustrates an aspect of the associated user interface of the HDL framework, in accordance with at least one embodiment.

Figure 34A:
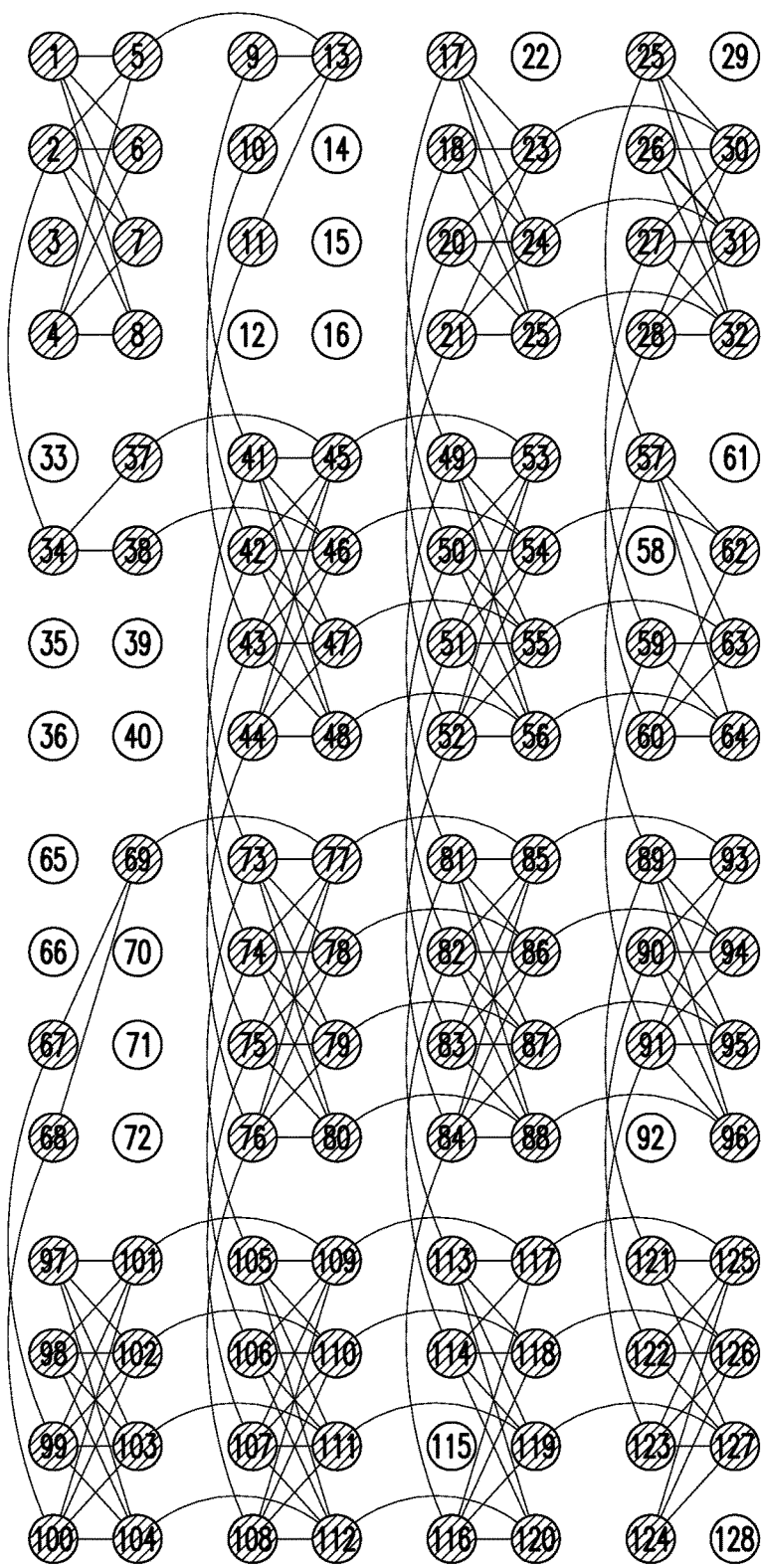
Figure 34B:
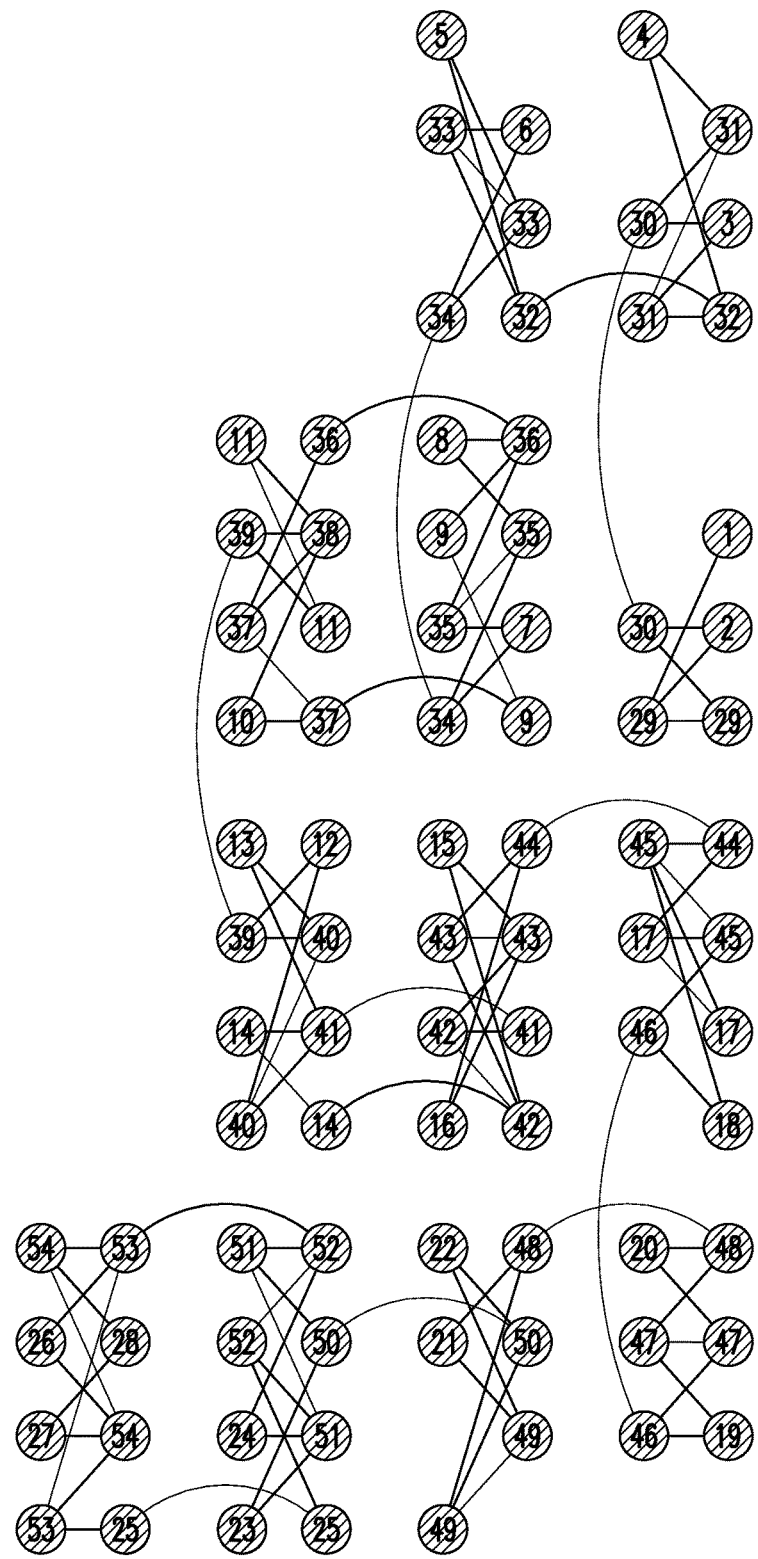

FIGS. 34A-B show a processor graph depicting an embedding into a quantum processor for solving a problem that computes Ramsey numbers, in accordance with at least one embodiment.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments. It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide methods of using a quantum processor to solve a computational problem by employing techniques of compressed sensing or processing. Such may advantageously be employed, for instances, in semi-supervised feature learning, which allows a processor-based device to automatically recognize various objects in images represented by image data, for example characters or numbers, people, anatomical structures, vehicles, foreign or suspect objects, etc. For example, an objective that is normally minimized in compressed sensing techniques is re-cast as a quadratic unconstrained binary optimization ("QUBO") problem that is well-suited to be solved using a quantum processor, such as an adiabatic quantum processor and/or a processor designed to implement quantum annealing.

An objective that is typically minimized in compressed sensing techniques is known as the "sparse least squares problem":

$$\sum_{i=1}^{S} \{\|y_i - Dw_i\|_2^2 + \lambda \|w_i\|_1\}. \qquad (1)$$

The sparse least squares problem seeks a basis for a collection of N dimensional real-valued signals $\{y_i | 1 \le i \le S\}$ in which any given $y_i$ is expressible as a linear combination of few basis vectors. This problem finds application in, for example, data compression, feature extraction in machine learning, dimensionality reduction for visualization, semantic hashing for fast information retrieval, and many other domains.

The matrix D has dimensions of N×K where each column represents a basis vector. The K basis elements are sometimes called "atoms" and may be over-complete. Each weight $w_i$ is K×1. The matrix D is referred to as a "dictionary" and the goal of the sparse least squares problem is to minimize the objective of equation 1 with respect to both $w_i$ and the basis vectors of the dictionary D. The minimization is usually done in steps using block coordinate descent as the objective is convex in w and D individually, but not jointly. In accordance with the present methods, at least part of the minimization may be mapped to a QUBO problem by restricting the weights $w_i$ to Boolean values of, for example, 0 or 1. An example of the objective then becomes:

$$\sum_{i=1}^{S} \{\|y_i - Dw_i\|_2^2 + \lambda \langle 1, w_i \rangle\} \qquad (2)$$

The objective of equation 2 is to be minimized with respect to each Boolean-valued vector $w_i$ and the real-valued basis elements stored in D. In some instances, casting the weights $w_i$ as Boolean values realizes a kind of 0-norm sparsity penalty. For many problems, the 0-norm version of the problem is expected to be sparser than the 1-norm variant. Historically, the 0-norm variation has been less studied as it can be more difficult to solve.

As previously described, a QUBO problem may typically be written in the form:

$$E(x_1, \ldots, x_N) = \sum_{i \le j}^{N} Q_{ij} x_i x_j, \qquad (3)$$

where the objective is to, for example, minimize E. In accordance with the present methods, the Boolean version of the sparse least squares problem given in equation 2 may be mapped to the QUBO problem given in equation 3 such that the Q term of the QUBO problem is given by $D^T D$. More specifically, the $Q_{ij}$ elements of equation 3 (with $i \ne j$) may be given by $(D^T D)_{ij} = d_i^T d_j$.

The Boolean objective given by equation 2 may be optimized by, for example, guessing initial values for the basis elements of the dictionary D, optimizing for the values of the Boolean weights $w_i$ that correspond to the initial guessed elements of D, then optimizing for the elements of D that correspond to the first optimized values of $w_i$, then re-optimizing for the values of the Boolean weights $w_i$ that correspond to the first optimized dictionary D, and continuing this back-and-forth optimization procedure until some solution criteria are met or until the optimization converges. The optimization procedure may begin, for example, by using guessed values for the Boolean weights $w_i$ and first optimizing for the dictionary D rather than first guessing values for the elements of D and optimizing for the Boolean weights $w_i$.

In some instances, the dictionary D may be continuous. In such instances, it may be impractical to optimize for D using a quantum processor. Conversely, the Boolean weights $w_i$ may be discrete and well-suited to be optimized using a quantum processor. Thus, in accordance with the present methods, the back-and-forth optimization procedure described above may be performed using both a quantum processor and a non-quantum processor (e.g., a digital processor or a classical analog processor), where the quantum processor is used to optimize (i.e., minimize) equation 2 for the Boolean weights $w_i$ corresponding to any given dictionary D and the non-quantum processor is used to optimize (i.e., minimize) equation 2 for the dictionary D corresponding to any given assignment of Boolean weights $w_i$.

For example, for a given D each $w_i$ ($1 \leq i \leq S$) can be optimized separately as a QUBO:

$$w_i(D) = \underset{w_i}{\operatorname{argmin}}\{w_i^T D^T D w_i + \langle \lambda 1 - 2D^T y_i, w_i \rangle\} \quad (4)$$

with $w_i(\alpha) \in \{0,1\}$ for all components $\alpha$.
and in accordance with the present methods, this optimization may be performed using a quantum processor, such as an adiabatic quantum processor or a processor designed to implement quantum annealing.

The optimization over D for a given setting of $w_i$ may be accomplished using, e.g., a non-quantum processor as follows: write $d=D(:)$ (i.e., stack the columns of D in a vector) so that $Dw=(w^T \otimes I_N)d$ for any K×1 vector w. The optimization objective determining d is:

$$d^T \left( \sum_{i=1}^{S} w_i w_i^T \otimes I_N \right) d - \left( 2 \sum_{i=1}^{S} y_i^T (w_i^T \otimes I_N) \right) d$$

which has minimum $$d(\{w_i\}) = \left( \left( \sum_{i=1}^{S} w_i w_i^T \right)^{-1} \otimes I_N \right) \left( \sum_{i=1}^{S} (w_i \otimes I_N) y_i \right).$$

If there are fewer than K training examples then $\Sigma_i w_i w_i^T$ may not have full rank. In such cases, the singular value decomposition of $\Sigma_i w_i w_i^T$ may be used to find the solution with minimum norm $\|d\|_2$. The restriction to Boolean valued weights $w_i$ may, for example, rule out the possibility of negative contributions of dictionary atoms. However, there may be no need to explicitly allow the weights to be negative as this may be accounted for in the dictionary learning. For example, doubling the number of w variables and writing $y_i=D(w_i^+ - w_i^-)$ with both $w_i^+$ and $w_i^-$ being Boolean-valued simply doubles the size of the dictionary so that $$y_i = \tilde{D} \overline{w}_i \text{ where } \tilde{D}=[D-D] \text{ and } \overline{w}_i^T=[(w_i^+)^T (w_i^-)^T].$$

The sparsity penalty $\lambda$ may, for example, be set by partitioning the training data into a training group $D_{train}$ and a testing group $D_{test}$. On the training group $D_{train}$ the dictionary $D(\lambda)$ may be learned at a given value of $\lambda$. On the testing group $D_{test}$, the reconstruction error may be measured:

$$\operatorname{error}(\lambda) = \sum_{y_i \in D_{test}} \left\{ \min_{\{w_i\}} \|y_i - D(\lambda) w_i\|_2^2 \right\}.$$

Thus, it can be advantageous to choose a $\lambda$ that minimizes error($\lambda$). In practice, error($\lambda$) may be estimated with more than this single fold.

The connectivity of the QUBO defined by equation 4 may be determined by $D^T D$ and in general may be fully connected. However, imposing additional structure can simplify the QUBO optimization. The present methods describe how to learn dictionaries respecting these additional constraints so that, for example, the resultant QUBO can be optimized on quantum processor hardware having qubit connectivity $C_n$ specified by an adjacency matrix A, where $C_n$ may not be fully connected. As previously described, the Qij elements of the typical QUBO formulation (i.e., equation 3) may be given by $(D^T D)ij = d_i^T d_j$. In mapping (e.g., equation 4) to a quantum processor having incomplete connectivity $C_n$, a pair of uncoupled qubits i and j require $d_i^T d_j = 0$, or that di and dj are orthogonal. Depending on the dimensionality of the input signal N and the number of dictionary elements K there may not be a way to define D so that $D^T D$ has $C_n$ connectivity. In such cases, the compression mechanism may be modified.

However, assuming that N>>K and that it is possible to construct a dictionary D for any connectivity $C_n$, the ($\alpha$, $\alpha$') element of $D^T D$ (which determines the connectivity between Boolean variables $w_i(\alpha)$ and $w_i(\alpha')$) is $\langle d^{(\alpha)}, d^{(\alpha')} \rangle$ where $D=[d^{(1)} \ldots d^{(K)}]$ and $d^{(\alpha)}$ and $d^{(\alpha')}$ are columns of D. Thus, specifying a connectivity $C_n$ for the K×K matrix $D_T D$ is equivalent to associating vectors with graphs of K vertices so that the vectors of unconnected vertices are orthogonal. Whether or not this can be done for a given graph structure G=(V, E) depends both on the connectivity E, and the dimensionality of the atoms $d^{(\alpha)}$. In general, associating vectors with graphs of K vertices so that the vectors of unconnected vertices are orthogonal can be accomplished if the dimensionality of the vectors equals K=|V|. However, in accordance with the present disclosure, this may be improved by finding a representation in $d \geq 1$ dimensions where the minimum degree node has at least |V|−d neighbors. For example, a quantum processor architecture having a connectivity with minimum degree of 5 may need at least K−5 dimensions.

As previously described, for a given dictionary D the weights $w_i$ in equations 2 and/or 4 may be optimized using a quantum processor, for example a quantum processor implementing adiabatic quantum computation and/or quantum annealing. On the other hand, for a given assignment of Boolean variable(s) $w_i$ the dictionary D may be optimized using, for example, a non-quantum processor such as a classical digital processor or a classical analog processor.

Assuming that N is sufficiently large, the dictionary may be adapted while respecting the connectivity constraints of $D^T D$. A block coordinate descent may be applied starting from some initial dictionary D(0) satisfying the required orthogonality constraints. Using, for example, the Lovasz orthogonality construction (L. Lovasz, M. Saks, and A. Schrijver, A correction: Orthogonal representations and connectivity of graphs. Linear Alg. Appl., pages 101-105, (see also pages 439 to 454) 2000), an initial dictionary may be found when N≥K. From the starting dictionary $D^{(0)}$, a processor may be used to update the weights to $w^{(1)} \leftarrow w(D^{(0)})$ (using, e.g., equation 4). For example, a quantum processor may be used to update the initial weights $w^{(1)}$. Once the weights are updated for the starting dictionary $D^{(0)}$, a processor may be used to update the dictionary to $D(1) \leftarrow D(w^{(1)})$ where $D=[d^{(1)} \ldots d^{(K)}]$, and:

$$D(w) = \underset{d^{(1)},\ldots,d^{(K)}}{\operatorname{argmin}} \sum_{i=1}^{S} \{\|y_i - \tilde{D} w_i\|_2^2 + \lambda \langle 1, w_i \rangle\}$$

subject to $A_{\alpha,\alpha'} = 0 \Rightarrow \langle \overline{d}^{(\alpha)}, \overline{d}^{(\alpha')} \rangle = 0.$ In principle, the present methods may accommodate any adjacency matrix $A_{\alpha,\alpha'}$. The dictionary interactions may be customized to suit any aspect of the problem or of the processor(s) being used to solve the problem. Thus, in some applications it may be advantageous to deliberately craft the adjacency matrix $A_{\alpha,\alpha'}$ so that the resulting QUBO problem has connectivity that matches that of the quantum processor, or at least connectivity that is amenable to being mapped to the quantum processor. In accordance with the present methods, the QUBO problems stemming from the dictionary interactions may be made particularly well suited to be solved by a quantum processor by restricting the dictionary to match the connectivity of the quantum processor.

A non-quantum processor such as a digital processor or a classical analog processor may be used, for example, to update the dictionary to $D^{(t)}$. Following this procedure, the update equations $w^{(t+1)} \leftarrow w(D^{(t)})$ and $D^{(t+1)} \leftarrow D(w^{(t+1)})$ may be iterated to convergence to a minimum of equation 2, such as a global minimum or a local minimum.

As previously described, the QUBO minimizations for w(D) may be performed using a quantum processor implementing, for example, adiabatic quantum computation or quantum annealing. The dictionary optimization problem, however, may be addressed using a non-quantum processor because, for example, D may be continuous. For example, local search approaches may be implemented whereby a small subset of the dictionary is improved. If localModification(D) yields a locally improved dictionary, then the overall structure of the optimization is given in Algorithm 1:

---

Algorithm 1 QUBO constrained dictionary learning

---

Require: training data $\{y_i\}$
Ensure: a dictionary D with which each $y_i$ may be represented sparsely
as $y_i = Dw_i$
    Initialize $D^{(0)}$, t ← 0
    while D not converged do
        update $w^{(t)} \leftarrow w(D^{(t)})$ using a QUBO solver
        $D^{(t+1)} \leftarrow D^{(t)}$
        for step<numModifications do
            $D^{(t+1)} \leftarrow$ localModification($D^{(t+1)}$)
        t ← t + 1.
    return $D^{(t)}$.

---

The number of local modifications used between w updates is a parameter of the algorithm. Thus, such local search approaches may be broken down into a variety of localModification(D) modifications, including single-column modifications, two-column modifications, and more-than-two-column modifications.

An exemplary procedure for single-column modifications is now described. Consider updating a single column (say column 1) and write $D = [d^{(1)} \tilde{D}] \cdot d^{(1)}$ may lie in the orthogonal complement of those columns of which are non-neighbors of node 1 and null spaces of D may refer to nonneighboring columns of D which must be orthogonal. Then, $d^{(1)} = N^{(1)} t^{(1)}$ where the columns of $N^{(1)}$ define a basis for the null space of $\tilde{D}^\tau$. Thus, most generally, $D = [N^{(1)} t^{(1)} \tilde{D}]$. To optimize all parameters, block coordinate descent may be applied. The $\{w_i\}$ block coordinate minimizations may be carried out using QUBO minimization of equation 4 as before. To determine $d^{(1)}$ for a given and $\{w_i\}$, minimize for the reconstruction error $$t_*^{(1)} = \operatorname*{argmin}_t \sum_{i=1}^S \|y_i - \tilde{D}\tilde{w}_i - N^{(1)} t w_i^{(1)}\|_2^2 = \operatorname*{argmin}_t \left\{ \frac{\tilde{w}^{(1)}}{2} \|t\|_2^2 - v^T t \right\}$$

where $$w_i = \begin{bmatrix} w_i^{(1)} \\ \tilde{w}_i \end{bmatrix}, \tilde{w}^{(1)} \equiv \sum_{i=1}^S w_i^{(1)}, \text{ and } v^{(1)} \equiv (N^{(1)})^T \sum_{i=1}^S w_i^{(1)} \{y_i - \tilde{D}\tilde{w}_i\}$$

The minimization over t yields $t_*^{(1)} = v/\tilde{\omega}^{(1)}$ so that $d^{(1)} = N^{(1)} v^{(1)}/\tilde{\omega}^{(1)}$. This update rule may not be applicable when column 1 is never used, i.e., $\tilde{\omega}^{(1)} = 0$. In this case, it can be advantageous to try to set $d^{(1)}$ so that column 1 is more likely to be used at subsequent iterations. Note the reconstruction error at $t_*^{(1)}$ is $-\|v^{(1)}\|_2^2/(2\tilde{\omega}^{(1)})$ so that if a single bit is turned on one training example (i.e., so that $\tilde{w}^{(1)} = 1$) the training example most likely to utilize the new column is $i_* = \operatorname{arg\,max}_i \|(N^{(1)})^T (y_i - \tilde{D}\tilde{w}_i)\|_2^2$. With this selection, $d^{(1)} = N^{(1)} (N^{(1)})^T (y_{i_*} - \tilde{D}\tilde{w}_{i_*})$.

An exemplary procedure for a two-column modification is now described. Two columns $d^{(1)}$ and $d^{(2)}$ of D may, for example, be optimized simultaneously. The optimization approach may branch depending on whether the columns are neighbors in A or non-neighbors.

In instances where the columns $d^{(1)}$ and $d^{(2)}$ correspond to neighboring nodes so that there are no additional orthogonality constraints between $d^{(1)}$ and $d^{(2)}$, $D = [N^{(1)} t^{(1)} \ N^{(2)} t^{(2)} \ \tilde{D}]$. The optimal linear combinations may be obtained as:

$$i_* = \operatorname*{argmin}_{t^{(1)}, t^{(2)}} \sum_{i=1}^S \|y_i - \tilde{D}\tilde{w}_i - N^{(1)} t^{(1)} w_i^{(1)} - N^{(2)} t^{(2)} w_i^{(2)}\|_2^2$$

$$= \operatorname*{argmin}_{t^{(1)}, t^{(2)}} \left\{ [(t^{(1)})^T \ (t^{(2)})^T] \begin{bmatrix} \tilde{w}^{(1)} I^{(1)} & \tilde{w}^{(1,2)} (N^{(1)})^T N^{(2)} \\ \tilde{w}^{(1,2)} (N^{(2)})^T N^{(1)} & \tilde{w}^{(2)} I^{(2)} \end{bmatrix} \begin{bmatrix} t^{(1)} \\ t^{(2)} \end{bmatrix} - 2[(v^{(1)})^T \ (v^{(2)})^T] \begin{bmatrix} t^{(1)} \\ t^{(2)} \end{bmatrix} \right\}$$

with $$v^{(1)} = (N^{(1)})^T r^{(1)} \text{ with } r^{(1)} = \sum_{i=1i}^S w_i^{(1)} \{y_i - \tilde{D}\tilde{w}_i\},$$

$$v^{(2)} = (N^{(2)})^T r^{(2)} \text{ with } r^{(2)} = \sum_{i=1i}^S w_i^{(2)} \{y_i - \tilde{D}\tilde{w}_i\},$$

$$\tilde{w}^{(1)} = \sum_{i=1}^S w_i^{(1)}, \tilde{w}^{(1,2)} = \sum_{i=1}^S w_i^{(1)} w_i^{(2)}, \tilde{w}^{(2)} = \sum_{i=1}^S w_i^{(2)}$$

where $r^{(1)}$ and $r^{(2)}$ are weighted error residuals. The matrix coupling $t^{(1)}$ and $t^{(2)}$ may then be inverted as:

$$\begin{bmatrix} X^{-1} & -\tilde{w}^{(1,2)} (N^{(1)})^T N^{(2)} Y^{-1} / \tilde{w}^{(1)} \\ -\tilde{w}^{(1,2)} (N^{(2)})^T N^{(1)} X^{-1} / \tilde{w}^{(1)} & Y^{-1} \end{bmatrix}$$

where $$X = \tilde{w}_1 I^{(1)} - (\tilde{w}^{(1,2)})^2 (N^{(1)})^T N^{(2)} (N^{(2)})^T N^{(1)} / \tilde{w}^{(2)}$$

$$Y = \tilde{w}_2 I^{(2)} - (\tilde{w}^{(1,2)})^2 (N^{(2)})^T N^{(1)} (N^{(1)})^T N^{(2)} / \tilde{w}^{(1)}$$

so that $$\begin{bmatrix} t_*^{(1)} \\ t_*^{(2)} \end{bmatrix} = \begin{bmatrix} X^{-1} v^{(1)} - (\tilde{w}^{(1,2)} / \tilde{w}^{(1)}) (N^{(1)})^T N^{(2)} Y^{-1} v^{(2)} \\ Y^{-1} v^{(2)} - (\tilde{w}^{(1,2)} / \tilde{w}^{(1)}) (N^{(2)})^T N^{(1)} X^{-1} v^{(1)} \end{bmatrix}.$$

In the case where $\tilde{w}^{(1)} \tilde{w}^{(2)} = (\tilde{w}^{(1,2)})^2$, the matrix is singular and its pseudo-inverse may be used. If either of $\tilde{w}^{(1)}$ or $\tilde{w}^{(2)}$ are zero, the same counterfactual argument may be applied to set the column to minimize the reconstruction error of the example with the largest error.

In instances where the two columns $d^{(1)}$ and $d^{(2)}$ correspond to non-neighbors, it may be required that:

$$d_*^{(1)}, d_*^{(2)} = \operatorname*{argmin}_{d^{(1)}, d^{(2)}}\{\tilde{w}^{(1)}\|d^{(1)}\|_2^2 - 2\langle r^{(1)}, d^{(1)}\rangle + \tilde{w}^{(2)}\|d^{(2)}\|_2^2 - 2\langle r^{(2)}, d^{(2)}\rangle\}$$

with: $[\langle d^{(1)}, d^{(2)}\rangle = 0] \wedge [d^{(1)} \in \operatorname{span}(N^{(1)})] \wedge [d^{(2)} \in \operatorname{span}(N^{(2)})]$.

The quadratic orthogonality constraint and the non-convex nature of the feasible set can make this problem difficult. To find a local minimum, the KKT equations may be solved for the orthogonality constraint. The Lagrangian is:

$$L(t^{(1)}, t^{(2)}, \mu) = [(t^{(1)})^T (t^{(2)})^T]\begin{bmatrix} \tilde{w}^{(1)} I^{(1)} & \mu(N^{(1)})^T(N^{(2)}) \\ \mu(N^{(2)})^T(N^{(1)}) & \tilde{w}^{(2)} I^{(2)} \end{bmatrix}\begin{bmatrix} t^{(1)} \\ t^{(2)} \end{bmatrix} - 2[(v^{(1)})^T (v^{(2)})^T]\begin{bmatrix} t^{(1)} \\ t^{(2)} \end{bmatrix}$$

where $\mu$ is the Lagrange multiplier for the orthogonality constraint. The KKT conditions are where $\mu$ us the Lagrange multiplier for the orthogonality constraint. The KKT conditions are $$\begin{bmatrix} \tilde{w}^{(1)} I^{(1)} & \mu(N^{(1)})^T(N^{(2)}) \\ \mu(N^{(2)})^T(N^{(1)}) & \tilde{w}^{(2)} I^{(2)} \end{bmatrix}\begin{bmatrix} t^{(1)} \\ t^{(2)} \end{bmatrix} = \begin{bmatrix} v^{(1)} \\ v^{(2)} \end{bmatrix}$$

$$(t^{(1)})^T (N^{(1)})^T N^{(2)} t^{(2)} = 0$$

Defining $$t \equiv \begin{bmatrix} t^{(1)} \\ t^{(2)} \end{bmatrix}, I \equiv \begin{bmatrix} \tilde{w}^{(1)} I^{(1)} & 0 \\ 0 & \tilde{w}^{(2)} I^{(2)} \end{bmatrix}, A \equiv \begin{bmatrix} 0 & (N^{(1)})^T N^{(2)} \\ (N^{(2)})^T N^{(1)} & 0 \end{bmatrix}$$

The KKT equations may be written as $$M(\mu)t = v \text{ and } t^T A t = 0$$

where $M(\mu)t = I + \mu A$. Solutions to these equations may be found as follows.

If $M(\mu)$ is not singular, then it is unlikely that $t = M^{-1}(\mu)v$ satisfies the orthogonality constraint $<M^{-1}(\mu)v, AM^{-1}(\mu)v> = 0$. Thus, to solve the KKT equations, it may be necessary to set $\mu$ to make $M(\mu)$ singular so that $t = M(\mu)^+ v + V\tau$, where $M^+$ is the Moore-Penrose inverse of M and V is a basis for the null space of $M(\mu)$. This way, there is likely to be sufficient freedom to set $\tau$ to maintain orthogonality. Note that $\mu^* = \sqrt{\tilde{w}^{(1)}\tilde{w}^{(2)}}$ makes $M(\mu)$ singular as:

$$M(\mu^*) \equiv \begin{bmatrix} \sqrt{\tilde{w}^{(1)}}(N^{(1)})^T \\ \sqrt{\tilde{w}^{(2)}}(N^{(2)})^T \end{bmatrix}\begin{bmatrix} \sqrt{\tilde{w}^{(1)}} N^{(1)} & \sqrt{\tilde{w}^{(2)}} N^{(2)} \end{bmatrix} \equiv \hat{A}^T \hat{A}$$

$\hat{A} = [\sqrt{\tilde{w}^{(1)}} N^{(1)} \sqrt{\tilde{w}^{(2)}} N^{(2)}]$. In some instances, $t = v_{\mu^*} + V\tau$ where $v_{\mu^*} = M^+(\mu^*)v$ where V is a basis for the null space. The coefficients $\tau$ may be set by requiring that the last orthogonality equation be solved:

$$\tau^T V^T A V \tau + 2 v_{\mu^*}^T A V \tau + v_{\mu^*}^T A v_{\mu^*} = 0$$

but $AV = (M(\mu^*)V - IV)/\mu^* = -IV/\mu^*$, so that $$\tau^T V^T I V \tau + 2 v_{\mu^*}^T I V \tau = \mu^* v_{\mu^*}^T A v_{\mu^*}$$

$$(V\tau + v_{\mu^*})^T I (V\tau + v_{\mu^*}) = v_{\mu^*}^T M(\mu^*) v_{\mu^*} = v^T M^+(\mu^*) M = \langle v, v_{\mu^*}\rangle$$

This last equation may be solved by finding a vector r on the ellipsoid $r^T I r = \langle v, v_{\mu^*}\rangle$ and setting $\tau = V^*(r - v_{\mu^*})$★ Substituting in for t, it follows that $t = (I - VV^T)v_{\mu^*} + VV^T r$.

An exemplary procedure for a more-than-two-column update is now described. This may be accomplished by, for example, extending the two-column update based on the KKT conditions to optimize for larger numbers of columns. As an example, consider the KKT equations for 3 columns (variables), two of which neighbor a central variable. If the two neighbors of the central variable are not neighbors of each other, then a single multiplier may need to be introduced. In this case the KKT equations are:

$$\begin{bmatrix} \tilde{w}^{(1)} I^{(1)} & \tilde{w}^{(1,2)}(N^{(1)})^T N^{(2)} & \mu(N^{(1)})^T N^{(3)} \\ \tilde{w}^{(1,2)}(N^{(2)})^T N^{(1)} & \tilde{w}^{(2)} I^{(2)} & \tilde{w}^{(2,3)}(N^{(2)})^T N^{(3)} \\ \mu(N^{(3)})^T N^{(1)} & \tilde{w}^{(2,3)}(N^{(3)})^T N^{(2)} & \tilde{w}^{(3)} I^{(3)} \end{bmatrix}\begin{bmatrix} t^{(1)} \\ t^{(2)} \\ t^{(3)} \end{bmatrix} = \begin{bmatrix} v^{(1)} \\ v^{(2)} \\ v^{(3)} \end{bmatrix}$$

$$(t^{(1)})^T (N^{(1)})^T N^{(3)} t^{(3)} = 0$$

where (2) denotes the central spin and (1) and (3) are the neighbors of (2) which are not neighbors of each other. In this case, $$I = \begin{bmatrix} \tilde{w}^{(1)} I^{(1)} & \tilde{w}^{(1,2)}(N^{(1)})^T N^{(2)} & 0 \\ \tilde{w}^{(1,2)}(N^{(2)})^T N^{(1)} & \tilde{w}^{(2)} I^{(2)} & \tilde{w}^{(2,3)}(N^{(2)})^T N^{(3)} \\ 0 & \tilde{w}^{(2,3)}(N^{(3)})^T N^{(2)} & \tilde{w}^{(3)} I^{(3)} \end{bmatrix},$$

$$A = \begin{bmatrix} \gamma_{1,1} N^{(1)} & \gamma_{1,2} N^{(2)} & \gamma_{1,3} N^{(3)} \\ \gamma_{1,1} N^{(1)} & \gamma_{2,2} N^{(2)} & \gamma_{2,3} N^{(3)} \end{bmatrix}$$

so that $M(\mu)t = v$ and $t^T A t = 0$, where In this case, determining $\mu$ so that $M(\mu)$ is singular may be less straightforward. However, by defining:

$$\hat{A} = \begin{bmatrix} \gamma_{1,1} N^{(1)} & \gamma_{1,2} N^{(2)} & \gamma_{1,3} N^{(3)} \\ \gamma_{1,1} N^{(1)} & \gamma_{2,2} N^{(2)} & \gamma_{2,3} N^{(3)} \end{bmatrix}$$

it follows that:

$$\hat{A}^T\hat{A} = \begin{bmatrix} (\gamma_{1,1}\gamma_{1,1} + \gamma_{2,1}\gamma_{2,1})I^{(1)} & (\gamma_{1,1}\gamma_{1,2} + \gamma_{2,1}\gamma_{2,2})(N^{(1)})^T N^{(2)} & (\gamma_{1,1}\gamma_{1,3} + \gamma_{2,1}\gamma_{2,3})(N^{(1)})^T N^{(3)} \\ (\gamma_{1,2}\gamma_{1,1} + \gamma_{2,2}\gamma_{2,1})(N^{(2)})^T N^{(1)} & (\gamma_{1,2}\gamma_{1,2} + \gamma_{2,2}\gamma_{2,2})I^{(2)} & (\gamma_{1,2}\gamma_{1,3} + \gamma_{2,2}\gamma_{2,3})(N^{(2)})^T N^{(3)} \\ (\gamma_{1,3}\gamma_{2,2} + \gamma_{2,3}\gamma_{2,1})(N^{(3)})^T N^{(1)} & (\gamma_{1,3}\gamma_{1,2} + \gamma_{2,3}\gamma_{2,2})(N^{(3)})^T N^{(2)} & (\gamma_{1,3}\gamma_{1,3} + \gamma_{2,3}\gamma_{2,3})I^{(3)} \end{bmatrix}$$

Similarly, defining:

$$\Gamma = \begin{bmatrix} \gamma_{1,1} & \gamma_{1,2} & \gamma_{1,3} \\ \gamma_{2,1} & \gamma_{2,2} & \gamma_{2,3} \end{bmatrix}$$

leads to $\hat{A}^T A = M(\mu)$, provided that:

$$\Gamma^T \Gamma = \begin{bmatrix} \tilde{w}^{(1)} & \tilde{w}^{(1,2)} & \mu \\ \tilde{w}^{(1,2)} & \tilde{w}^{(2)} & \tilde{w}^{(2,3)} \\ \mu & \tilde{w}^{(2,3)} & \tilde{w}^{(3)} \end{bmatrix}.$$

Thus, $M(\mu)$ can be made singular by, for example, setting $\mu$ to solve the equation for above, which may be done with the choice:

$$\Gamma = \begin{bmatrix} \sqrt{w^{(1)}}\cos\theta^{(1)} & \sqrt{w^{(2)}}\cos\theta^{(2)} & \sqrt{w^{(3)}}\cos\theta^{(3)} \\ \sqrt{w^{(1)}}\cos\theta^{(1)} & \sqrt{w^{(2)}}\cos\theta^{(2)} & \sqrt{w^{(3)}}\cos\theta^{(3)} \end{bmatrix}$$

where $$\frac{\tilde{w}^{(1,2)}}{\sqrt{\tilde{w}^{(1)}\tilde{w}^{(2)}}} = \cos(\theta^{(1)} - \theta^{(2)}) \text{ and } \frac{\tilde{w}^{(2,3)}}{\sqrt{\tilde{w}^{(2)}\tilde{w}^{(3)}}} = \cos(\theta^{(2)} - \theta^{(3)}).$$

Given any choice for $\theta_*^{(1)}, \theta_*^{(2)}, \theta_*^{(3)}$, satisfying the above two equations, $M(\mu^*)$ can be made singular by setting $\mu^* = \sqrt{\tilde{w}^{(1)}\tilde{w}^{(3)}} \cos(\theta_*^{(1)} - \theta_*^{(3)})$. Knowing $\mu^*$, the singular value decomposition:

$USV^T = \hat{A}$ (from which $M(\mu^*) = VS^TSV^T$)

$USV^T = \hat{A}$ (from which $M(\mu^*) = VS^TSV^T$)

may be used to determine the null space and $t = V_{\mu^*} + V\tau$ where $v_{\mu^*} = M^+(\mu^\star)$. $\tau'$ may then be determined as it was in the 2-column nonneighbor case.

Newton's method may be used. Let $v(\mu)$ be the function giving the eigenvalue of $M(\mu)$ nearest to 0 (this can be obtained with an iterative Lanczos method which may converge quickly given a good starting point. A good starting point is available, for example, using the eigenvector at a nearby $\mu$ obtained at the last Newton step). Solving $v(\mu) = 0$ using Newton's method can be accelerated by, for example, supplying the derivative $\delta_\lambda v(\mu)$ as $<a, Aa>$ where a is the eigenvector corresponding to the eigenvalue nearest to 0. Knowing $\mu^*$ satisfying $v(\mu^*) = 0$, a singular value decomposition of $VSV^T = M(\mu^*)$ may be performed to provide $t = v_{\mu\star} + V\tau$ where $v_{\mu\star} = M^+(\mu^\star)v$. $\tau'$ may then be determined exactly as it was in the two-column update nonneighbors case described above.

Improved reconstruction may be obtained with larger numbers of dictionary atoms (i.e., larger K). In order to satisfy the orthogonality constraints when learning constrained dictionaries with N<K, the input signals may be mapped to a space having dimension of at least K. This mapping may be linear and given as by. The dictionary may then be learned to sparsely represent the mapped $y_i$ by minimizing:

$$\sum_{i=1}^{S} \{\|By_i - Dw_i\|_2^2 + \lambda\langle 1, w_i\rangle\} \text{ subject to } \|B\|_F = 1$$

where the Frobenius norm of B may be fixed to prevent the solution of B=0, D=0, and $\{w_i\}$=0. Block coordinate decent may be used to minimize the objective with respect to B, D and $\{w_i\}$. The B minimization may be relatively straightforward because the objective is quadratic and the constraint is simple. Having learned all parameters, the reconstruction from a known w may be achieved by $y = (B^TB)^{-1}B^TDw$.

In accordance with the present methods, solving a QUBO problem may include an implementation of quantum annealing or adiabatic quantum computation. As previously discussed, a typical adiabatic evolution may be represented by equation 5:

$$H_e = (1-s)H_{In} + sH_f \quad (5)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", PRL 100, 130503 (2008), is to start with an initial Hamiltonian of the form shown in equation 6:

$$H_{In} = -\frac{1}{2}\sum_{i=1}^{n} \Delta_i \sigma_i^x \quad (6)$$

where n represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{n} h_i \sigma_i^z + \sum_{i,j=1}^{n} J_{ij}\sigma_i^z\sigma_j^z\right] \quad (7)$$

where n represents the number of qubits, $\sigma_i^z$ is the Pauli z-matrix for the $i^{th}$ qubit, $h_i$ and $J_{ij}$ are dimensionless local fields coupled into each qubit, and $\epsilon$ is some characteristic energy scale for $H_f$. Here, the $\sigma_i^z$ and $\sigma_i^z\sigma_j^z$ terms are examples of "diagonal" terms. Throughout this specification and the appended claims, the terms "final Hamiltonian" and "problem Hamiltonian" are used interchangeably. In various embodiments of the present methods, a minimization problem is converted to a QUBO, and the QUBO is mapped directly to the problem Hamiltonian in the processor hardware. Hamiltonians such as $H_{In}$ and $H_f$ in equations 6 and 7, respectively, may be physically realized in a variety of different ways. A particular example is realized by an implementation of superconducting qubits.

Figure 1:
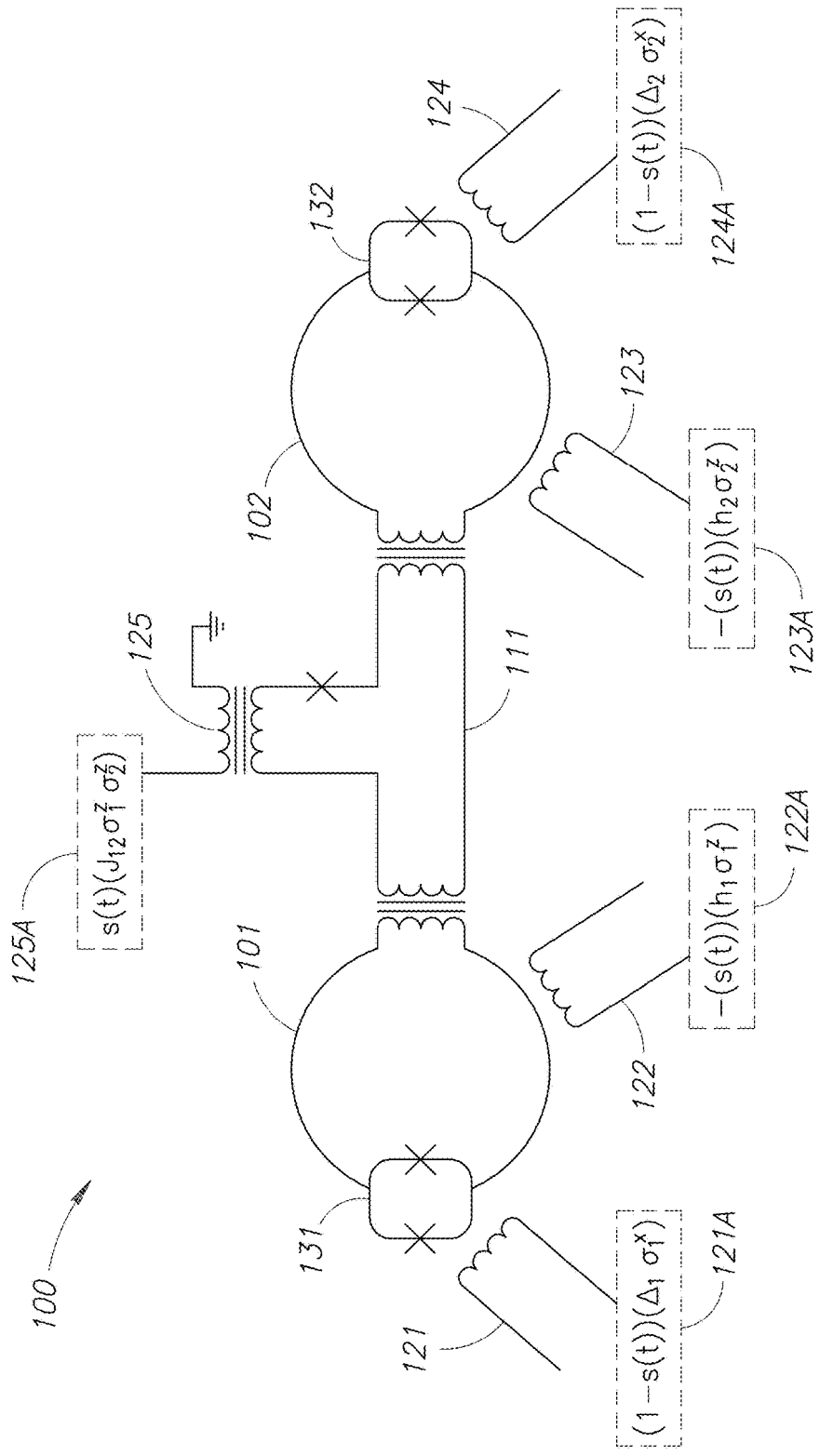
FIG. 1 is a schematic diagram of a portion of a superconducting quantum processor designed for adiabatic quantum computation and/or quantum annealing, in according with at least one embodiment.

FIG. 1 is a schematic diagram of a portion of a superconducting quantum processor 100 designed for AQC (and/or quantum annealing). The portion of superconducting quantum processor 100 shown in FIG. 1 includes two superconducting qubits 101, 102 and a tunable ZZ-coupler 111 coupling information therebetween. While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC by initializing the system with the Hamiltonian described by equation 6 and evolving the system to the Hamiltonian described by equation 7 in accordance with the evolution described by equation 5. In various embodiments of the present methods, determining a low energy state, such as the ground state, of the Hamiltonian described by equation 7 may map directly to a QUBO problem, where the QUBO problem encodes a minimization problem such as the sparse least squares problem. This mapping between the QUBO and the problem Hamiltonian is achieved, at least in part, by the programmable assignments to the parameters in the Hamiltonian described by equation 7. Evolving the quantum processor 100 to determine the ground state of the Hamiltonian described by equation 7 therefore solves the QUBO problem, which effectively solves the minimization problem. Quantum processor 100 includes a plurality of programming interfaces 121-125 that are used to configure and control the state of the quantum processor 100. Each of programming interfaces 121-125 may be realized by a respective inductive coupling structure, as illustrated, that communicates with a programming system (not shown). Such a programming system may be separate from the quantum processor 100, or it may be included locally (i.e., on-chip with quantum processor 100) as described in U.S. Pat. No. 7,876,248 (corresponding to Publication 2008-0215850) and U.S. Pat. No. 8,035,540.

In the operation of the quantum processor 100, programming interfaces 121 and 124 may each be used to couple a flux signal into a respective compound Josephson junction 131 and 132 of qubits 101 and 102, respectively, thereby realizing the $\Delta_i$ terms in the system Hamiltonian. This coupling provides the off-diagonal $\sigma^x$ terms of the Hamiltonian described by equation 6 and these flux signals are examples of "disordering signals." Similarly, programming interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 7. Furthermore, programming interface 125 may be used to couple a flux signal into coupler 111, thereby realizing the $J_{ij}$ terms in the system Hamiltonian. This coupling provides the diagonal $\sigma^z_i \sigma^z_j$ terms of equation 7. In FIG. 1, the contribution of each of programming interfaces 121-125 to the system Hamiltonian is indicated in boxes 121a-125a, respectively.

Throughout this specification and the appended claims, the term "quantum processor" is used to generally describe a collection of qubits (e.g., qubits 101 and 102) and couplers (e.g., coupler 111). The qubits 101 and 102 and the couplers 111 are referred to as the "computational elements" of the quantum processor 100. In the context of a quantum processor, the term "programming subsystem" is used to generally describe the programming elements (e.g., programming interfaces 122, 123, and 125) included in a quantum processor (e.g., processor 100) and other associated control circuitry or instructions. As previously described, the programming elements of the operational subsystem may communicate with a programming system which may be separate from the quantum processor or included locally on the processor. Similarly, in the context of a quantum processor, the term "evolution subsystem" is used to generally describe the evolution elements 121, 124 used to evolve the computational elements of the quantum processor 100. For example, the evolution subsystem may include annealing signal lines and their corresponding interfaces (121, 124) to the qubits (101, 102).

The exemplary quantum processor described in FIG. 1 may be used to minimize the QUBO problem of equation 4 to determine values for the Boolean weights $w_1$ for a given dictionary $D_0$. Using the determined values for the Boolean weights $w_1$, a non-quantum processor may then be used to optimize equation 2 for the dictionary D to produce a new dictionary $D_1$. The exemplary quantum processor described in FIG. 1 may then be used to minimize the QUBO problem of equation 4 to determine values for the Boolean weights $w_2$ for the new dictionary $D_1$, and a non-quantum processor may then use the new Boolean weights $w_2$ to optimize equation 2 to produce a new dictionary $D_2$. This process may continue until some solution criterion is met, such as convergence of the weights $w_i$ and/or dictionary D.

The various embodiments described herein provide methods for using a quantum processor to solve computational problems by employing techniques of compressed sensing. In general, these methods involve successively optimizing an objective (e.g., equation 2), where each successive optimization alternates between optimizing for a first parameter (e.g., a dictionary D) and a second parameter (e.g., Boolean weights $w_i$).

Figure 2:
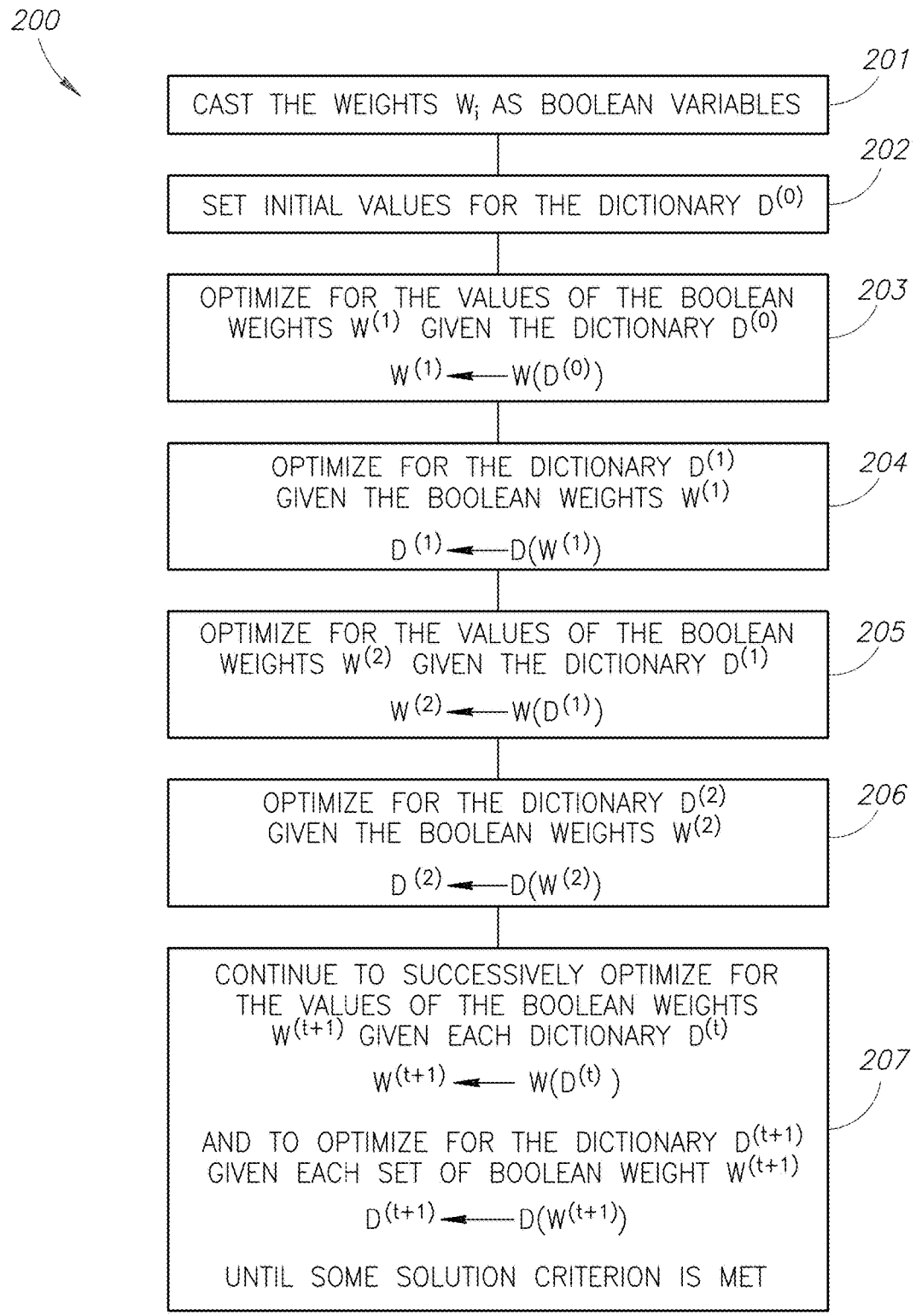
FIG. 2 is a flow diagram showing a method for minimizing an objective, in accordance with at least one embodiment.

FIG. 2 is a flow-diagram showing a method 200 for minimizing the objective given in equation 1. Method 200 includes seven acts 201-207, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 201, the weights $w_i$ in the sparse least squares problem of equation 1 are re-cast as Boolean variables so that equation 1 is mapped to equation 2. Re-casting the weights $w_i$ as Boolean variables enables equation 1 to be mapped to a QUBO problem which is well suited to be optimized using a quantum processor. This mapping may be performed using, for example, a non-quantum processor, such as a digital processor. At 202, initial values for the dictionary D in equation 2 are set. The initial values for the dictionary D correspond to $D_0$. The initial values for the dictionary $D_0$ may, for example, be set randomly, or by guessing based on some knowledge or criteria. At 203, equation 2 is optimized for the values of the Boolean weights $w_i$ that correspond to the initial values for the dictionary $D_0$. This optimization produces initial values for the Boolean weights given by $w_1$ corresponding to the process $w_1 \leftarrow w(D_0)$ and may be achieved, for example, by using a quantum processor to minimize the QUBO problem given by equation 4. At 204, equation 2 is optimized for the dictionary D that corresponds to the initial values for the Boolean weights $w_1$. This optimization produces a second set of values for the dictionary given by $D_1$ corresponding to the process $D_1 \leftarrow D(w_1)$ and may be achieved, for example, by using a non-quantum processor to update the columns of the dictionary according to the procedures for single-column updates, two-column updates, and/or more-than-two-columns updates previously described.

At 205, equation 2 is optimized for the values of the Boolean weights $w_i$ that correspond to the second set of values for the dictionary $D_1$. This optimization produces a second set of values for the Boolean weights given by $w_2$ corresponding to the process $w_2 \leftarrow w(D_1)$ and may be achieved, for example, by using a quantum processor to minimize the QUBO problem given by equation 4. At 206, equation 2 is optimized for the dictionary D that corresponds to the second set of values for the Boolean weights $w_2$. This optimization produces a third set of values for the dictionary given by $D_2$ corresponding to the process $D_2 \leftarrow D(w_2)$ and may be achieved, for example, by using a non-quantum processor to update the columns of the dictionary according to the procedures for single-column updates, two-column updates, and/or more-than-two-columns updates previously described.

At 207, the back-and-forth optimizations described in acts 203-206 are repeated until some solution criterion is met. That is, equation 2 is successively optimized for the values of the Boolean weights $w_{t+1}$ given each dictionary $D_t$ corresponding to the process $w_{t+1} \leftarrow w(D_t)$ using, for example, a quantum processor to minimize equation 4; and for the dictionary $D_{t+1}$ given each set of Boolean weights $w_{t+1}$ corresponding to the process $D_{t+1} \leftarrow D(w_{t+1})$ using, for example, a non-quantum processor to update the columns of the dictionary $D_{t+1}$. This process may be continued until some solution criterion is met, for example, until at least one of the dictionary D or the set of values for the Boolean weights $w_i$ converges.

At 202 in method 200, the optimization procedure effectively begins by setting initial values for the dictionary $D_0$ and using these values, at 203, to optimize for the values of the Boolean weights $w_1$. However, the optimization procedure may also begin by setting initial values for the Boolean weights $w_1$ and using these values to optimize for the dictionary $D_1$.

Figure 3:
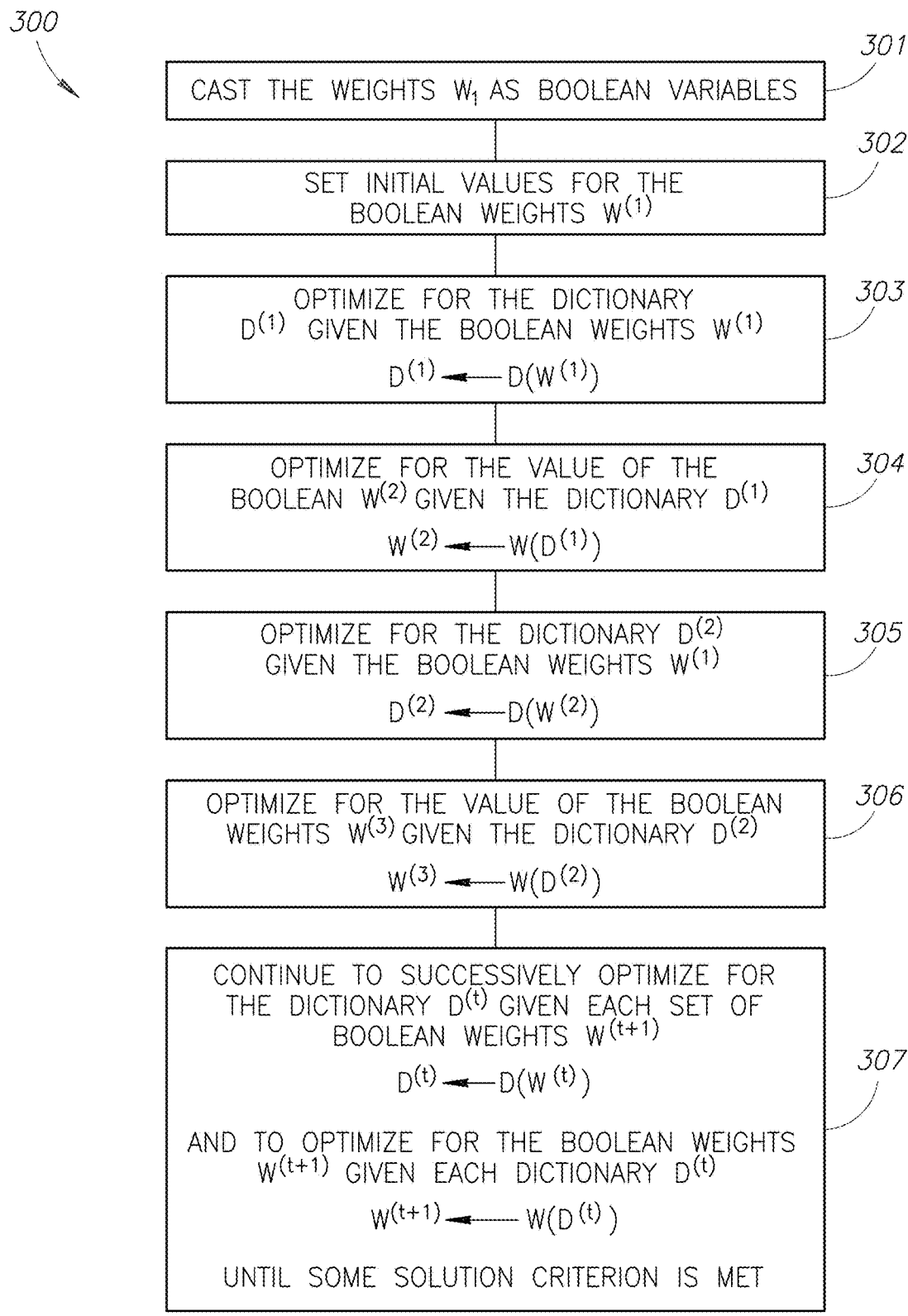
FIG. 3 is a flow diagram showing a method for minimizing an objective, in accordance with at least one embodiment.

FIG. 3 is a flow-diagram of a method 300 for minimizing the objective given in equation 1. Method 300 includes seven acts 301-307, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. Method 300 is substantially similar to method 200 from FIG. 2, except that at 302 of method 300 initial values for the Boolean weights $w_1$ are set, whereas at 202 of method 200 initial values for the dictionary $D_0$ are set. At 302, the initial values for the Boolean weights $w_1$ may be set randomly, or by guessing based on some knowledge or criteria. Method 300 then proceeds through acts 303-307 to successively optimize equation 2 for the dictionary $D_t$ based on the Boolean weights $w_t$ (using, e.g., a non-quantum processor to update the columns of the dictionary) according to the process $D_t \leftarrow D(w_t)$ and for the Boolean weights $w_{t+1}$ based on the dictionary $D_t$ (using, e.g., a quantum processor to minimize the QUBO of equation 4) according to the process $w_{t+1} \leftarrow w(D_t)$ until some solution criterion is met. An exemplary solution criterion is the convergence of the at least one of the dictionary D and the Boolean weights $w_i$.

Throughout this specification, various embodiments of the present methods are described in which a non-quantum processor is used to update at least some of the values for a dictionary in an objective, e.g., in a sparse least squares problem. However, in accordance with the present methods, a quantum processor may be employed to update at least some of the values for a dictionary in an objective, e.g., in a sparse least squares problem. For example, the present methods may include employing a quantum processor to optimize an objective for an $n^{th}$ set of values for a dictionary based on an $(n-1)^{th}$ set of values for the Boolean weights (i.e., acts 204, 206, 207, 303, 305, and 307 may employ a quantum processor to optimize for the dictionary) by applying the systems and methods described in U.S. Provisional Patent Application Ser. No. 61/505,044, filed Jul. 6, 2011 and entitled "Applications of Hardware Boltzmann Fits;" U.S. Provisional Patent Application Ser. No. 61/515,742, filed Aug. 5, 2011 and entitled "Applications of Hardware Boltzmann Fits;" U.S. Provisional Patent Application Ser. No. 61/540,208, filed Sep. 28, 2011 and entitled "Applications of Hardware Boltzmann Fits;" U.S. Provisional Patent Application Ser. No. 61/550,275, filed Oct. 21, 2011 and entitled "Systems and Methods for Minimizing an Objective Function;" and U.S. Provisional Patent Application Ser. No. 61/557,783, filed Nov. 9, 2011 and entitled "Systems and Methods for Minimizing an Objective Function." In accordance with the present methods, a quantum processor may also be employed to optimize an objective (e.g., a non-QUBO formulation of an objective) for an $n_{th}$ et of values for the Boolean weights based on an $(n-1)_{th}$ set of values for the dictionary (i.e., acts 203, 205, 207, 304, 306, and 307 may employ a quantum processor to optimize for the Boolean weights) by applying the systems and methods taught in U.S. Provisional Patent Application Ser. No. 61/505,044, filed Jul. 6, 2011 and entitled "Applications of Hardware Boltzmann Fits;" U.S. Provisional Patent Application Ser. No. 61/515,742, filed Aug. 5, 2011 and entitled "Applications of Hardware Boltzmann Fits;" U.S. Provisional Patent Application Ser. No. 61/540,208, filed Sep. 28, 2011 and entitled "Applications of Hardware Boltzmann Fits;" U.S. Provisional Patent Application Ser. No. 61/550,275, filed Oct. 21, 2011 and entitled "Systems and Methods for Minimizing an Objective Function;" and U.S. Provisional Patent Application Ser. No. 61/557,783, filed Nov. 9, 2011 and entitled "Systems and Methods for Minimizing an Objective Function."

Throughout this specification and the appended claims, the term "non-quantum processor" is used to denote any form of processor or processing system that does not make direct use of quantum phenomena, such as superposition and/or entanglement, in the computation process. Examples of non-quantum processor include classical digital microprocessors (e.g., Intel Pentium® processors such as Intel i7 Quad Core® processors, Intel Atom® processors, ARM Cortex® CPUs), field programmable gate arrays (FPGAs), Application Specific Integrated Circuits (ASICs) or graphical processor units (GPUs, e.g., Nvidia GPUs), and classical analog processors.

Figure 4:
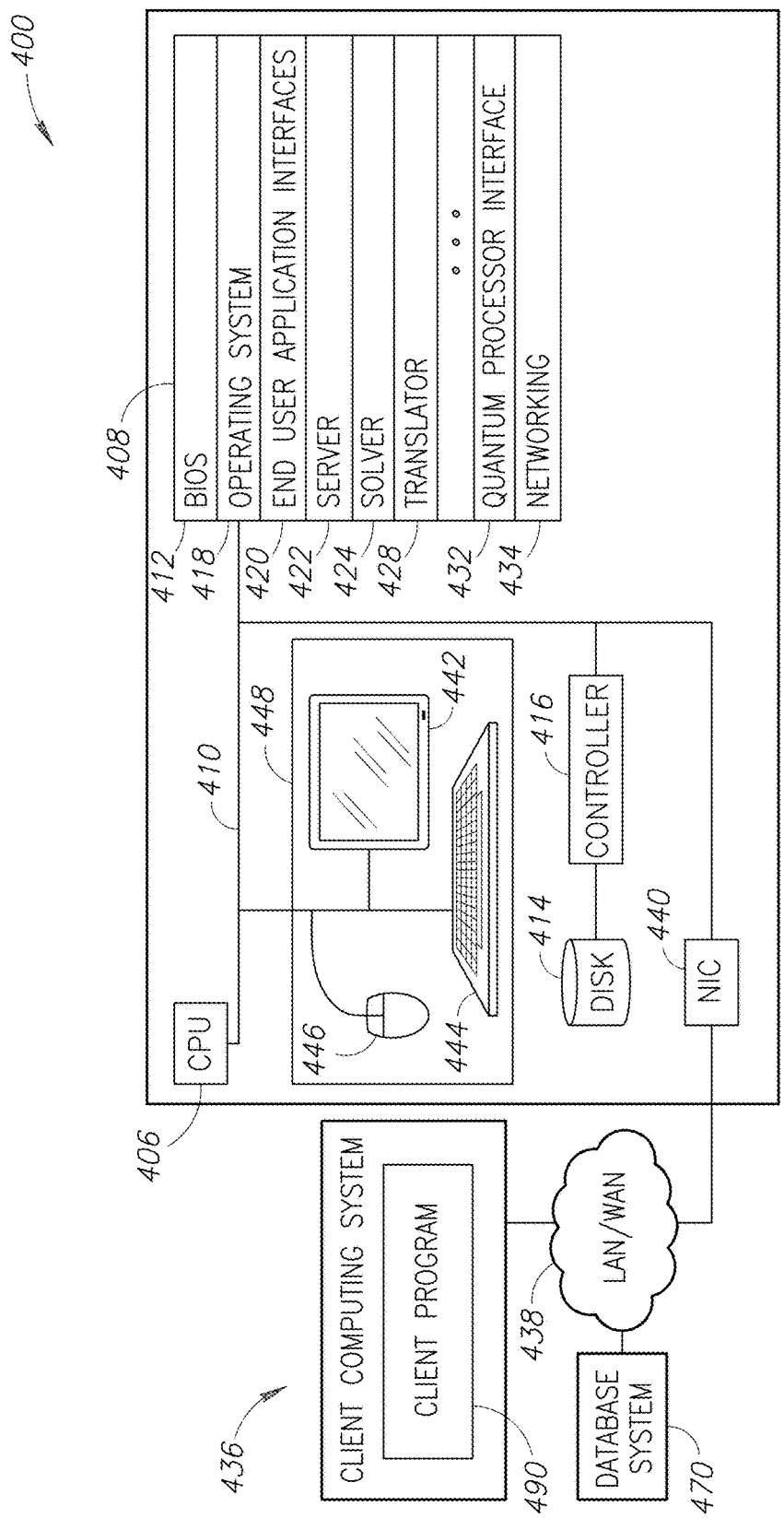
FIG. 4 is a schematic diagram of an exemplary digital computing system including a digital processor that may be used to perform digital processing tasks, in according with at least one embodiment.

FIG. 4 illustrates an exemplary digital computing system 400 including a digital processor 406 that may be used to perform digital processing tasks described in the present methods. Those skilled in the relevant art will appreciate that the present methods can be practiced with other digital computing system configurations, including hand-held devices, multiprocessor systems, microprocessor-based or programmable consumer electronics, personal computers ("PCs"), network PCs, mini-computers, mainframe computers, and the like. The present methods can also be practiced in distributed computing environments, where tasks or modules are performed by remote processing devices, which are linked through a communications network. In a distributed computing environment, program modules may be located in both local and remote memory storage devices.

Digital computing system 400 may include at least one processing unit 406 (i.e., digital processor), at least one system memory 408, and at least one system bus 410 that couples various system components, including system memory 408 to digital processor 406. Digital computing system 400 will at times be referred to in the singular herein, but this is not intended to limit the application to a single digital computing system 400. For example, there may be more than one digital computing system 400 or other classical computing device involved throughout the present methods Digital processor 406 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 4 are of conventional design. As a result, such blocks need not be described in further detail herein, as they will be understood by those skilled in the relevant art.

System bus 410 can employ any known bus structures or architectures, including a memory bus with a memory controller, a peripheral bus, and a local bus. System memory 408 may include read-only memory ("ROM") and random access memory ("RAM") (not shown). A basic input/output system ("BIOS") 412, which can form part of the ROM, contains basic routines that help transfer information between elements within digital computing system 400, such as during startup. Digital computing system 400 may also include non-volatile memory 414.

Non-volatile memory 414 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non20 volatile memory 414 may communicate with digital processor 406 via system bus 410 and may include appropriate interfaces or controllers 416 coupled between non-volatile memory 414 and system bus 410. Non-volatile memory 414 may serve as long-term storage for computer-readable instructions, data structures, program modules and other data for digital computing system 400. Although digital computing system 400 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, RAMs, ROMs, smart cards, etc.

Various program modules, application programs and/or data can be stored in system memory 408. For example, system memory 408 may store an operating system 418, end user application interfaces 420, server applications 422, at least one solver module 424, and a translator module 428. In addition, system memory 408 may store at least one quantum processor interface module 432. The operation and function of these modules are discussed in detail below.

System memory 408 may also include one or more networking applications 434, for example, a Web server application and/or Web client or browser application for permitting digital computing system 400 to exchange data with sources via the Internet, corporate Intranets, or other networks, as well as with other server applications executing on server computers. Networking application 434 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 4 as being stored in system memory 408, operating system 418 and various applications/modules 420, 422, 424, 428, 432, 434 and other data can also be stored in nonvolatile memory 414.

Digital computing system 400 can operate in a networking environment using logical connections to at least one client computing system 436 and at least one database system 470. These logical connections may be formed using any means of digital communication, for example, through a network 438, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computing system 400 may be connected to the LAN through an adapter or network interface card ("NIC") 440 (communicatively linked to system bus 410). When used in a WAN networking environment, digital computing system 400 may include an interface and modem (not shown), or a device such as NIC 440, for establishing communications over the WAN. Non-networked communications may additionally, or alternatively be employed.

In a networked environment, program modules, application programs, data, or portions thereof can be stored outside of digital computing system 400. Those skilled in the relevant art will recognize that the logical connections shown in FIG. 4 are only some examples of establishing communications between computers, and other connections may also be used.

While digital computing system 400 may generally operate automatically, an end user application interface 420 may also be provided such that an operator can interact with digital computing system 400 through different user interfaces 448, including output devices, such as a monitor 442, and input devices, such as a keyboard 444 and a pointing device (e.g., mouse 446). Monitor 442 may be coupled to system bus 410 via a video interface, such as a video adapter (not shown). Digital computing system 400 can also include other output devices, such as speakers, printers, etc. Other input devices can also be used, including a microphone, joystick, scanner, etc. These input devices may be coupled to digital processor 406 via a serial port interface that couples to system bus 410, a parallel port, a game port, a wireless interface, a universal serial bus ("USB") interface, or via other interfaces.

NIC 440 may include appropriate hardware and/or software for interfacing with qubits (e.g., qubits 101 and 102 from FIG. 1) and coupling devices (e.g., coupler 111 from FIG. 1) in a quantum processor (e.g., quantum processor 100). In other embodiments, different hardware may be used to facilitate communications between digital computing system 400 and a quantum processor.

Quantum processor interface module 432 of digital computing system 400 may include run-time instructions for coordinating the solution of computationally complex problems using a quantum processor (e.g., quantum processor 100). For instance, quantum processor interface module 432 may cause a quantum processor to begin solving a QUBO problem that is representative of, or equivalent to, part of a sparse least squares problem received by server application 422. This may include, e.g., setting initial coupling values and local bias values for couplers (e.g., 111) and qubits (e.g., 101, 102), respectively.

Client computing system 436 may comprise any of a variety of computing devices communicatively coupled to digital computing system 400, and may include a client program 490 configured to properly format and send problems directly or indirectly to server application 422. Once digital computing system 400 has determined a solution, server application 422 may be configured to send information indicative of this solution back to client program 490.

Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths available to three other qubits, although in any particular application less than all of those communicative paths may be employed. In a quantum processor employing coupling devices between qubits, this would mean a qubit having a connectivity of three is communicably coupleable via three coupling devices. Traditionally, the number of qubits in a quantum processor limits the size of problems that may be solved and the connectivity between the qubits in a quantum processor limits the complexity of the problems that may be solved.

The various embodiments of employing the techniques of compressed sensing in using a quantum processor to solve computational problems may be applied in a wide range of applications. For example, the minimization of equation 2 (being representative of equation 1) may be used to generate features in any learning problem, such as machine learning applications including pattern recognition, image recognition, applications of artificial intelligence, software verification and validation, and the training of an artificial neural network. Furthermore, compressed sensing techniques may be used in applications directed towards data compression, such as image compression, audio compression, data file compression, and video compression. Thus, the various embodiments described herein provide methods for employing a quantum processor in data compression.

For example, in an application of video compression, the $y_i$ data set (introduced in equation 1 and used throughout this specification) may represent a set of frames (e.g., pixel values, RGB values, etc.) from a video sequence. In other words, $y_1$ may include the pixel values for a first frame of a video sequence, $y_2$ may include the pixel values for a second frame of the video sequence, etc., up to $y_n$, where the video sequence includes n frames. Once the corresponding dictionary elements are learned (e.g., via a quantum processor as described herein), the dictionary itself may be transmitted and transmission of the complete (and typically large) video data may be reduced to transmission of simple bits indicating which basis elements are to be active for each frame.

The techniques of using a quantum processor to perform compressed sensing or processing as described herein may be employed using a data set, for instance a set of image data or an image data set. For example, collected data may be cast as the $y_i$ data set (from equations 1 and 2) and analyzed using a quantum processor employing the compressed sensing or processing techniques described herein. Thus, $y_i$ may, for example include image data indicative of a scene containing one or more objects, or may represent other tangible structures or intangible structures (e.g., characters such as letters and numbers) or physical activities or values. The techniques for solving the sparse least squares problem as described throughout this specification may then be employed to, for example, extract features from the data set (e.g., dictionary values D and/or their corresponding weights $w_i$) and effectively "learn" patterns in the data set and how these patterns correlate with certain stimuli. In this way, classifiers may be developed. A person of skill in the art will appreciate that a digital computer may be incorporated into a system, such as a mechanical or robotic system, and as such the present systems and methods provide techniques for determining, via a quantum processor, improved solutions to the sparse least squares problem that may enable enhanced thought-control over mechanical and/or robotic devices.

Figure 5:
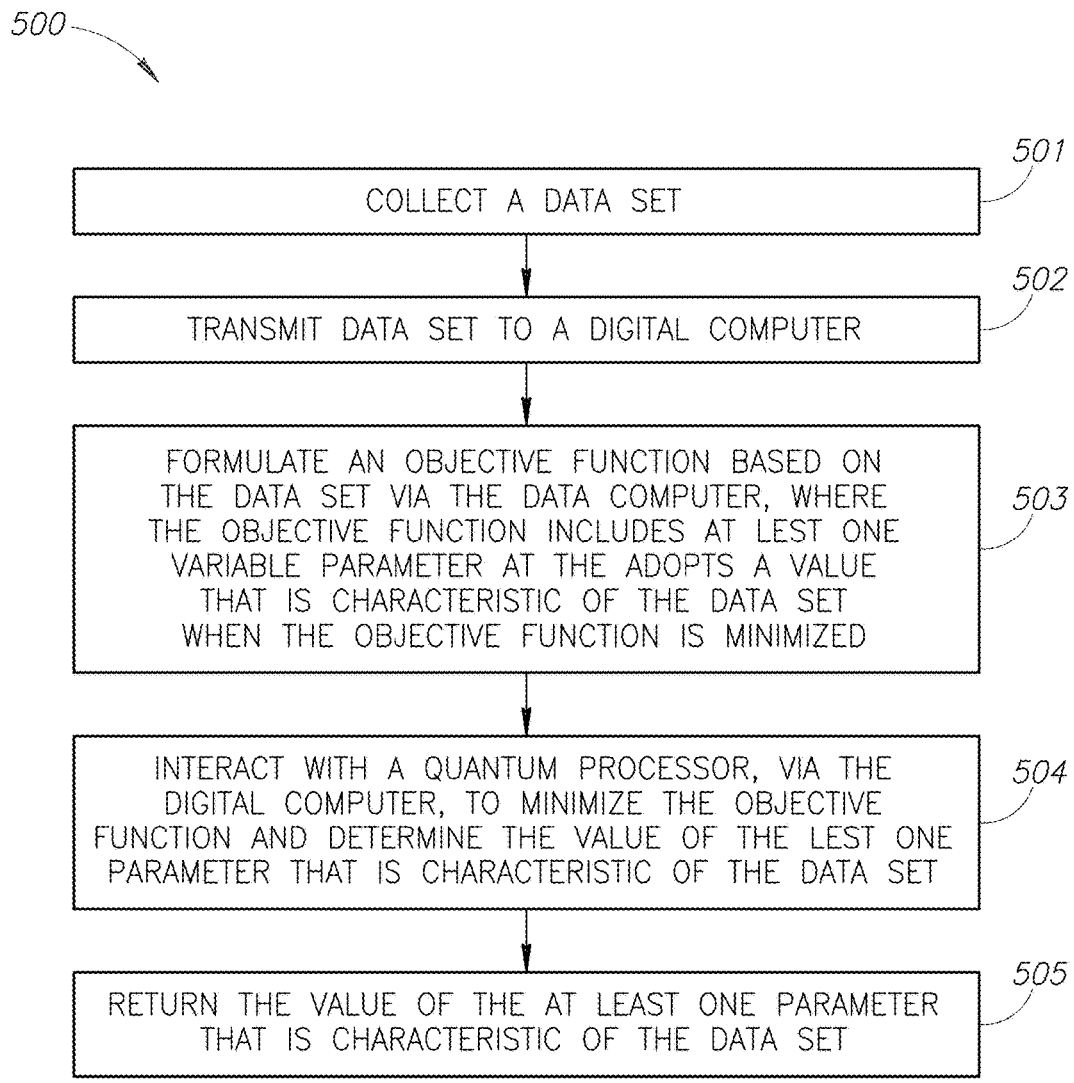
FIG. 5 is a flow diagram showing a method for using a quantum processor to analyze electroencephalographic data, in accordance with at least one embodiment.

FIG. 5 is a flow-diagram showing a method 500 for using a quantum processor to analyze a data set in accordance with the present systems and methods. Method 500 includes five acts 501-505, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 501, the data set is collected. At 502, the data set is transmitted to a digital computer such as, for example, digital computing system 400 from FIG. 4. The at least one parameter may be indicative of a particular feature in the data set, such as a particular pattern representing a physical object or feature or a nonphysical object or activity or signal. At 503, the digital computer is used to formulate an objective function based on the data set, where the objective function includes at least one variable parameter that adopts a value that is characteristic of the data set when the objective function is minimized. For example, the objective function may include a sparse least squares objective (e.g., equation 1 or equation 2) and the at least one parameter may include a dictionary D, a component of a dictionary D, or a corresponding weighting w. At 504, the digital computer is used to interact with a quantum processor (such as quantum processor 100 from FIG. 1) to minimize the objective function and determine the value of the at least one parameter that is characteristic of the data set. Interacting with the quantum processor via the digital computer to minimize the objective function may, for example, employ the various techniques of compressed sensing described herein, including but not limited to methods 200 and/or 300 of FIGS. 2 and 3, respectively. At 505, the value of the at least one parameter that is characteristic of the data set is returned. The value of the at least one parameter that is characteristic of the data set may, for example, include a single dictionary element/vector or a complete dictionary of elements/vectors that facilitate extraction of meaningful information from the data set. For example, minimization of the sparse least squares objective in accordance with the present systems and methods may be used to learn a dictionary capable of extracting user-specified instructions from data set. The dictionary may be returned at 505 of method 500, and subsequently used for some application. For example, the dictionary that is learned by employing a quantum processor to minimize the sparse least squares objective may be transmitted to any appropriate system, such as a mechanical system or a robotic system, to enable that system to extract user-specified instructions from data set. Thus, once the quantum processor has been employed to learn the dictionary, the dictionary itself may be transmitted and other systems may use the dictionary to directly interpret and respond to user-specified instructions without any further need to employ the quantum processor.

Figure 6:
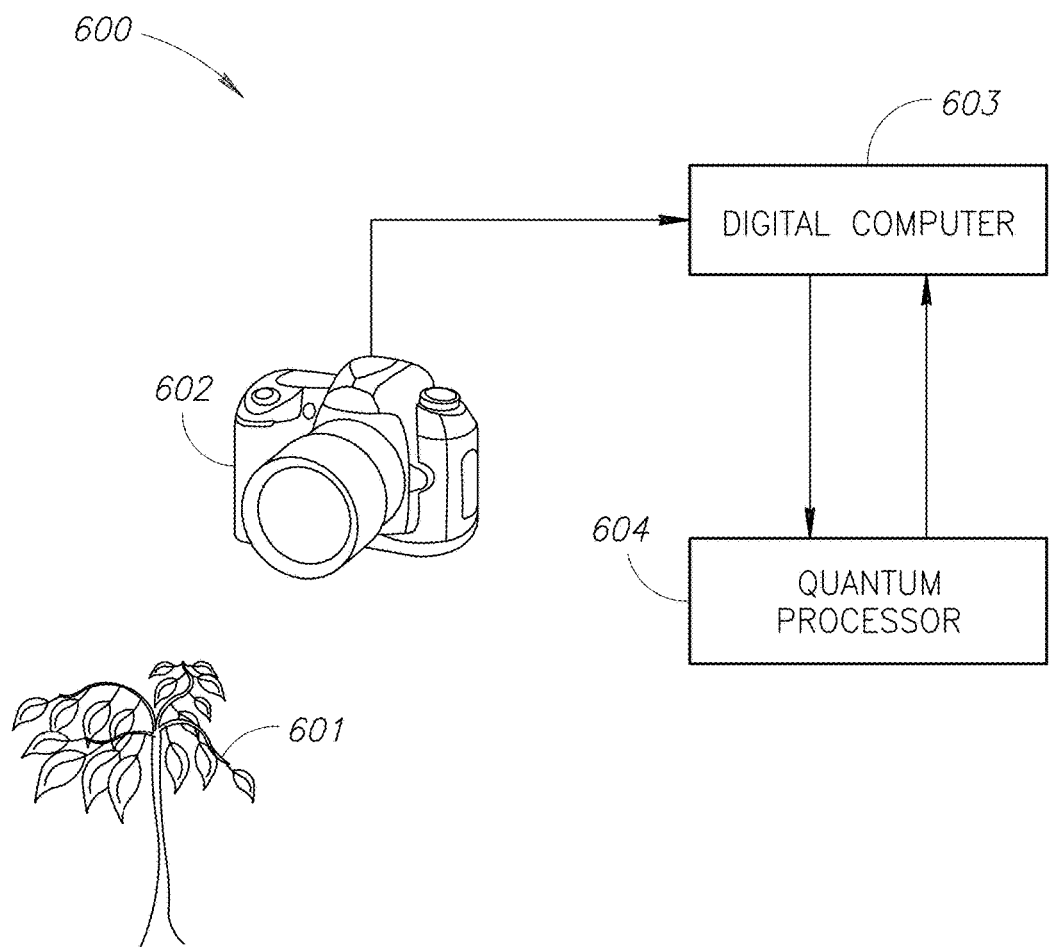
FIG. 6 is an illustrative diagram of a system, in accordance with at least one embodiment.

FIG. 6 is an illustrative diagram of a system 600 in accordance with the present systems and methods. System 600 includes an image camera 602 in communication with a digital computer 603, where the digital computer 603 is also in communication with a quantum processor 604. Image camera 602 may take one or more images of tree 601, and one or more of these images may form the basis for the data set. The data set may be transmitted to digital computer 603 by communicative link, including wireless, Bluetooth, USB, serial, or any other known means of communicative connection. Digital computer 603 may, for example, be substantially similar to digital computer system 400 from FIG. 4. Digital computer 603 is communicatively coupled to quantum processor 604 via any known means of communicative connection. Quantum processor 604 may, for example, be similar to quantum processor 100 from FIG. 1 though preferably employs a larger number of qubits and corresponding coupling devices, such as tens, hundreds, or thousands of qubits and corresponding coupling devices.

The systems and methods for acquiring and analyzing data described above (and illustrated in FIGS. 5 and 6) represent examples of employing a quantum processor to enhance an application of machine learning. In accordance with the present systems and methods, similar techniques may be employed using other forms of data, including media or image data.

1.0 Hierarchical Deep Learning (HDL) Software Framework

The HDL software framework is a Python-based software framework that implements a set of state-of-the-art Hierarchical Deep Learning (HDL) algorithms. These types of algorithms underlie a new wave of approaches for imbuing machines with human-like cognition and intelligence.

The HDL software framework can be used in any context where human-like cognition and intelligence is desirable in an engineered system. Examples include:
  Detection of objects or events in images or video
  Speech recognition and translation
  Intelligent agents in entertainment and games
  Natural language processing and conversation
  Anomaly, fraud and network intrusion detection
  Development of novel medical diagnostic tests
  Development of new types of autonomy for robotic systems Virtually any task that is currently done uniquely well by humans is a potential application for The HDL software framework.

HDL algorithms seek to discover small numbers of repeating patterns in large amounts of unlabeled raw data. These repeating patterns then become "building blocks" that the algorithm uses to understand the data. Instead of handling and processing raw data, the algorithm handles and processes a representation of which is built up by combining the patterns it has learned. This representation, referred to as a reconstruction, "mimics" the objects in the original raw data stream, but focuses attention on patterns in the raw data that re-occur many times (and are therefore implicitly assumed to be important).

This procedure provides a mechanism for understanding how biological systems (including ourselves) are able to make sense of the torrent of information to which they are constantly exposed. If a person is asked what they see in an image, picture or other media illustrating a tiger, they will, within a fraction of a second, be able to respond that they see a tiger. This is an amazing feat—$10^{17}$ photons per second are striking the person's retinas, and somehow from this vast ocean of information they quickly extract a key feature of the image.

This type of understanding of visual data can be explained within the HDL framework by assuming that, over the years since a person's birth, they have learned multiple "maximally repeating patterns" from their environment. Some of these are very low level—analogous to edge detectors—and some are very high level, even abstract concepts—such as tigers—that are "built up" from lower level concepts.

In this framework, what we "see" is not the raw photonic data—the volume of which is overwhelming and most of which is not interesting to humans—but a reconstruction the mind makes by piecing together patterns to make sense of the world. Human intuition that what we see is "really there" is false in this framework. The picture that develops in the human mind is a reconstruction based on piecing together the patterns that re-occur often in the data we have already seen. People then reason based on these reconstructions, not on the "reality" of the data impinging on the senses.

An interesting aspect of these algorithms is that they can be agnostic to the type of raw data they are fed. Thus procedures can be applied equally to any data type, or hybrids of data types. In addition to image and video data, audio, haptic, EEG, genomic, text, or any other type of data, can be processed in a similar way.

1.1 The HDL Software Framework

The HDL software framework is a Python framework for hierarchical semi-supervised deep feature learning. The framework has the capability to handle multi-modal data, including but not restricted to visual, auditory, haptic, EEG, fMRI, genomic sequences, and/or text labels. The algorithms embodied learn a hierarchical set of features in a semi-supervised setting, where features that are higher up in the hierarchy are capable of representing more abstract patterns in the data. The procedure used to learn features at each level of the hierarchy is called sparse coding.

The hierarchical learning procedure is based on recursively applying the sparse coding procedure to subsequent levels in the hierarchy (the n+1$^{th}$ level is constructed by applying the sparse coding procedure to features learned at the n$^{th}$ level). The software framework allows the user to select between two different types of sparse coding algorithms:

L1-norm sparse coding. This version assumes that a reconstruction can be built from real-valued weighted combinations of features, and the regularization is of the L1-norm form. The algorithms in this case are efficient. The framework allows the user to run in a cloud computing environment, where aspects of the algorithm that can be parallelized are submitted to large numbers (typically tens of thousands) of conventional processors.

L0-norm sparse coding. This version allows reconstructions that are combinations of features where the weights are 0/1 variables, and the regularization is of the L0-norm form. These restrictions lead to different features learned by this variant of the algorithm. The change converts the underlying optimization problems from efficiently solvable convex optimization problems over real variables to NP-hard non-convex optimization problems over binary variables. The framework partitions the core algorithm such that aspects best served by conventional computers can be run either locally or in a cloud computing environment, and the core combinatorial optimization problems can be run locally using software solvers, on the cloud using software solvers, or run on quantum hardware.

The HDL software framework contains visualization and user interface tools to help users understand the flow of information through the system, in order to understand how the machine intelligence "understands" the input data it has been shown.

2.0 L0-Norm Sparse Coding Discussion

The hardness of L0-norm sparse coding can be reduced to the solution of a large number of QUBOs of the form:

Find $\vec{w}$ that minimizes $$G(\vec{w};\lambda) \Sigma_{j=1}^{K} w_j [\lambda \vec{d}_j \cdot (\vec{d}_j - 2\vec{z})] + 2\Sigma_{j<m}^{K} w_j w_m \vec{d}_j \cdot \vec{d}_m.$$

This form has advantages (for example, for getting a maximally sparse encoding of MNIST) over the more typical L1-norm version of sparse coding.

A variant of tabu search was used to solve these QUBOs. Following are two hardware-focused strategies for improvement over tabu.

The terms in the QUBO that connect variables j and m are proportional to the dot product of the $j^{th}$ and $m^{th}$ dictionary atoms $\vec{d}_j$ and $\vec{d}_m$. Because restrictions have not been added on what these atoms need to look like, these dot products can all be non-zero (the dictionary atoms do not need to be, and in general will not be, orthogonal). This means that the problems generated by the procedure are all fully connected—each variable is influenced by every other variable.

Unfortunately, when a physical quantum computing chip is built, this full connectivity may not be achieved or is difficult to accomplish. The quantum computing chip may connect any given variable with only a relatively small number of other variables.

There are at least two ways to get around the mismatch of the connectivity of a problem to solve, and the connectivity of the hardware. The first is called embedding, and the second is by using the hardware to perform a type of large neighborhood local search as a component of a hybrid algorithm referred to herein a "BlackBox."

Solving Problems by Embedding

In a quantum computer, qubits are physically connected to only some of the other qubits. For example, in some implementations each qubit is connected to at most 6 other qubits in a specific pattern referred to herein as a Chimera graph. In D-Wave's Rainier chip (D-Wave Systems Inc.), there were 128 qubits. In another D-Wave processor, named Vesuvius, there are 512 qubits.

Chimera graphs are a way to use a regular repeating pattern to tile out a processor. In the aforementioned Rainier chip, the processor graph was a four by four tiling of an eight qubit unit cell. For Vesuvius, the same unit cell was used, but with an eight by eight tiling.

An embedding is a map from the variables of the problem to be solved to the physical qubits in a processor, where the map can be one-to-many (each variable can be mapped to many physical qubits). To preserve the problem structure, qubits corresponding to the same variable are strongly "locked together."

In the case of fully connected QUBOs like the ones here, one can embed a fully connected graph with K vertices into a Chimera graph with $(K-1)^2/2$ physical qubits—the 128 qubit quantum processor can embed a fully connected 17 variable graph, while the 512 qubit quantum processor can embed a fully connected 33 variable graph. Shown in FIGS. 34A-B is an embedding into the 128 qubit processor for solving a problem that computes Ramsey numbers. The processor graph where qubits colored the same represent the same computational variable.

So one way to use the 512 qubit quantum processor to solve the sparse coding QUBOs is to restrict K to be 33 or less and embed these problems. However this is unsatisfactory for two (related) reasons. The first is that 33 dictionary atoms typically is not enough for sparse coding on big data sets. The second is that QUBOs generated by the aforementioned procedure are really easy for tabu search at that scale. For problems this small, tabu gives excellent performance with a per problem timeout of about 10 milliseconds (about the same as the runtime for a single problem on the 512 qubit quantum processor), and since it can be run in the cloud, the tabu approach can take advantage of massive parallelism as well. So even though on a problem by problem basis, the 512 qubit quantum processor is competitive at this scale, when you gang up for instance 1,000 cores against it, the 512 qubit quantum processor loses, because there are not a thousand quantum processors available for processing.

Solving Sparse Coding QUBOs Using BlackBox

BlackBox is an algorithm developed at D-Wave Systems Inc. Below is a high level introduction to how it works. BlackBox is designed to solve problems where all that is given is a black box that converts possible answers to binary optimization problems into real numbers denoting how good those possible answers are. For example, the configuration of an airplane wing could be specified as a bit string, and to know how "good" that configuration was, might require actually constructing that example and putting it in a wind tunnel for measurement. Or maybe just performing a large-scale supercomputer simulation is sufficient. But the relationship between the settings of the binary variables and the quality of the answer in problems like this is not easily specified in a closed form, like is possible with the sparse coding QUBOs.

BlackBox is based on tabu search, but uses the hardware to generate a model of the objective function around each search point that expands possibilities for next moves beyond single bit flips. This modelling and sampling from hardware at each tabu step increases the time per step, but decreases the number of steps required to reach some target value of the objective function. As the cost of evaluating the objective function goes up, the gain in making fewer "steps" by making better moves at each tabu step goes up. However if the objective function can be very quickly evaluated, tabu generally outperforms BlackBox because tabu can make many more guesses per unit time due to the additional cost of the BlackBox modeling and hardware sampling step.

BlackBox can be applied to arbitrary sized fully connected QUBOs, and because of this is better than embedding because the restriction to small numbers of dictionary atoms is removed. With BlackBox any size problem can be tried.

BlackBox on the 512 qubit quantum processor is not competitive with cloud-enabled tabu search for any of the problem sizes tried (which were, admittedly, still pretty small—up to 50 variables). This may continue to hold, no matter how large these problems get, for the following reasons:

1. The inherently parallel nature of the sparse coding problem (S independent QUBOs) means a comparison between multiple cores and a small number of the 512 qubit quantum processors. This factor can be significant—for a large problem with millions of data objects, this factor can easily be in the thousands or tens of thousands.

2. BlackBox is designed for objective functions that are really black boxes, so that there is no obvious way to attack the structure of the problem directly, and where it is very expensive to evaluate the objective function. This is not the case for these problems—they are QUBOs and this means that attacks can be made directly based on this known fact. For these problems, the current version of BlackBox, while it can certainly be used, is not in its most efficient sweet spot (i.e., and would not be expected to be generally competitive with tabu in the cloud.

And this is exactly what is found—BlackBox on the 512 qubit quantum processor is not competitive with tabu on the cloud for any of the problem sizes tried. Note that there is a small caveat here—it is possible that for very large numbers of atoms (say low thousands) this could change, and BlackBox would be more competitive.

If it is possible to restrict the problems generated by sparse coding so that they exactly fit in hardware, so that we require the problems generated to exactly match the hardware graph, the quantum processor may be able to beat the classical processors, as the 512 qubit quantum processor is many orders of magnitude faster than anything that exists on Earth for the native problems it is solving.

An underlying issue using the quantum hardware to compete with tabu on the cloud was the mismatch of the connectivity of the problems sparse coding generates (which are fully connected) and the connectivity of the quantum hardware.

The source of this mismatch is the quadratic term in the objective function, which for the $j^{th}$ and $m^{th}$ variables is proportional to $\vec{d}_j \cdot \vec{d}_m$. The coupling terms are proportional to the dot product of the dictionary atoms.

In some implementations we demand that $\vec{d}_j \cdot \vec{d}_m$ has to be zero for all pairs of variables j and m that are not connected in hardware. If we achieve this structure in the dictionary, we get a very interesting result. Instead of being fully connected, the QUBOs with this restriction can be engineered to exactly match the underlying problem the hardware solves. If we can do this, we get closer to using the full power of the quantum hardware.

L0-Norm Sparse Coding with Structured Dictionaries

Given:

1. A set of S data objects $\vec{z}_s$, where each $\vec{z}_s$ is a real valued vector with N components;

2. An N×K real valued matrix $\hat{D}$, where K is the number of dictionary atoms we choose, and we define its $k^{th}$ column to be the vector $\vec{d}_k$;

3. A K×S binary valued matrix $\hat{W}$;

4. And a real number λ which is called the regularization parameter, find $\hat{W}$ and $\hat{D}$ that minimize $$G(\hat{W},\hat{D};\lambda) = \Sigma_{s=1}^S \|\vec{z}_s - \Sigma_{k=1}^K w_{ks}\vec{d}_k\|^2 + \lambda \Sigma_{s=1}^S \Sigma_{k=1}^K w_{ks}$$

subject to the constraints that $\vec{d}_j \cdot \vec{d}_m = 0$ for all pairs j,m that are not connected in the quantum chip being used.

The difference here is a set of constraints on the dictionary atoms is added.

Solving the Sparse Coding Problem Using Block Coordinate Descent

It may be desirable to use the following strategy in aspects and embodiments:

1. First, generate a random dictionary $\hat{D}$, subject to meeting the orthogonality constraints imposed on the dictionary atoms.

2. Assuming these fixed dictionaries, solve the optimization problem for the dictionary atoms $\hat{W}$. These optimization problems are now Chimera-structured QUBOs that fit exactly onto the hardware by construction.

3. Now fix the weights to these values, and find the optimal dictionary $\hat{D}$, again subject to constraints.

Iterate acts 2 and 3 until G converges to a minimum

This enters a different regime than before—act 2 requires the solution of a large number of chimera-structured QUBOs, not fully connected QUBOs. So that makes those problems better fits to the quantum hardware. But now some new things are required to allow for both acts 1 and 3, and these initially have some cost.

Setting Up an Initial Random Dictionary that Obeys Constraints

There is an interesting result in a paper titled L. Lovasz, M. Saks, and A. Schrijver. Orthogonal representations and connectivity of graphs. Linear Algebra and its Applications, 114:439-454, 1989. Below is a short explanation of the result.

Imagine a graph on V vertices. In that graph, each vertex is connected to a bunch of others. Call p the number corresponding to the connectivity of the least connected variable in the graph. The aforementioned paper proves that a set of real vectors in dimension V−p can be defined where non-adjacent nodes in the graph can be assigned orthogonal vectors.

So the goal—find a random dictionary $\hat{D}$ such that $\vec{d}_j \cdot \vec{d}_m = 0$ for all k,m not connected in quantum hardware—can be done if the length of the vectors $\vec{d}$ is greater than V−p.

For the 512 qubit quantum processor, the number V is 512, and the lowest connectivity node in a Chimera graph is p=5. So as long as the dimension of the dictionary atoms is greater than 512−5=507, step 1 above can always be performed.

Here is a little more color on this very interesting result

Imagine identifying two vectors $\vec{g}$ and $\vec{h}$ that are orthogonal (i.e., the dot product $\vec{g} \cdot \vec{h}$ is zero). What is the minimum dimension these vectors have to live in such that this can be done? Well imagine that they both live in one dimension—they are just numbers on a line. Then clearly you cannot do it. However if you have two dimensions, you can. Here is an example: $\vec{g}=\hat{x}$ and $\vec{h}=\hat{y}$. If there are more than two dimensions, it can be done also, and the choices made in this case are not unique.

More generally, if the question "how many orthogonal vectors can I draw in an V-dimensional space?" is asked, the answer is V—one vector per dimension. So that is a key piece of the above result. If we had a graph with V vertices where NONE of the vertices were connected to any others (minimum vertex connectivity p=0), and want to assign vectors to each vertex such that all of these vectors are orthogonal to all the others, that is equivalent to asking "given a V-dimensional space, what is the minimum dimension of a set of vectors such that they are all orthogonal to each other?", and the answer is V.

Now imagine drawing edges between some of the vertices in the graph, and not requiring that the vectors living on these vertices be orthogonal. Conceptually, this can be thought of as relaxing some constraints, and making it "easier" to find the desired set of vectors—so the minimum dimension of the vectors required so that this will work is reduced as the graph gets more connected. The fascinating result here is the very simple way this works. Just find the lowest connectivity node in the graph, call its connectivity p, and then ask "given a graph on V vertices, where the minimum connectivity vertex has connectivity p, what is the minimum dimension of a set of vectors such that non-connected vertices in the graph are all assigned orthogonal vectors?" The answer is V–p.

Null Space

Below is an example of a constructive procedure to do step 1:

1. Generate a matrix $\hat{D}$ where all entries are random numbers between +1 and –1.
2. Renormalize each column such that each column's norm is one.
3. For each column in $\hat{D}$ from the leftmost to the rightmost in order, compute the null space of that column, and then replace that column with a random column written in the null space basis.

This process will yield an initial random orthonormal basis as required in the new procedure.

Below is some Python code for computing a null space basis for a matrix $\hat{A}$:

```
import numpy
from scipy.linalg import qr
def nullspace_qr(A):
    A=numpy.atleast_2d(A)
    Q, R=qr(A.T)
    ns=Q[:, R.shape[1]:].conj( )
    return ns
```

As discussed above, an issue may arise in using quantum processor architectures effectively—the mismatch between the connectivity of the problem we want to solve and the connectivity of the quantum hardware.

Given:

1. A set of S data objects $\vec{z}_s$, where each $\vec{z}_s$ is a real valued vector with N components;
2. An N×K real valued matrix $\hat{D}$, where K is the number of dictionary atoms we choose, and we define its $k^{th}$ column to be the vector $\vec{d}_k$;
3. A K×S binary valued matrix $\hat{W}$, whose matrix elements are $w_{ks}$;
4. And a real number $\lambda$, which is called the regularization parameter, Find $\hat{W}$ and $\hat{D}$ that minimize $$G(\hat{W},\hat{D};\lambda) = \Sigma_{s=1}^{S}\|\vec{z}_s - \Sigma_{k=1}^{K} w_{ks}\vec{d}_k\|^2 + \lambda\Sigma_{s=1}^{S}\Sigma_{k=1}^{K} w_{ks}$$

subject to the constraints that $\vec{d}_j \cdot \vec{d}_m = 0$ for all pairs j,m that are not connected in the quantum chip being used.

To solve this problem, we use block coordinate descent, which works like this:

1. First, generate a random dictionary $\hat{D}$, subject to meeting the orthogonality constraints imposed on the dictionary atoms.
2. Assuming these fixed dictionaries, solve the optimization problem for the dictionary atoms $\hat{W}$. These optimization problems are now Chimera-structured QUBOs that fit exactly onto the quantum hardware by construction.
3. Fix the weights to these values, and find the optimal dictionary $\hat{D}$, again subject to the constraints.

Steps 2 and 3 are iterated until G converges to a minimum (or some criteria), keeping in mind that this problem is jointly non-convex and the minimum will be a local minimum. Each restart of the whole algorithm from a new standing point will lead to a different local minimum, so a better answer can be had by running this procedure several times.

Step 3: Finding an Optimal Structured Dictionary Given Fixed Weights

The hard problem is Step 3 above. Here the weights $\hat{W}$ are fixed, and the goal is to find an optimal structured dictionary. Here is the formal statement of the problem.

Given:

1. An N×S real valued matrix $\hat{Z}$, where S is the number of data objects, and we define the $s^{th}$ column to be the $s^{th}$ data object $\vec{z}_s$, where each $\vec{Z}_s$ is a real valued vector with N components, and the matrix elements of $\hat{Z}$ are $z_{ns}$;
2. An N×K real valued matrix $\hat{D}$, where K is the number of dictionary atoms we choose, and we define its $k^{th}$ column to be the vector $\vec{d}_k$, and the matrix elements of $\hat{D}$ are $d_{nk}$;
3. And a K×S binary valued matrix $\hat{W}$ with matrix elements $w_{ks}$;

Find $\hat{D}$ that minimizes $$G^*(\hat{D}) = \sum_{s=1}^{S} \left\| \vec{z}_s - \sum_{k=1}^{K} w_{ks}\vec{d}_k \right\|^2$$

$$= \sum_{s=1}^{S}\sum_{n=1}^{N} \left( z_{ns} - \sum_{k=1}^{K} w_{ks}d_{nk} \right)^2$$

$$= \|\hat{Z} - \hat{D}\hat{W}\|^2$$

$$= Tr(\hat{A}^T\hat{A})$$

where $\hat{A}=\hat{Z}-\hat{D}\hat{W}$, subject to the constraints that $\vec{d}_j \cdot \vec{d}_m = 0$ for all pairs j,m that are not connected in the quantum chip being used.

What makes this problem hard is that the constraints on the dictionary atoms are non-linear, and there are a lot of them (one for each pair of variables not connected in hardware).

It may be advantageous to be operating in the regime where $\hat{W}$ is sparse. In this limit most of the $w_{ks}$ will be zero. Because the coupling term is quadratic in $\hat{W}$'s matrix elements, for all L0-norm sparse coding problems most of the coupling terms are going to be zero. This suggests a possible strategy to first solve for $\hat{D}$ assuming that the quadratic term was zero, and then next use this as an initial starting point.

There are some types of matrix operations that would not botch-up the structure of the dictionary but would allow parametrization of changes within the allowed space. If we could then optimize over those parameters we could take care of the constraints without having to do any work to enforce them.

There is a local search heuristic to optimize each dictionary atom $\vec{d}_k$ moving from k=1 to k=K in order while keeping the other columns fixed, and just iterating until convergence (need to do some rearranging to ensure the orthogonality is maintained throughout using the null space idea discussed above). This by itself may not be an ideal strategy and may get stuck in local optima.

Below discusses the use of quantum and non-quantum processors for unsupervised feature learning, sparse coding, multiclass classification and multiple label assignment. To this end, a Python software framework that implements the following was developed:

(a) $L_0$-norm and $L_1$-norm sparse coding for learning dictionaries of low-level features in an unsupervised setting (b) A self-taught learning framework for building supervised multiclass classifiers and multiple label assignment protocols (c) A semi-supervised feature learning algorithm ("inpainting"), which builds dictionaries of features defined over multiple types of data (such as image, audio and labels) simultaneously. After features are learned, as yet unseen data is presented with partial information. The data sector present in the as yet unseen data is then optimally reconstructed using the learned features and the "missing" sectors (which can include label information and missing data sectors) are then predicted by the reconstruction. Inpainting can be used for anomaly detection, clustering, regression, multiclass classification, multiple label assignment, or other tasks.

(d) A supervised quantum multiple label assignment ("QMLA") algorithm, designed to be run in quantum hardware (e) A tutorial multiclass classifier test suite built using the MNIST handwritten digits dataset (f) A tutorial multiple label assignment test suite built using the SCENE natural images dataset This framework allows a user to select from a set of hardware, algorithmic and optimization solver options in order to learn features from data and subsequently build multiclass classifiers or multiple label assignment protocols. The software framework allows direct comparisons between different algorithmic and hardware approaches to sparse coding, classification and multiple label assignment, including approaches that use quantum hardware.

The framework includes two test suites for performing and visualizing experiments on the MNIST handwritten digits dataset (an example of multiclass classification) and the SCENE natural images dataset (an example of multiple label assignment).

Description of Activities

Activities divide into three categories.

Implementation of Two Sparse Coding Algorithms

The first is the implementation of two different types of sparse coding algorithms. Sparse coding is a procedure for discovering maximally repeating patterns (also called dictionary atoms) in data, and representing data objects as linear combinations of these patterns. If these patterns feature prominently in the data, it is possible to find a regime where most of the data objects can be reconstructed using only a small number of these patterns.

These are the two types of sparse coding algorithm implemented:

(a) $L_1$-norm sparse coding. This version assumes that a reconstruction can be built from real-valued weighted combinations of features, and the regularization is of the $L_1$-norm form. Algorithms in this case are efficient. The framework allows the user to run in a cloud computing environment, where aspects of the algorithm that can be parallelized are submitted to large numbers (typically thousands) of conventional processors.

(b) $L_0$-norm sparse coding. This version allows reconstructions that are combinations of features where the weights are 0/1 variables, and the regularization is of the $L_0$-norm form. These restrictions may lead to different features learned by this variant of the algorithm. The change converts the underlying optimization problems from efficiently solvable convex optimization problems over real variables to NP-hard non-convex optimization problems over binary variables. The framework partitions the core algorithm such that aspects well served by conventional computers can be run either locally or in a cloud computing environment, and the core combinatorial optimization problems can be run locally using software solvers, on the cloud using software solvers, or run on D-Wave hardware.

The two different types of sparse coding considered here differ. In the first type ($L_1$-norm) data objects are reconstructed using linear combinations of dictionary atoms with real-valued weights. In the second type ($L_0$-norm), data objects are reconstructed using linear combinations of dictionary atoms with binary-valued weights. Shown in FIGS. 7A and 7B are examples of these types of reconstruction, using handwritten digit images from the MNIST dataset for MNIST 6000 training using Feature Sign Search (real value optimization) and tabu (binary valued) optimization, respectively.

Figure 7A:
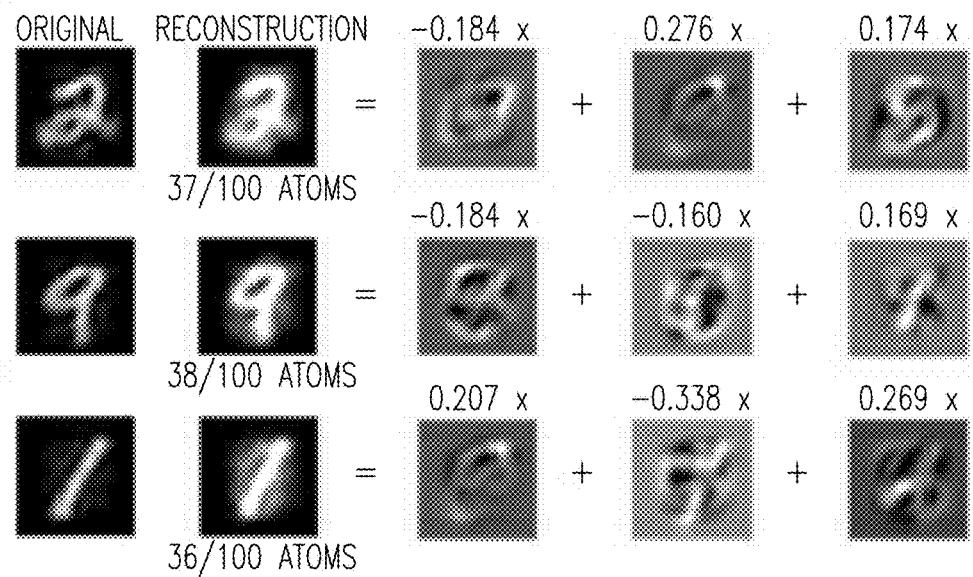
FIG. 7A is screen print showing a first set of images including a real and corresponding reconstructed image, where the first set is reconstructed based on training using Feature Sign Search (FSS) optimization, in accordance with at least one embodiment.
Figure 7B:
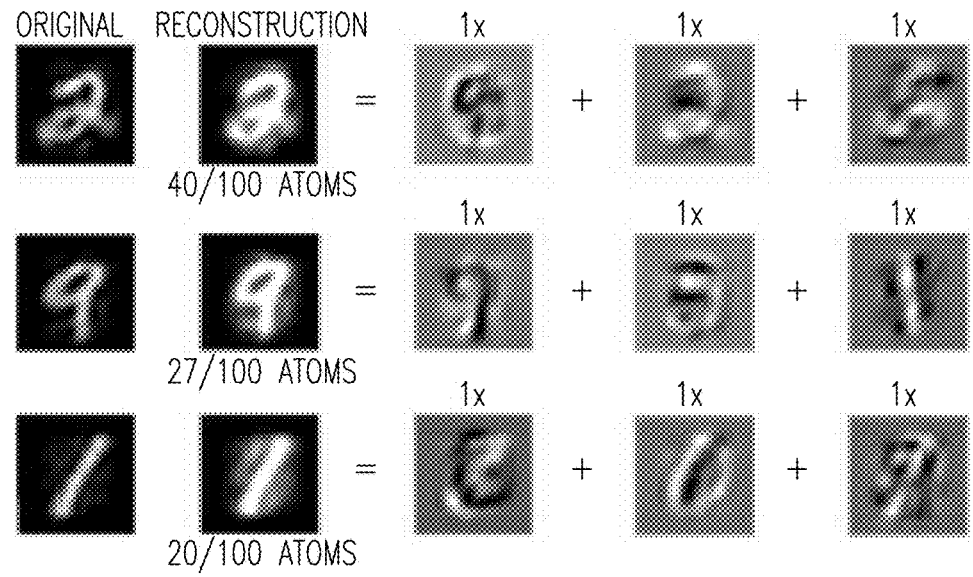
FIG. 7B is screen print showing a second set of images including a real and corresponding reconstructed image, where the second set is reconstructed based on training using Tabu (binary valued) optimization, in accordance with at least one embodiment.

In FIGS. 7A and 7B, sparse coding attempts to discover a small set of patterns (called dictionary atoms) that "maximally repeat" in a set of data. Once these patterns are found, data objects are then seen through the lens of these patterns. FIG. 7A shows reconstructions formed using atoms found using $L_1$-norm sparse coding, showing the top three highest magnitude weight atoms used in the reconstruction. FIG. 7B shows the same thing as FIG. 7A, but with $L_0$-norm sparse coding. In this case, all dictionary atoms included have weight of 1 by definition—three of these are explicitly shown. Note that the sparsity of these reconstructions (the number of atoms used) is low—between 20% and 40% of the atoms are being used. This sparsity is controlled by the regularization parameter λ. The higher this parameter, the sparser the solution will be.

Each of these can be run using a variety of different combinations of optimization solvers and hardware. Shown in Table 1 are the combinations implemented:

TABLE 1

The framework allows for running both types of sparse coding using a variety of optimization algorithms and hardware. Of particular interest here is the relative performance of the $L_0$-norm version versus the $L_1$-norm, and the relative performance of BlackBox run on hardware to the other options for running $L_0$-norm sparse coding

| Sparse Coding Type | Hardware | Solver algorithm |
|---|---|---|
| $L_1$-norm [real weights] | PC, Cloud | FSS |
| $L_0$-norm [binary weights] | PC, Cloud | Tabu, Akmaxsat, Blackbox |
| $L_0$-norm [binary weights] | PC | Cplex |
| $L_0$-norm [binary weights] | 512 qubit quantum processor | BlackBox |

Implementation of Multiclass Classifiers and Multiple Label Assignment Protocols The second activity involves building and testing a variety of ways to automatically assign labels to objects. For images, these labels could be the types of objects in the image (for example, there is/is not a cat in the image). For audio, these could be the presence or absence of a particular human speaker. For video, it could be the presence or absence of a kind of action (running, waving hands, etc.). In each case, this type of recognition is typically easy for humans but difficult to implement in a synthetic system.

The strategies used are based on first learning dictionaries of atoms using sparse coding (this step is unsupervised and the data used in this step is all unlabeled). Once this step is complete, labeled data is encoded using these dictionaries, and then a set of supervised learning algorithms are run on the encoded, labeled data. These include several standard approaches and two new algorithms, the first referred to herein as inpainting, and the second referred to as QMLA (quantum multiple label assignment). The QMLA algorithm is designed specifically for multiple label assignment and may not be used for multiclass classification, whereas inpainting can be used for either. Explicitly, here are the three steps implemented in one or more embodiments:

(a) A dictionary is learned using a sparse coding algorithm on unlabeled data (b) A set of labeled data is then reconstructed using this dictionary (c) This encoded labeled data is then used in a supervised learning setting to produce a desired classifier or label assigner. Procedures implemented include the following: inpainting; QMLA; perceptron; k Nearest Neighbors (kNN); and Linear Support Vector Machine (SVM) with L1 and L2 loss.

Experimental Plan

The third activity involves building two tutorial level test suites using the well-known MNIST and SCENE datasets, performing systematic experiments comparing the performance of a large number of different strategies for assigning labels to objects in these datasets, and preparing a report comprising a full description of the work done and findings.

MNIST Handwritten Digits

This test suite was used to compare a variety of different approaches for building multiclass classifiers. The MNIST test suite provides "out of the box" functionality to run a large number of experiments that allow the performance of different strategies, including the use of quantum computers, to be empirically tested.

MNIST is small, well characterized, and provides a good way to systematically explore the performance of new ideas. MNIST comprises a total of 70,000 28×28 pixel greyscale images of handwritten digits (of which there are 10—all digits from 0 to 9). Typically the task is to use 60,000 of these to build a multiclass classifier (to classify which digit the image represents), and then test the resultant classifier on a test set of 10,000 images.

The test suite allows a user to choose among the ten combinations shown above in Table 1; run these on a selected subset of the available images (ignoring labels); and then visualize the resultant dictionary atoms, reconstructions, and reconstruction errors achieved by each.

After this act, a user may then run the supervised learning procedures (with the exception of QMLA, which is designed for multiple label assignment) on a selected subset of the labeled training data.

The user can then evaluate the performance of the methods tried on the test set, and receive a set of performance figures including precision, recall, F1 score, and classifier sparsity.

SCENE Natural Images

Figure 8:
FIG. 8 is an image on which semi-supervised learning is performed, in accordance with at least one embodiment.

This test suite is used to compare a variety of different approaches for building multiple label assignment (MLA) protocols. MLA differs from multiclass classification in that many labels can be present simultaneously in an object. In the SCENE dataset, objects are natural images, and the labels indicate the presence or absence of six categories ("urban", "mountain", "fall foliage", "beach", "sunset" and "field"). Shown in FIG. 8 is an example image from the SCENE dataset.

The SCENE test suite will provide "out of the box" functionality to run a large number of experiments that allow the performance of different MLA strategies, including the use of both inpainting and QMLA, to be empirically tested.

The SCENE dataset comprises 2,407 images of natural scenes. 1,211 of these are typically used for training and 1,196 for testing. Each image comes with labels indicating the presence or absence of six different categories (fall foliage, urban, beach, sunset, mountain, and field). In FIG. 8, the SCENE dataset comprises 1,211 training and 1,196 test images of natural scenes, which come with labels indicating the presence or absence of six categories ("urban", "mountain", "fall foliage", "beach", "sunset" and "field"). In this image, the labeling is [001001] indicating the presence of "fall foliage" and "field" and the absence of the other four categories.

Implementation Discussion

The semi-supervised feature learning code was rewritten to handle multiple data types. The software architecture for the learning code was developed to effectively integrate with the cloud computing services. The resulting Python module calls both conventional and quantum hardware resources.

Python modules were written that allow the user to build classifiers. The software architecture for the classifiers was developed to effectively integrate with the cloud computing services. The results of the benchmarking work performed enabled the user to effectively partition the core feature learning algorithm such that the aspects best served by a conventional solver were directed accordingly, and the core combinatorial optimization problems were run on the quantum hardware.

The modules written were demonstrated using two prototype test suites that allow users to perform and visualize systematic experiments comparing the performance of a large number of different strategies for assigning labels to objects in two different datasets. One test suite uses the MNIST handwritten digits dataset demonstrating multiclass classification. The other test suite uses the Canadian Institute for Advanced Research (CIFAR) natural image dataset to demonstrate multiple label assignment.

The HDL Software Framework Project

Machine learning is a branch of artificial intelligence. Its central premise is that a machine can be provided with data—for example, email, video, music files, text, seismic data, weather data, medical information and/or images—and can learn to represent this data in ways that allow differences between data objects to be perceived and, in a sense, understood. For example, a machine presented with large numbers of emails could learn that spam has certain attributes that occur with high likelihood, and therefore could learn rules about what constitutes spam without being explicitly told in advance what those rules are.

Unsupervised Feature Learning and Deep Learning

One of the most dramatic changes is the transition from special purpose tools with very narrow applicability—such as spam filters—to architectures that may be able to generalize from one topic to another, like humans do. These new architectures are called deep learning systems.

Deep learning is still new enough that how it will eventually fit within the machine learning ecosystem is not fully understood. Early indications are that deep learning could enable new capabilities that otherwise would be difficult or impossible to build, and could become standard practice for development of any high performance machine learning system. Advances have been seen in a wide range of applications areas including speech recognition and synthesis, recommender systems, image and music recognition, drug discovery, and computational advertising.

Another important change is a transition from supervised to unsupervised methods. Unsupervised feature learning aims to reduce or remove the need for humans to be involved in machine perception and cognition in a way that is inspired by modern understanding of how human brains function.

One of the biggest obstacles to progress in advancing the intelligence of machines is the requirement for providing large numbers of data objects that have been labeled by humans to indicate the content of the object. In the case of the spam detector example, this would mean providing the learning system with large numbers of emails that had been labeled "spam" or "not spam." An unsupervised learning system aims to learn features of incoming data objects without explicitly being told what these might be. This becomes an essential requirement when learning over large amounts of data, as it is simply not possible in many cases for humans to label enough examples to make supervised methods feasible.

Unsupervised feature learning has potential synergies with the deep learning paradigm.

Using Quantum Hardware for Unsupervised Feature Learning and Deep Learning

A quantum computer excels at solving a specific kind of hard optimization problem; in some cases, it is superior to anything else available. The types of problem that quantum computing machines solve can arise in a variety of machine learning algorithms at a fundamental level. The connection between what the quantum computing systems do well, and hard computing problems in machine learning, represents a significant opportunity. If it can be shown that quantum hardware can provide major performance gains on core learning problems, this could drive commercial adoption of the technology.

The HDL software framework described herein has at least two objectives:

(1) test the most promising machine learning ideas that include the quantum hardware; and
(2) implement the best known conventional approaches that would directly compete with these new ideas. Given success at both, directly compare the very best known machine learning procedures using conventional approaches to quantum hardware enabled versions.

The HDL software framework is designed to be able to accomplish both objectives across ideas for how to use the quantum hardware for machine learning.

Sparse Coding Component of HDL Software Framework

A sparse coding component of the HDL software framework was designed to accomplish both objectives for a specific idea for using the quantum hardware. This idea is called L0-norm sparse coding.

Sparse coding is a very interesting type of unsupervised feature learning. Sparse coding finds maximally repeating patterns in data, and this may be achieved with little, limited, or no human intervention. These patterns can then be used to represent the original data (this process is called sparse autoencoding). Sparse coding can be thought of as a building block for more complex machine learning algorithms. For example, it can be naturally used to learn hierarchies of features at multiple scales in data—an example of a deep learning architecture.

To accomplish both of the HDL software framework's objectives, the inventors started with objective (2)—implementing the best conventional competitors. The idea tested combines two non-standard items—one algorithmic and one due to the unusual quantum hardware—and it is important to separate them.

The first is the L0-norm part, which forces certain numbers within the sparse coding procedure to be binary. This is required to map the problem to the quantum hardware. Generally, machine learning practitioners who use sparse coding do not use this form of the algorithm as it generates hard computing problems. Instead, they use a different version, which is called L1-norm sparse coding. The L1-norm version is better behaved computationally, at the price of potentially reducing the effectiveness of the learning procedure. In order to test this aspect of the new idea, a state-of-the-art L1-norm sparse coding system was implemented and architected to be able to run using the Amazon EC2 cloud.

A similar system using the L0-norm version was implemented, with a set of conventional software solvers for solving the hard optimization problems this version of sparse coding generates. This version also can be run on the cloud.

Having these two systems running within the sparse coding component allows direct comparison of L0-norm against L1-norm sparse coding, which allows partitioning of the question of what effect going from L0 to L0 has algorithmically (which is independent of questions of the utility of quantum hardware). It was found that the L0-norm version has important advantages over L1-norm, and in particular provides a significant performance boost when the desired sparsity of the representation is very high (at least for the image datasets tested to date). Thus, there is an important algorithmic win in going from L1 to L0. This finding is very interesting in and of itself, as it shows that a very important workhorse algorithm for machine learning can be improved by recasting it in the L0-norm form.

The second question is the effect of running on the quantum hardware.

There are two strategies for doing this. The first is to solve the hard optimization problems generated by sparse coding using an intervening software translator referred to herein as BlackBox. BlackBox is designed to allow any discrete optimization problem to be solved using quantum hardware. As the sparse coding optimization problems are not exactly the problem type the quantum hardware natively solves, a translation step down to the quantum hardware is required. In particular, sparse coding optimization problems are fully connected QUBOs, while the quantum hardware natively solves Chimera-connected QUBOs. BlackBox trades performance for generality—it can be used on any discrete optimization problem, but its performance may be relatively low.

The second strategy is to avoid the cost of going through BlackBox by modifying sparse coding such that it only generates problems that can be natively solved by the quantum hardware. This second strategy is referred to herein as L0-norm sparse coding with structured dictionaries. Here a large speed-up is obtained by directly using the hardware in its most effective form. The idea is to structure the "maximally repeating patterns" that sparse coding learns such that many of them are orthogonal. (The coupling terms in the QUBOs generated by sparse coding are proportional to the dot product of the dictionary atoms associated with each qubit. The structured dictionaries idea enforces additional constraints that atoms associated with qubits that are not physically connected in hardware must be orthogonal. This algorithm will likely have different performance characteristics than the standard L0-norm version.

The first strategy was implemented in the sparse coding component—solving the problems generated using the usual L0-norm version using BlackBox on the 512 qubit quantum processors—and found, as expected, that this was not competitive with using the best conventional solver, which was tabu search run on the cloud.

Note that the reason for this has nothing to do with the hardware—the issue is that the overhead for doing the translation in BlackBox is much larger than the time it takes tabu search on the cloud to solve the optimization problems. Even if the hardware took zero time this strategy still would not be competitive.

The second strategy was implemented within the sparse coding component. Once the structured dictionaries approach is running using conventional solvers, the results of this approach using conventional solvers is compared to the results obtained by running it on a 512 qubit quantum processor.

Introduction to Sparse Coding

Figure 9:
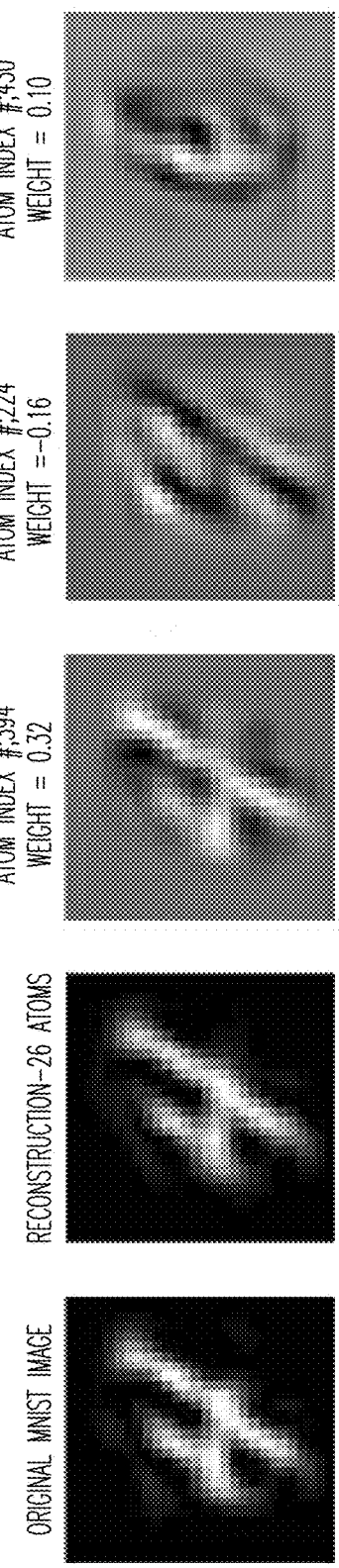
FIG. 9 shows an original and reconstructed image used in reconstruction, in accordance with at least one embodiment.

An example of sparse autoencoding is shown in FIG. 9. FIG. 9 shows, from left to right: (a) the original data object, in this case a small image of a handwritten digit from the MNIST dataset; (b) the reconstruction of this image using a small number of dictionary atoms, in this case 26 out of a total of 512 learned atoms; (c)-(e) the three most important atoms used in this reconstruction, with the "amount" they are included shown as weights above the images. Here an image can be thought of as being made up of simpler parts, which are combined (e.g., added) together. Sparse coding attempts to find a simple set of these parts that when put together in different combinations are able to represent a large number of images of the type of interest to the user.

The term "sparse" means that ideally only a few of the parts are required to make up any one image. The set of these parts that is discovered by sparse coding are often referred to as a dictionary and the parts are called dictionary atoms.

The two algorithms implemented are called L0-norm and L1-norm sparse coding. The L1 version is the standard approach to sparse coding, where data is allowed to be arbitrary linear combinations of the dictionary atoms, and regularization is of the L1 form. The L0 version is similar, but differs in that data objects are formed from linear combinations of dictionary atoms where the weights must either be 0 or 1—the atoms are either in or out of the reconstruction—and regularization is of the L0 form. The user can choose any of the ten hardware and algorithmic combinations shown in Table 2:

TABLE 2

| Sparse Coding Type | Hardware | Solver algorithm |
|---|---|---|
| L1-norm [real weights] | PC, Cloud | Feature Sign Search |
| L0-norm [binary weights] | PC, Cloud | Tabu, Akmaxsat, Blackbox |
| L0-norm [binary weights] | PC | Cplex |
| L0-norm [binary weights] | 512 qubit quantum processor | BlackBox |

The sparse coding component includes two test suites, which allow a user to apply both types of sparse coding, running on any of the ten allowed hardware/solver algorithm combinations. The test suites use the MNIST handwritten digit image dataset and the CIFAR natural image dataset (both described below).

The Sparse Coding Component of the HDL Software Framework Feature List

Below is a list of features that are included in the sparse coding component:

Unsupervised feature learning via L0-norm and L1-norm sparse coding
Two different built-in datasets to explore
Five different solver algorithms
Five different visualization routines
Three different image category classification suites
Cloud and quantum hardware support
Simple and robust command-line style user interface
The ability to save previous runs and interrogate the results at a later date Several of these features will now be described in more detail.

The MNIST Dataset

Figure 10:
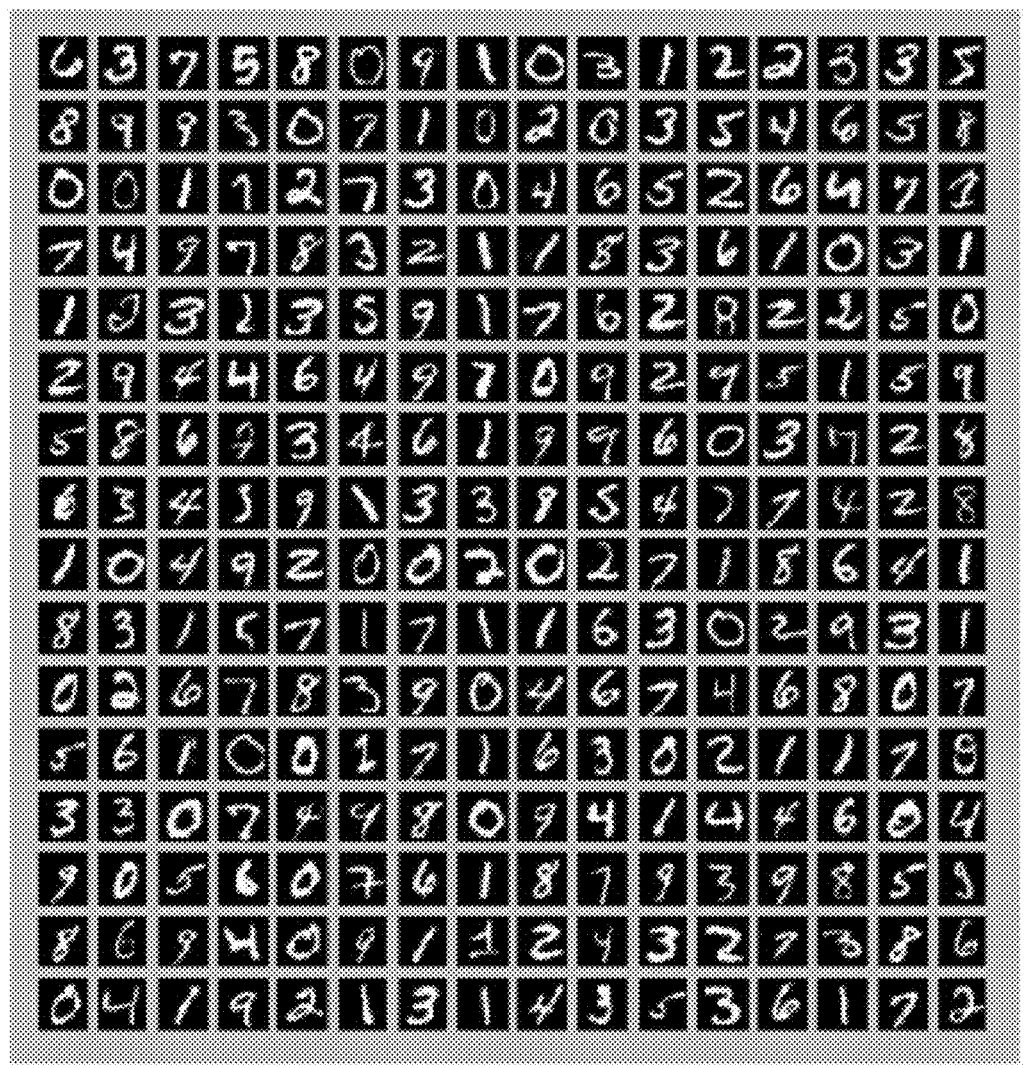
FIG. 10 shows a set of control or training images, in accordance with at least one embodiment.

The sparse coding component includes a test suite based on the MNIST handwritten images dataset. This is a labeled dataset of 70,000 handwritten digits. Each image is a white-on-black digit representing a number between 0 and 9. Each image measures 28×28 pixels (784 pixels in total in each image) and is in greyscale color format. Each image comes along with a label of the correct category (0, 1, 2, 3, 4, 5, 6, 7, 8, and 9). Examples of MNIST images are shown in FIG. 10.

The CIFAR-10 Dataset

Figure 11:
FIG. 11 shows another set of control or training images, in accordance with at least one embodiment.

The second test suite included with the sparse coding component is the CIFAR-10 dataset (referred to as CIFAR). This is a labeled dataset of 70,000 images of two main types: vehicles and animals. Examples from the CIFAR training set are shown in FIG. 11. Each image is 32×32 pixels, and is in RGB color format. The categories are (airplane, automobile, bird, cat, deer, dog, frog, horse, ship, truck).

Categories in both CIFAR and MNIST are mutually exclusive, meaning that any training or test image is only assigned one label.

State-of-the-art specialized machine learning techniques are able to obtain classification accuracies of around 99% for MNIST and 91% on CIFAR-10.

Solvers

In some implementations, the system has five different solver algorithms available to the user.

If L1-norm sparse coding is selected, the algorithm used is described in Honglak Lee et. al., *Efficient Sparse Coding Algorithms*, NIPS, pages 801-808, 2007, which is incorporated by reference in its entirety into this disclosure. The algorithm used to find the weights is called Feature Sign Search (FSS).

If L0-norm sparse coding is selected, the algorithm for finding the dictionary given the weights is the same as that used for the L1 version. However finding the weights becomes an NP-hard optimization problem. The sparse coding component implements four different solvers to attack these. CPLEX is a leading commercial optimization package from IBM, which can be run as a heuristic or to prove global optimality.

Tabu search is another heuristic, which is generally the best solver for fully connected QUBOs of the sort generated by sparse coding. Akmaxsat is an award winning branch and bound based solver which can be run as a heuristic or for proving global optimality. BlackBox is a structure unaware large neighborhood local search algorithm based on tabu search, which increases the size of the neighborhood searched at each tabu iteration by creating a Chimera-structured model of the function at its current point.

Hardware

The sparse coding component can access local, cloud or quantum computing hardware resources. Local runs are performed on the system running the sparse coding component code, and are generally recommended as the user begins using the sparse coding component to get a feel for how the system behaves. Cloud runs may be performed, for example, on the Amazon elastic cloud using the PiCloud cloud computing system. There are several aspects of the sparse coding procedure that can be effectively parallelized. If the number of data objects in the unsupervised feature learning procedure is larger than approximately 50,000 data objects, using the cloud is recommended. The solver algorithm used if the user runs on the quantum hardware is the BlackBox discussed above.

Biolabel Inpainting

Figure 12:
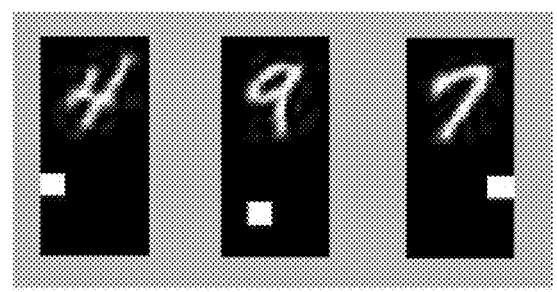
FIG. 12 shows a training set example with appended labels or machine-readable symbols, in accordance with at least one embodiment.

The sparse coding component has a special feature referred to as "biolabel inpainting." This is a form of adding extra (supervised) information to the dictionary learning procedure so that the algorithm has more insight into the classes of the images that it is shown. This procedure works as follows:

When a sequence data object is created, it contains not only the image, but an appended image which contains label information. The idea behind encoding the label as an image is that learning is made easier if the label can be represented in the same form as the original image data. These images are called bio-inspired labels (shortened to biolabels) because the idea of using an image to represent the label is a bio-inspired design choice (the label itself is an image and is treated as a "canonical example" of the category the system is being shown). In the sparse coding component the biolabels are white (yellow for CIFAR) on black squares in different locations for each label category, in a similar spirit to a QR code. Examples of data objects with their appended biolabels are shown in FIG. 12.

In this case, the dictionary is learned jointly over the images and their biolabels. When reconstructing new test images using such a dictionary, a "guess" at the label (which does not exist in the input test data) will be inpainted by HDL software framework.

While the discussion has been in terms of "biolabels" and "inpainting", these are simply terms to express underlying technology described by the applicant(s). A biolabel can be considered a label which is incorporated into the data that is being analyzed. For example, where the data to be analyzed is image data, the label is incorporated into the image data as a set (one or more) pixels. A spatial position of the label (e.g., set of pixels) in the image encodes information. This is in some aspects similar to the way two-dimensional machine-readable symbols encode information in relative positioning of symbol characters comprising a symbol, however advantageously incorporates the label or machine-readable symbol into or at least in the same format as, the data (e.g., image file) being analyzed, such as the image representation of an object, an alpha or numeric or other character, a data object or its reconstruction. This added or inpainted label which is incorporated or added to the data (e.g., image data) is generally of the same form as the image representation (e.g., set of pixels representing intensity and/or color for each pixel). As discussed above, these labels provide a further logical association of the image representation. That is to say, the label provides a further data point for learning because there may be a logical association, correlation or correspondence between the label and the object, structure or other information or reconstruction thereof representing in the corresponding data (e.g., image data).

Thus, to discuss "biolabel" and "inpainting" in the context of images and image data, a label may be incorporated, added or attached to image data which represents an image of a data object or its reconstruction. This label may be of the same form as the image data, for example, a set of pixels. Though of course, the label may be in any other form to which the learning discussed herein can be applied. The label may provide, represent, or be mapped to a description of a representation of a data object (e.g., alpha or numeric character, facial feature, image feature, anatomical structure) or its reconstruction to which it is attached. Thus, there is a logical association, correlation or correspondence between a label and the corresponding representation of a data object or its reconstruction to which the label is incorporated, added or attached. Thus, for purposes of the learning algorithms discussed herein, some learning algorithms may be modified to learn over the span of both the labels and the representations of a data object or its reconstruction. Thus, inpainting may be considered incorporating, adding or appending a label in which one or more labels or labels composed one or more elements or characters are incorporated, added or appended to a representation and the label has a logical association with the data object or its reconstruction represented by the representation. This allows for learning across both labels and corresponding representations.

Visualization Routines

The system has five different visualization routines available to the user.

The first of these allows the user to see the original data in the sequence_data form, before the learning algorithm is run on this data. A sequence data object consists of a number of columns equal to the number of training images the user has selected on which to perform learning. Each column represents one image in the training set. The image has been raveled from a 2D, multi-channel color pixel array into a 1-dimensional array.

The array is further pre-processed by performing a mathematical transformation known as a Singular Value Decomposition (SVD). This transforms the image into a basis set which is ordered by the amount of information stored in each basis (or mode). Once in this format, the image can therefore be compressed by only keeping the first N of these modes. An example is that a CIFAR image (32*32 pixels*3 color channels=3,072 elements long) can be compressed into a 300 element long array when SVD is used, without losing too much image information.

Figure 13:
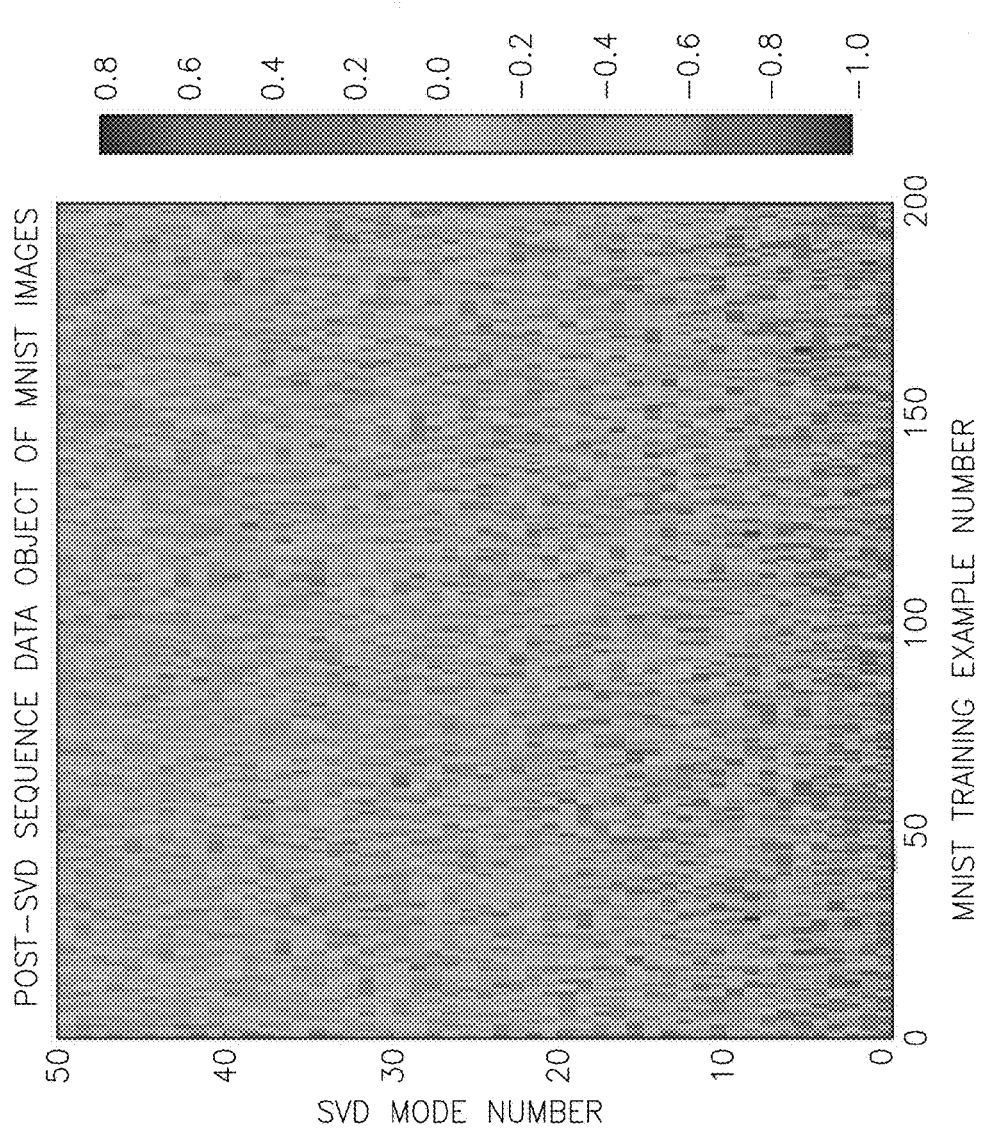
FIG. 13 is a graph showing mode number versus training example number for post-subsequence data object(s) of Mixed National Institute of Standards and Technology (MNIST) images, in accordance with at least one embodiment.

A sequence data object is a special data format accepted by the HDL software framework learning algorithms. Any type of data can be encoded into this format with a suitable encoder (MNIST and CIFAR encoders are supplied with the HDL software framework). The first visualization routine in the HDL software framework visualization suite helps the user to understand the format of the sequence_data matrix. This is illustrated in FIG. 13.

The second visualization routine is allows the user to look at a reasonably large number of the dictionary atoms that have been learned. It also shows reconstructions of the original data using this dictionary, and the originals (ground truths) themselves, to gauge by eye how well the reconstruction process is doing. This is illustrated in FIG. 14.

If a dictionary containing biolabel information is chosen, the biolabels will be displayed in this figure as well. The numbers displayed above the reconstructions denote either the indices of the atoms used (if the numbers are in square parentheses) or the number of atoms used if there are more than 3 atoms per reconstruction (The symbols >># are displayed before the number if this is the case). The average sparsity (number of atoms, on average, used per reconstruction) is also displayed in the plot's title, along with the name of the dictionary file that was used.

Figure 15:
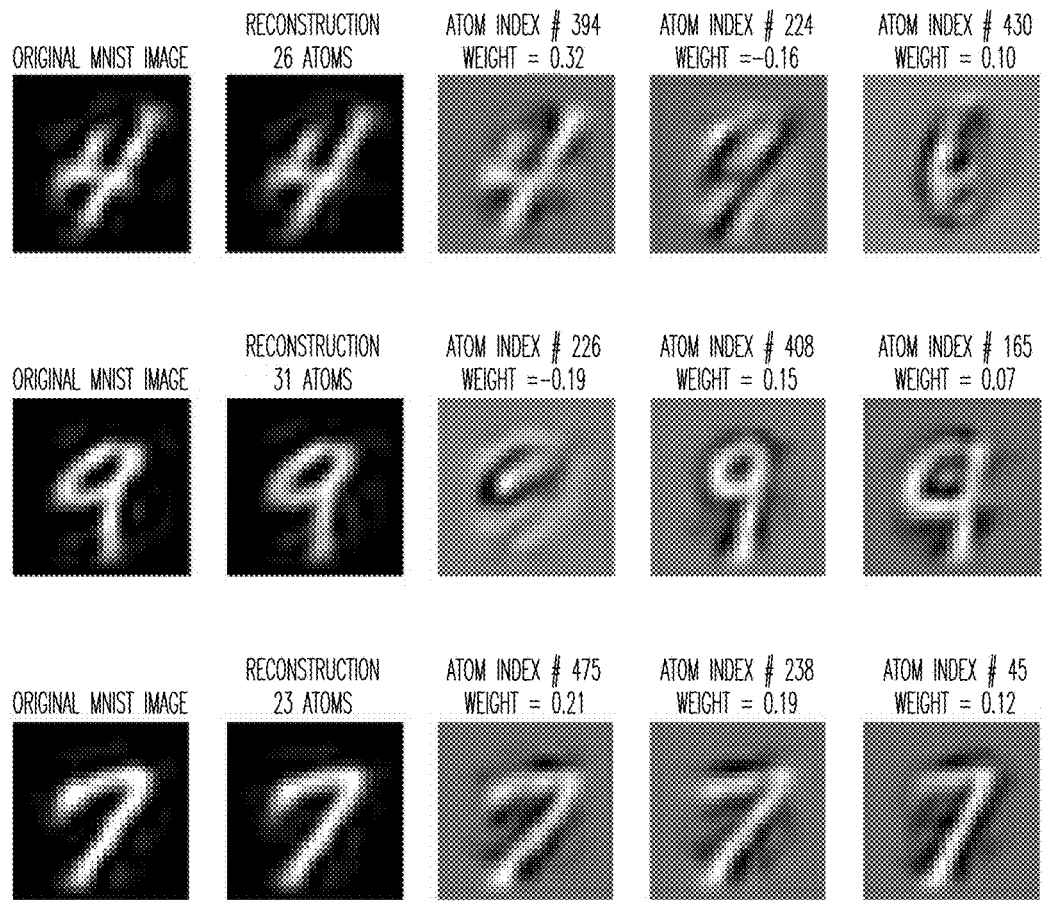
FIG. 15 shows a dictionary file, in accordance with at least one embodiment.

The third visualization allows the user to take a close look at three of the reconstructions, alongside the original and up to three of the atoms that were used in the reconstruction. FIG. 15 shows an example of this visualization routine in action. The atoms that combine to form the reconstruction are ordered so that the ones with highest absolute magnitude weight are shown in the figure. The index of the atom and the weight are shown above the atoms themselves.

Figure 16:
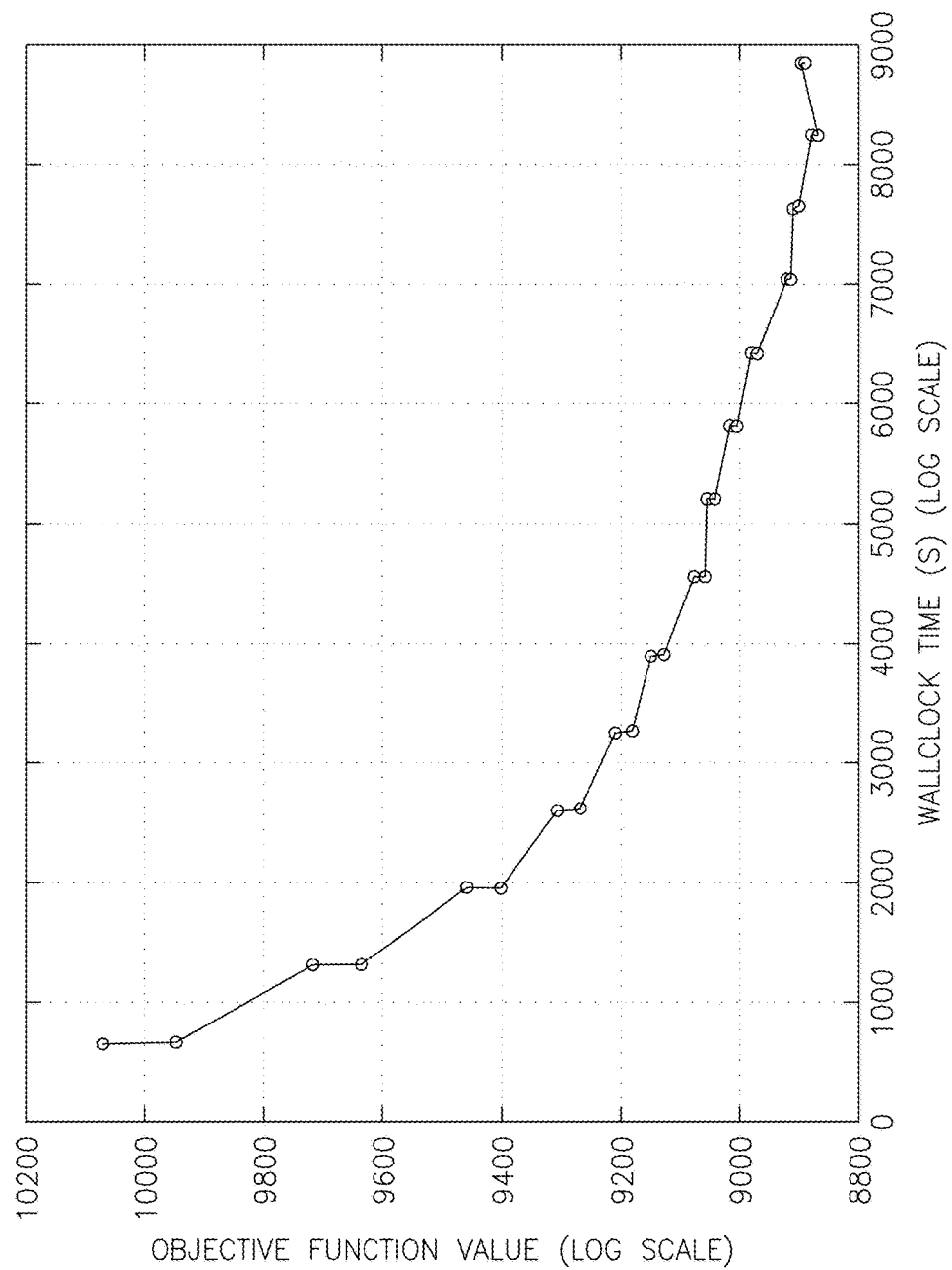
FIG. 16 is a graph of objective function values with respect to time, in accordance with at least one embodiment.

The fourth visualization shows the objective function descent during the learning process. This gives the user an idea of how the algorithm is converging upon the best solution. The functional form of the objective function descent can be very different for different solvers and data types and is interesting to explore from a research perspective. Another use of this plot is to determine how fast the objective function descent is converging, to help the user determine whether a more or less aggressive exit threshold is required. An example of this visualization output is shown in FIG. 16.

Figure 17:
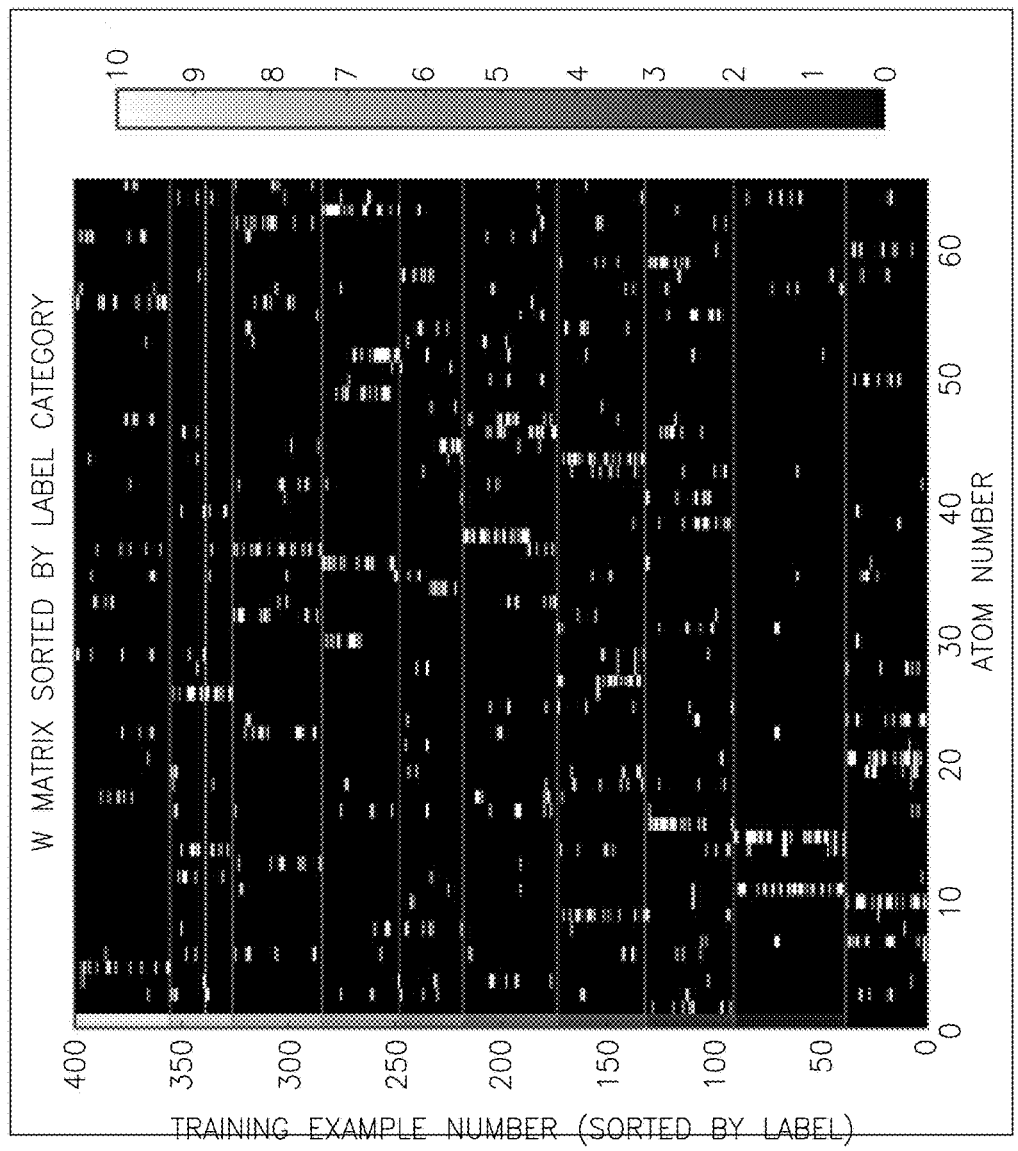
FIG. 17 is a graph of a W matrix sorted by category, in accordance with at least one embodiment.

The fifth visualization allows the user to visualize the W matrices sorted by label category. This gives a "fingerprint" of the data and is interesting to examine. If correlations can be seen with the naked eye, the classifiers should do well. An example of this visualization routine is shown in FIG. 17.

Classification Suite

The sparse coding component of the HDL software framework has three built in classifier types:
  Standard classification: W matrix values are fed into a suite of assorted classifiers
  Biolabel inpainting using pixel magnitudes
  Biolabel inpainting as input to a suite of assorted classifiers Each of these classification routines will now be described in more detail.

Standard Classification Using W Matrix

The W matrices are the weights of dictionary atoms that are used to represent each particular input image. One can think of the W array as the representation of the input image with respect to a sparse basis (the dictionary). This W array is also sometimes called a feature vector. Each input image has a W array which is discovered during the learning process. This W array, together with the category label accompanying an input image, can be used as input data to train a classifier. In order to test a trained classifier, test images are reconstructed using the sparse basis (this step is also known as compressive sensing) and the W test array that results is sent into the classifier prediction routine along with the classifier model learned on the training data.

Biolabel Inpainting Using Pixel Magnitudes

The sparse coding component comes with a special "label inpainting" procedure. When a test image has been reconstructed using the learning dictionary including biolabels component, the biolabel is inpainted into the resulting reconstruction. As the biolabels used in the sparse coding component have special areas where the pixels are strongly colored for each class (and do not overlap) the reconstruction of the biolabel can be used as a direct classifier, by looking at the pixel magnitude of each inpainted area corresponding to label categories. The area with the highest pixel magnitude is the predicted label for that test image.

Figure 18:
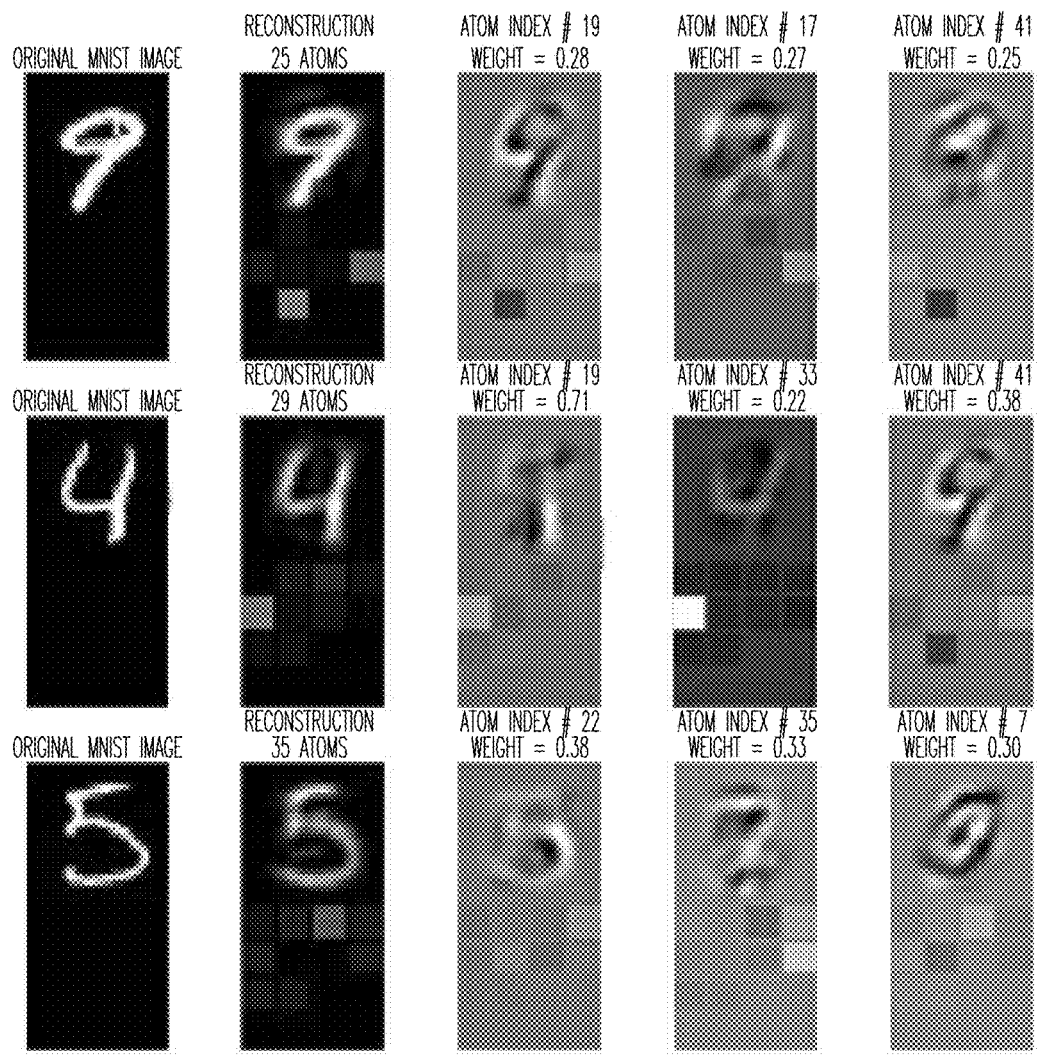
FIG. 18 shows, for each of three different images, an original image, reconstructed image, and three different atoms, the reconstructed images and atoms each including an appended or painted label, which for example provides information about the content of the image encoded in a relative spatial positioning of the label in the image, according to at least one illustrated embodiment.

Examples of inpainted biolabels on the MNIST test set are shown in FIG. 18. Note that the input test data does not have biolabels by definition.

Biolabel Inpainting as Input to a Suite of Assorted Classifiers

The pixel magnitudes that are extracted as described above can also form data which can be used to train a standard classifier model (this is similar to the first classification technique, but using biolabel pixel information as opposed to using the W matrices). In this case, a pixel from each "label area" is interrogated to determine its magnitude, and the resulting 10-long vector is sent into the classifier as input training data. To test the prediction of the classifier, the 10-long vector from the pixel magnitudes in the test biolabel reconstruction is supplied, and the classifier will generate a label prediction from this information.

It should be noted that biolabel inpainting methods natively support multiple label assignment. However, the above classification methods may behave differently depending upon whether the data has label categories that are mutually exclusive, or whether the data has multiple label categories with correlations between them.

EXPERIMENTAL RESULTS

Figure 19:
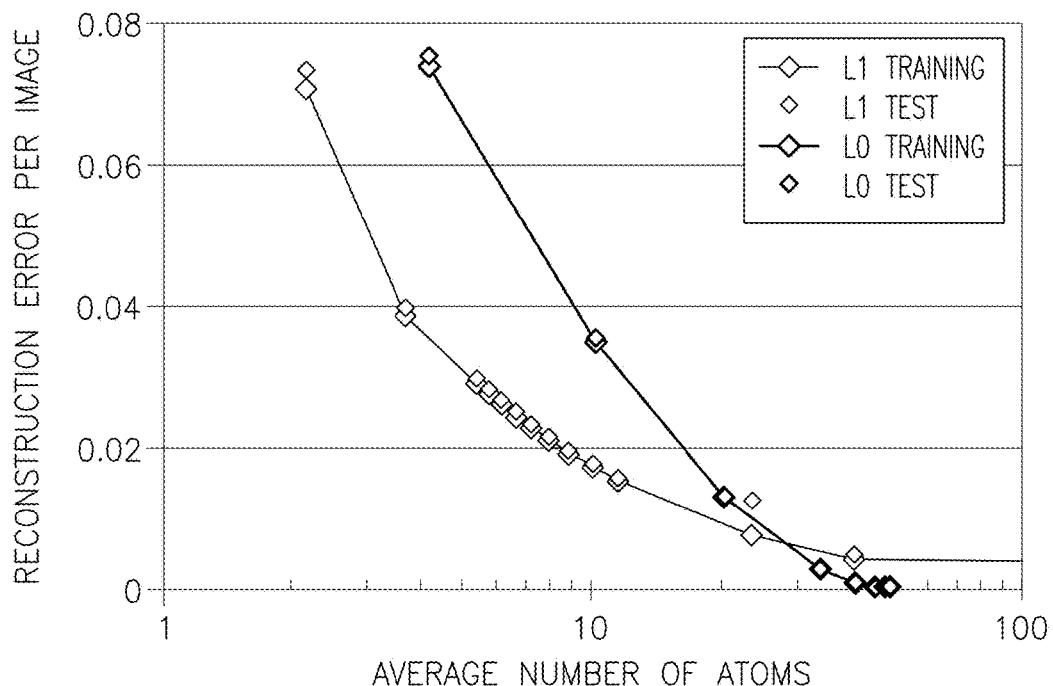
FIG. 19 is a graph showing reconstruction error versus an average number of atoms employed for two respective pairs of training and test runs, in accordance with at least one embodiment.

One motivation behind the creation of the framework was the open research question of what effect going to L0-norm from L1-norm has on sparse coding. A finding on the two datasets studied is that in the limit where reconstructions are sparse (small numbers of atoms as used in reconstructions), L0-norm sparse coding requires approximately half the atoms to obtain the same reconstruction error as L1-norm sparse coding for both CIFAR and MNIST data sets (see FIG. 19 for results on MNIST—CIFAR is similar). This is a substantial improvement.

Figure 20A:
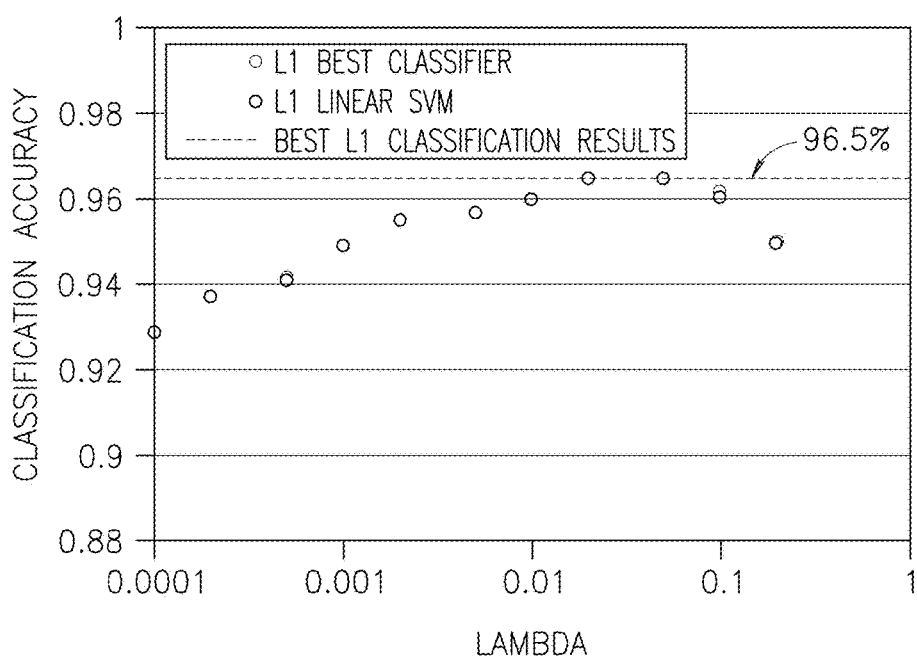
FIG. 20A is a graph comparing classification accuracy and a sparsity regulation parameter (lambda) for a number of approaches, in accordance with at least one embodiment.
Figure 20B:
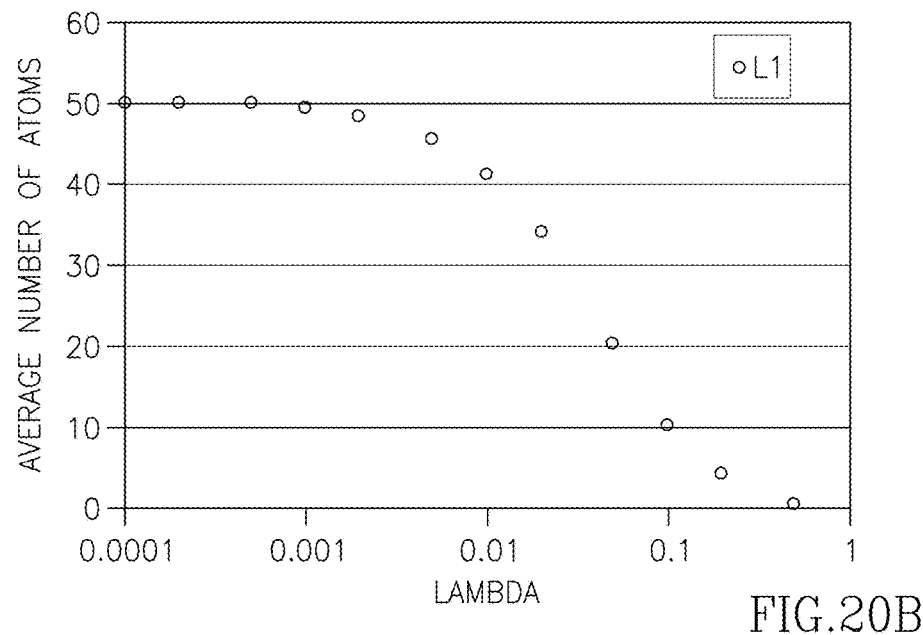
FIG. 20B is a graph comparing an average number of atoms versus the sparsity regulation parameter (lambda), in accordance with at least one embodiment.
Figure 20C:
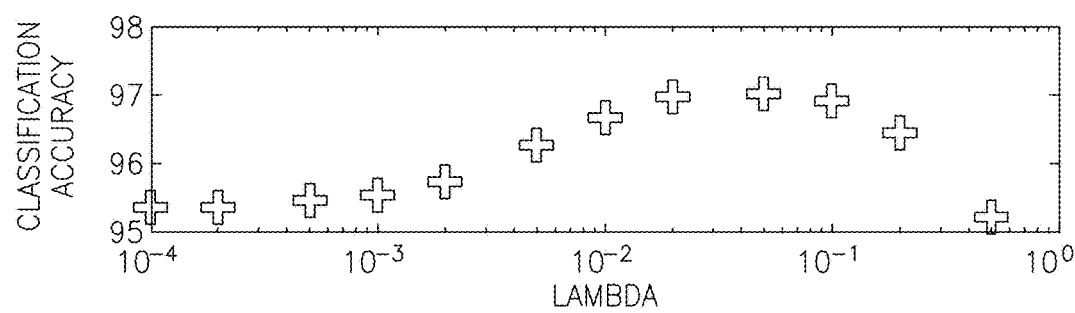
FIG. 20C is a graph showing classification accuracy, in accordance with at least one embodiment.
Figure 20D:
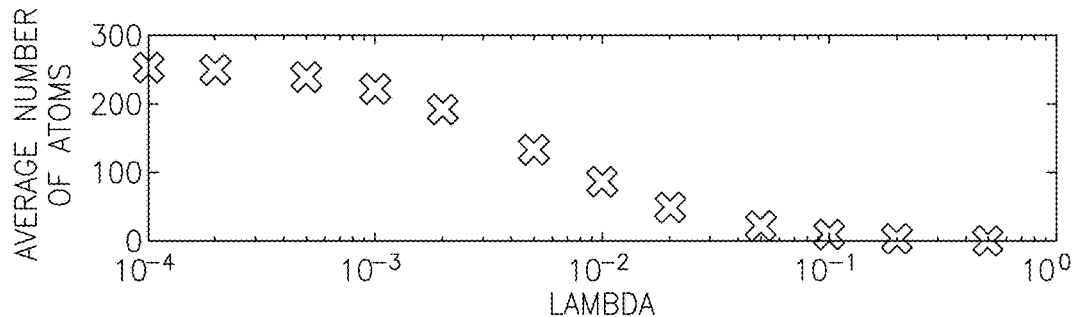
FIG. 20D is a graph showing a sparsity regulation parameter (lambda), in accordance with at least one embodiment.

Known state of the art L1-norm classification results on MNIST and CIFAR were recreated using sparse coding single layer nets. Shown in FIGS. 20A-20D are classification results as a function of regularization parameter for MNIST from Andrew Ng's group at Stanford, and results obtained using HDL software framework the sparse coding component. The difference in the absolute values of the classification procedure arises from a difference in the way the image data is preprocessed—the present technique compresses the initial training data to a larger extent which marginally decreases classification accuracy. In FIG. 20B, it can be seen that the sparse coding component saturates at a maximum of 50 atoms per image, whereas the Ng result (FIG. 20D) saturates at about 260 atoms per image. The main result here is that the shape of the curve in FIG. 20A (the sparse coding component result) and the shape of the curve in FIG. 20C (the Ng result) are the same, with approximately the same maximum classification accuracy (97.1% vs. 96.5%).

Two versions of sparse coding were implemented: one that is in common use (L1-norm), and one that requires solving problems of the sort quantum hardware is designed to solve (L0-norm). In so doing, state-of-the-art implementations of both of these algorithms were generated, providing a capability at the leading edge of unsupervised learning methods. The performance of these methods was analyzed on two academic datasets, MNIST and CIFAR-10, and it was found that the L0-norm version was superior in a key metric—sparsity as a function of reconstruction error.

The HDL Software Framework User Interface

This section of the present specification introduces installing, configuring, and performing data analysis using the aforementioned HDL software framework. FIGS. 21-32 illustrate aspects of the user interface.

Python Installation

First, install Python (e.g., Python 2.7). Python IDE is also recommended for use with this code, although the code can be executed from the Windows command line if an IDE is not available.

Installing Required Packages

Several third party libraries are also used for the sparse coding component to operate. Here is a list of packages. Each package should be downloaded and installed onto the user's machine. All these packages are included in the "packages" folder, which usually ships with the HDL software framework source code.

Python 2.7 Akmaxsat Solver-1.0.0
    Python 2.7 cloud-2.7.1
    Python 2.7 cvxopt-1.1.5 (64 bit)
    Python 2.7 D-Wave One Solver API client 1.5.0-alpha (64 bit)
    Python 2.7 matplotlib-1.2.0 (64-bit)
    Python 2.7 Metslib Tabu Solver-1.0.0
    Python 2.7 numpy-1.6.2 MKL (64-bit)
    Python 2.7 opencv-2.4.2 (64-bit)
    Python 2.7 PIL (pillow) 1.1.7 (64-bit)
    Python 2.7 scikit-learn-0.13 (64-bit)
    Python 2.7 scipy-0.11.0 (64-bit)
    Python 2.7 wxPython 2.8.12.1 (64-bit)
    CPLEX (license required)

Introducing the HDL Software Framework CLI

Figure 21:
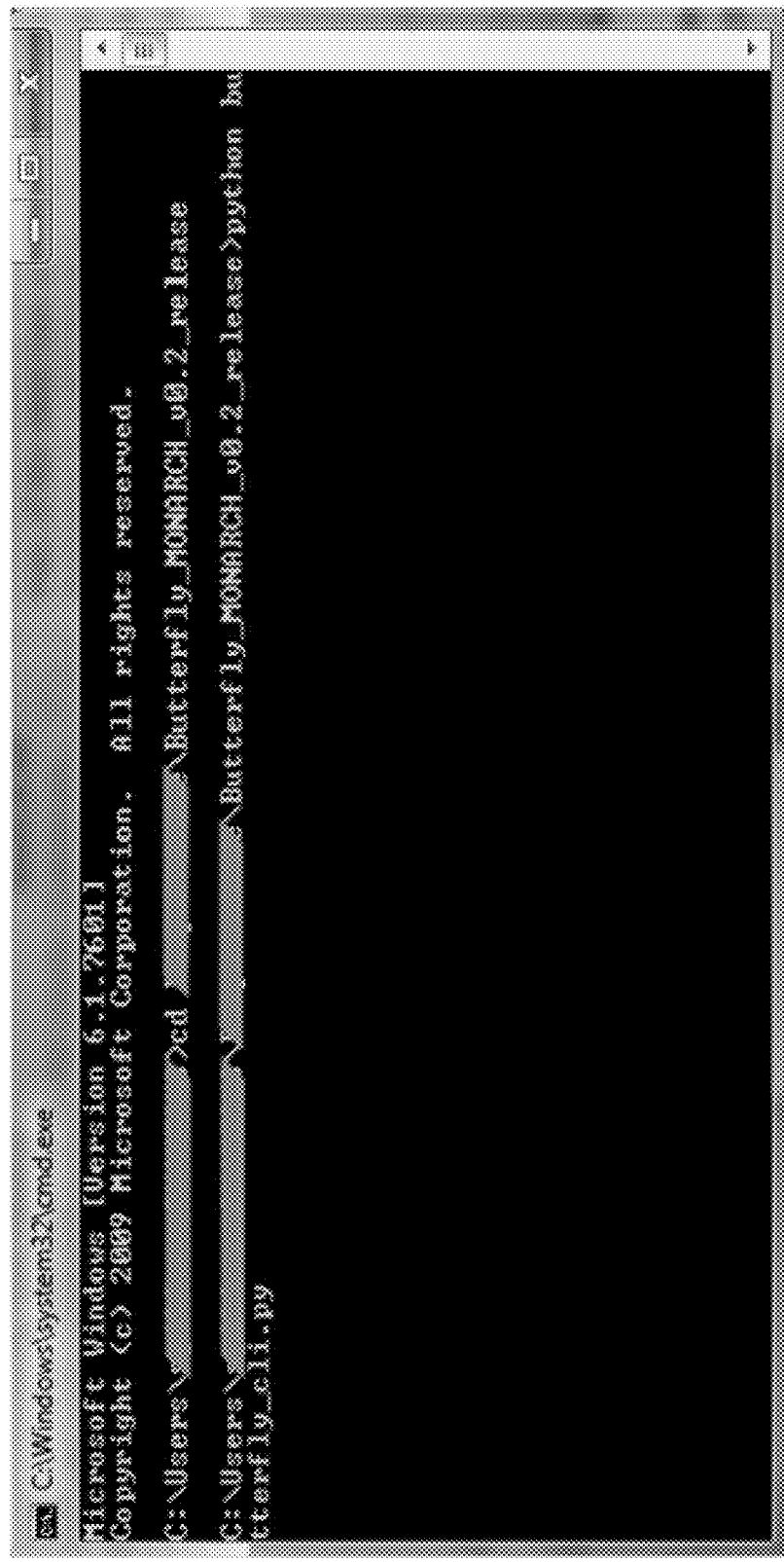
FIG. 21 illustrates an aspect of an associated user interface of an HDL framework, in accordance with at least one embodiment.
Figure 22:
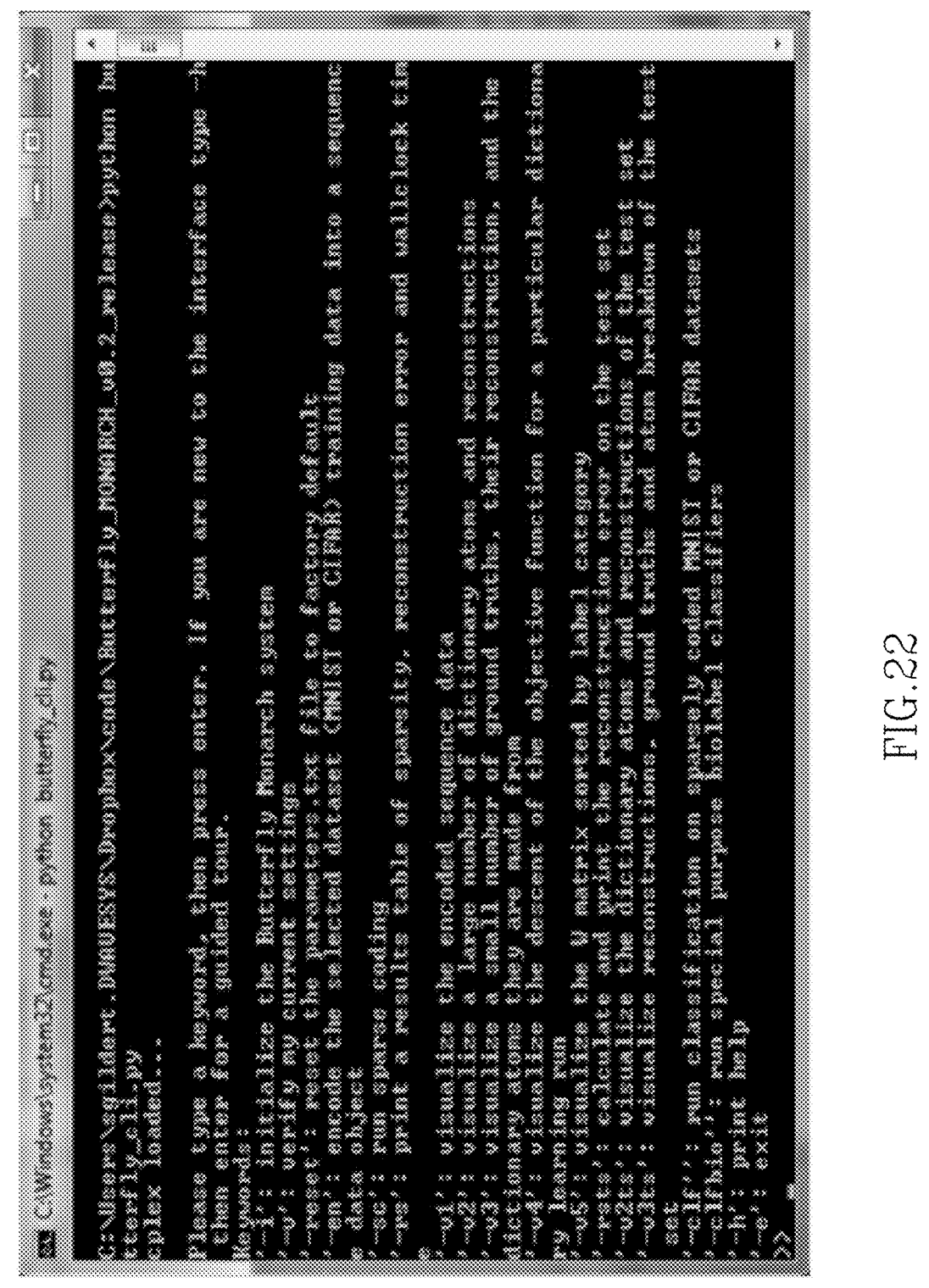

To run the sparse coding component, run butterfly_cli.py. This can be run from within a Python IDE, or from the command line as shown in FIG. 21. The bars should display your own local file path. Once this Python file is run, the HDL software framework sparse coding component Command Line Interface (CLI) is presented. A number of options will be printed for the user to select. This is shown in FIG. 22. All of the HDL software framework commands are keywords of the form "-" (dash) followed by a shorthand notation for the procedure to run. The options are:

- "-i": initialize the HDL software framework system
- "-v": verify my current settings
- "-reset": reset the parameters.txt file to factory default
- "-en": encode the selected dataset (MNIST or CIFAR) training data into a sequence data object
- "-sc": run sparse coding
- "-rs": print a results table of sparsity, reconstruction error and wallclock time
- "-v1": visualize the encoded sequence data
- "-v2": visualize a large number of dictionary atoms and reconstructions
- "-v3": visualize a small number of ground truths, their reconstruction, and the dictionary atoms they are made from
- "-v4": visualize the descent of the objective function for a particular dictionary learning run
- "-v5": visualize the W matrix sorted by label category
- "-rsts": calculate and print the reconstruction error on the test set
- "-v2ts": visualize the dictionary atoms and reconstructions of the test set
- "-clf": run classification on sparsely coded MNIST or CIFAR datasets
- "-clfbio": run special purpose biolabel classifiers
- "-h": print help
- "-e": exit Note that you it is not necessary to type quotes around the keyword in order to run the command Initializing Sparse Coding Component of the HDL Software Framework Once the user has loaded up the CLI, the first command to type is -i. This will initialize the system. A folder structure will be created in the root directory where the source code is located, and the training data will be downloaded and unpacked from the internet ready for training. MNIST image data and CIFAR data are automatically retrieved.

Figure 23:
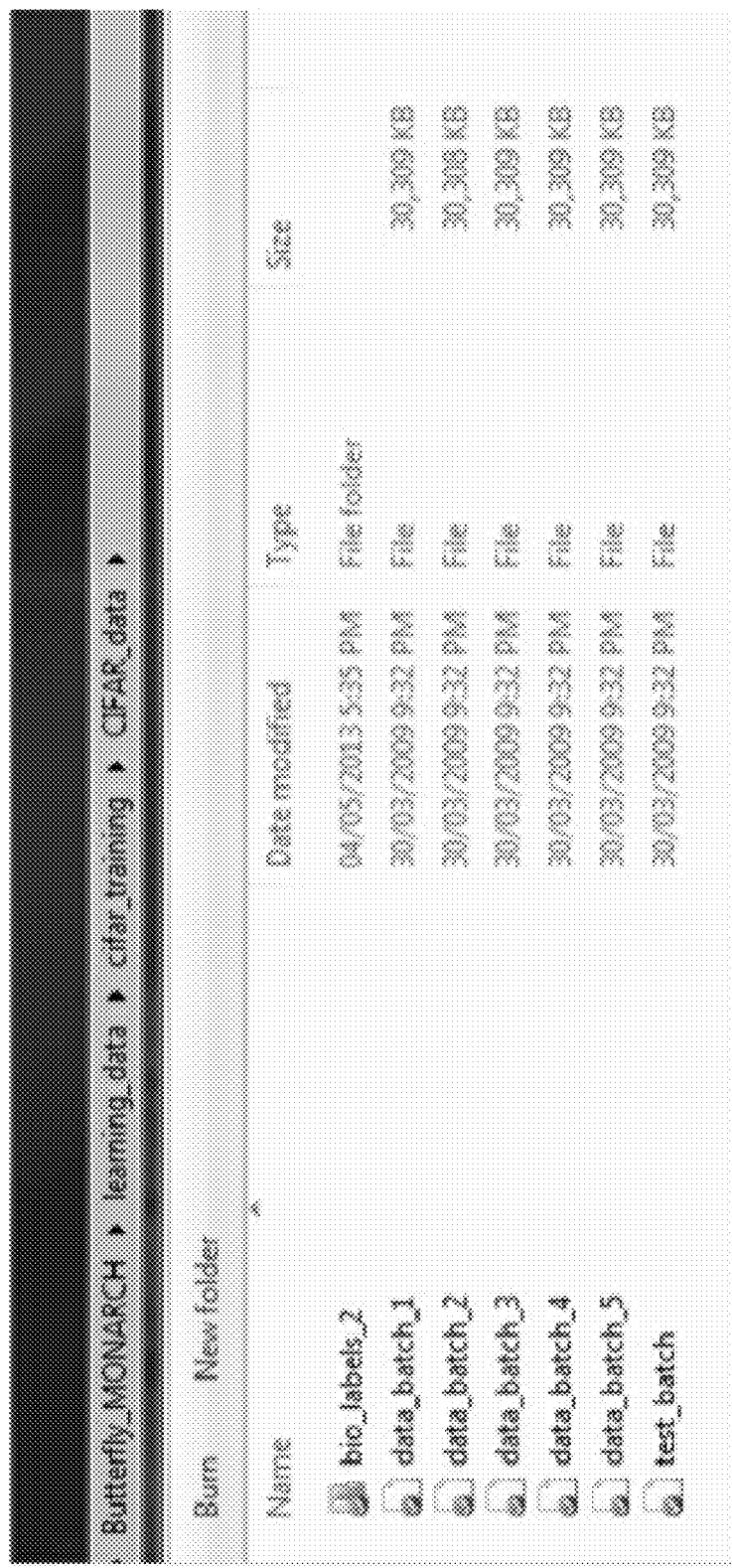
FIG. 23 illustrates an aspect of the associated user interface of the HDL framework, in accordance with at least one embodiment.
Figure 25:
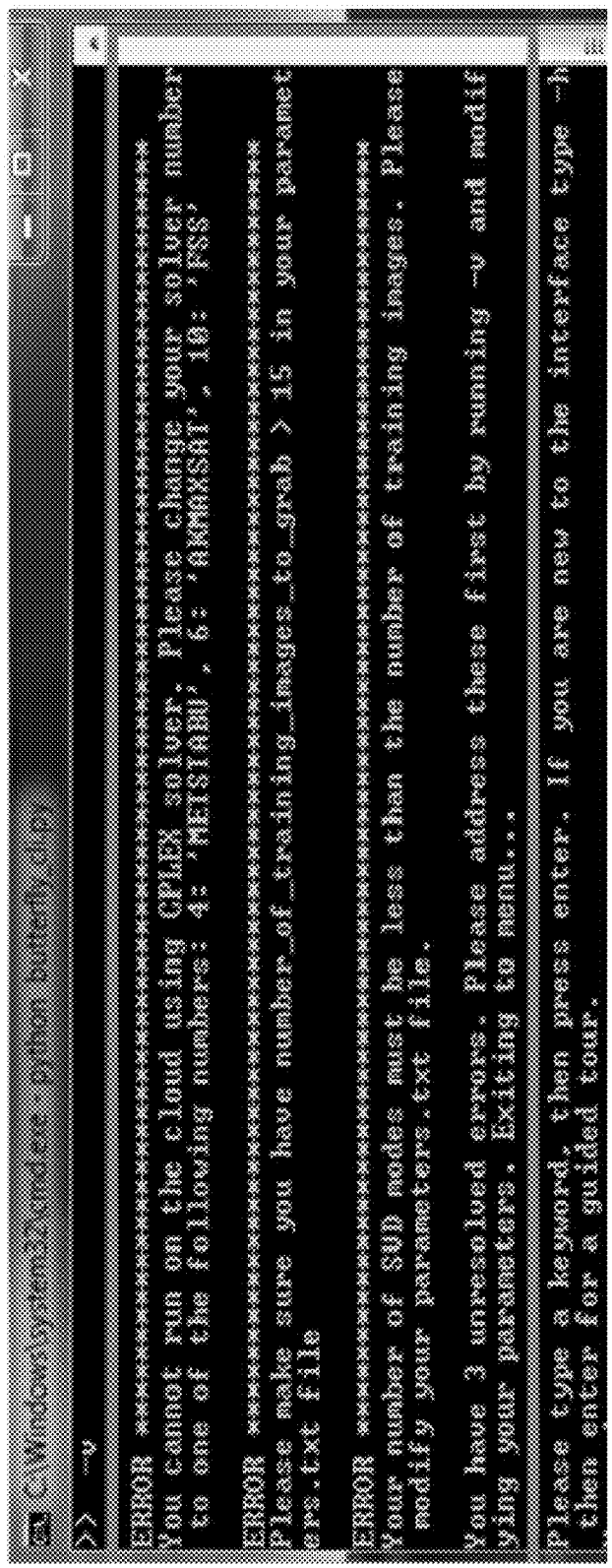
FIG. 25 illustrates an aspect of the associated user interface of the HDL framework, in accordance with at least one embodiment.

Note that data from the CIFAR source may need to be unzipped manually twice (it is both gzipped and tarred) and the raw files moved into the CIFAR_data folder. Additionally, the bio_labels_2_nmist and bio_labels_2_cifar folders may need to be moved or copied from the packages folder into the MNIST and CIFAR data folders respectively. FIG. 23 illustrates what the CIFAR_data folder should look like once this process is complete.

A default parameters.txt file will be created with all parameters initialized to their default values. At any point, the user can choose to reset parameters.txt to the default value using the command -reset from the sparse coding component interface. The user can also type -h at any time to bring up a help file.

Introducing the Parameters.Txt File

The main way in which the user interacts with the HDL software framework system is by specifying a number of parameters and then running one of the options in the CLI. To adjust parameters, the user should open up the parameters.txt file in a text editor, as shown in FIG. 24. Next, modify the value associated with the parameter to change and then save the file. The parameters listed in FIG. 24 are explained below:

K

This parameter specifies the number of atoms used to form the dictionary. Values in the range 50-500 are typical.

lambda_value

This is a regularization parameter. The higher lambda is set, the more penalty there will be for each atom included in a reconstruction, and the more sparse the reconstructions will be. The effect of lambda depends upon the size of the dataset, the number of dictionary atoms, and the solver type that you are using. For MNIST, values in the range 0.001-0.1 are typical.

unlabeled_solver_flag

Selects the solver to use. The options are:

2: "BLACKBOX+VESUVIUS" (i.e., BlackBox and a quantum computer)
4: "METSTABU"
5: "CPLEX"
6: "AKMAXSAT"
9: "BLACKBOX+EMULATOR"
10: "FSS"

All solvers apart from FSS use L0 regularization (binary weights multiply the dictionary atoms). FSS uses L1 regularization (real-values weights multiply the dictionary atoms). It is recommended to use either option 4 (for L0) or option 10 (for L1).

use_cloud

Sets whether jobs are run locally (use_cloud=False) or on the cloud (use_cloud=True) via the Picloud interface. If the user wishes to run jobs on the cloud, the user will need to set up a cloud account. Note that if the user runs jobs on the cloud, the user will still be able to access the data locally.

dataset

Selects which data to investigate. Current options are "mnist" or "cifar," but other data may be used.

biolabels

This flag informs HDL software framework to append biolabels to the input training data. Accepted values are "True" or "False".

local_verbose

This is a flag which creates additional optional printout to the command line interface if the user wishes to monitor the run more closely as the encoding and learning proceeds. Accepted values are "True" or "False".

blackbox_num_reads

Specifies the number of reads taken from the quantum computing hardware at each tabu step. The higher the value, the better the optimization will be, but the longer the run will take. Setting this number to zero (0) removes the large neighborhood local search mechanism and makes BlackBox equivalent to a type of tabu search. Default value is 1,000. Values in the range 100-10,000 are typical.

cplex_to_global_optimality

If this Boolean is True, and the user has CPLEX installed, the solver will run through the learning routines and prove at each step that the global optimum (best possible answer) has been achieved. This is useful if one wishes to have a baseline with which to compare the heuristic solvers. Note that running CPLEX to global optimality can take a long time, especially if K is large. If this variable is set to False, CPLEX exits after the unlabeled_solver_timeout timeout (see below).

unlabeled_solver_timeout

METSLIB TABU, CPLEX and AKMAXSAT solvers can all be given a solver timeout. This is the time in milliseconds after which they must return the best answer they found. This is necessary as there is no way of checking whether or not a heuristic solvers has returned the optimal answer. Values in the range 5-100 ms are typical here. The longer the timeout, the better the optimization for large runs, however it will also increase the time taken for the run.

time_by_iterations_for_tabu

This is a Boolean, which if True asks the tabu search algorithm to exit after a certain number of tabu iterations have been performed, instead of exiting after a specific timeout in milliseconds.

tabu_random_tie_breaking

This is a Boolean that tells the tabu search algorithm whether to break ties randomly or not. It seems as if tabu optimization is better when this is True.

tabu_iterations_in_roll

This is the maximum number of iterations tabu search performs per QUBO optimization during the initial descent phase.

tabu_iterations_after_roll

This is the maximum number of iterations tabu search performs after the initial descent phase.

search_depth

TABU-like solvers have an initial phase where they can try many different random starting points before settling on the best place to run the main learning algorithm. The search depth is the number of iterations for which these initial tests (known as rolls) run. If using the L1-norm version, set this to 1.

number_of_rolls

Related to the search_depth, the user can specify the number of different random starting points that the algorithm will investigate in order to find regions where a solution looks promising before beginning the main run. Values in the range 1-20 are typical. Note that for the L1 version, number_of_rolls should always be set to 1 as the L1 algorithm always converges to the same answer.

exit_threshold

When the objective function decreases by less than this value in an iteration, the algorithm stops and the results are saved. Setting exit threshold higher will mean that the algorithm exists faster, but the answer found may not be as good. Values in the range 0.01-10 are typical for MNIST, although this parameter is highly dependent upon the number of images, lambda, and the type of solver used. In practice, the user may begin a run and observe the objective function descent to get a feel for what the exit threshold should be.

environment

This parameter specifies the environment (where the Python packages are installed) on the cloud that the HDL software framework uses. The environment name should be set up during the cloud account setup and is not usually altered subsequently.

map_jobs_bundle_size

When running on the cloud, this parameter specifies how many jobs to "bundle together". These jobs run serially one after the other. Depending upon how hard each individual job is, it can be inefficient to send each job to a separate core on the cloud as the jobs often complete much more quickly than the overhead time involved in setting up a core. As such, jobs are bundled together so that the core usage on the cloud is maximally efficient. Typical values are in the range 500-5,000 although this is highly dependent upon K, the number of objects in the training set, the number of cores you wish to run on, and the solver used.

number_of_training_images_to_grab

This specifies what subset of the training data you wish to use for the run. In some implementations, MNIST has a maximum of 59,999 data objects in the training set, so the user can set the value from 1-59,999 if dataset is "mnist". As currently implemented, CIFAR has a maximum of 10,000 images, so the user can set this value from 1-10,000 if dataset is "cifar". Note that whilst the user is getting accustomed to using the HDL software framework, it is suggested that a small number of datapoints is used for trying out the various features (100 is a good compromise). However, once the user wishes to produce academic or industry-standard results, using the full datasets is necessary.

number_of_svd_modes_to_keep

Before running sparse coding of either type we first reduce the dimensionality of the raw data by performing a Singular Value Decomposition (SVD). The number of SVD modes kept can be set from 1-784 in the case of MNIST and 1-3,072 in the case of CIFAR, but bear in mind that it cannot be set larger than number_of_training_images_to_grab or the SVD process will not work. Good reproduction of the MNIST raw images can be obtained with 25-50 SVD modes. Good reproduction of the CIFAR dataset can be obtained with 250-400 SVD modes.

run_name

This is a moniker that the user can add in order to differentiate runs, which enables them to easily recall which dataset is which. For example, the user could set this name to be the current date and time of the run, or the name of the current user. When the HDL software framework saves the results of a run, the first few characters of the filename are set to the run_name that was in parameters.txt at the time of the run.

Verifying Parameter Settings

In order to check that the user has set up the parameters.txt file correctly, save the file and then run the -v command in the HDL software framework CLI. This will run through a series of checks on the parameter settings. There are certain constraints upon combinations of parameters, for example, you cannot have number_of_svd_modes_to_keep greater than number_of_training_images_to_grab. If the interface finds errors it will print a list showing what was done wrong.

Each error will be listed individually. The user may need to modify parameters.txt in order to resolve these errors, save the file, and try running -v again. If all the errors are remedied, the CLI will instead print out some info about the run parameters.

Data Encoding

To convert the MNIST and CIFAR datasets into a form recognizable by the HDL software framework, the images must be encoded into a sequence_data object. This process is known as encoding and is the first thing the user will do to the data before attempting any machine learning. Encoding is a way of taking data in a variety of different file formats and converting them into a standard matrix format that is used within the HDL software framework. When a dataset is selected, an additional compression step is performed before encoding. This is because the raw pixels data can often be compressed without losing much quality, similar to the way in which a bitmap can be converted into JPEG format with a smaller file size. The raw dimension of the MNIST data is 784 (and 3,072 for CIFAR) before compression (the number of pixels in the image×number of color channels). The compression performed by the sparse coding component of the HDL software framework is known as SVD (singular value decomposition), and the user can select the compression ratio to use by setting the parameter number_of_svd_modes_to_keep.

Once the MNIST or CIFAR data has been transformed into an SVD representation, it is then encoded by the HDL software framework into a 2D matrix of values ready to be sent into the learning algorithm. The user types -en to encode the data.

sequence_data (also seq_data) objects are stored as files in the user's learning_data/MNIST_training or learning_data/CIFAR_training directories. Additional files from the SVD step are also saved.

Running Sparse Coding Locally

By default all files will be saved locally when the user runs encoder and sparse coding. However, if the user set use_cloud to True, files will also be copied to the cloud. It is suggested that users begin running locally to test everything is working with a smaller number_of_training_images_to_grab before using the cloud for larger runs. After the user has run -en, in order to run sparse coding locally simply type -sc and hit enter. If the user has forgotten to run -en, the CLI will inform the user that it cannot find a valid sequence data file and will prompt the user to run encoder.

Because sparse coding is a time-consuming process, the sparse coding component automatically checks the settings before trying to run this command. In fact it silently runs -v (the same verification script described earlier) before running sparse coding to check that there are no errors. If it finds an error, it will prompt the user to run -v again and fix the error first (see FIG. 25).

Figure 26:
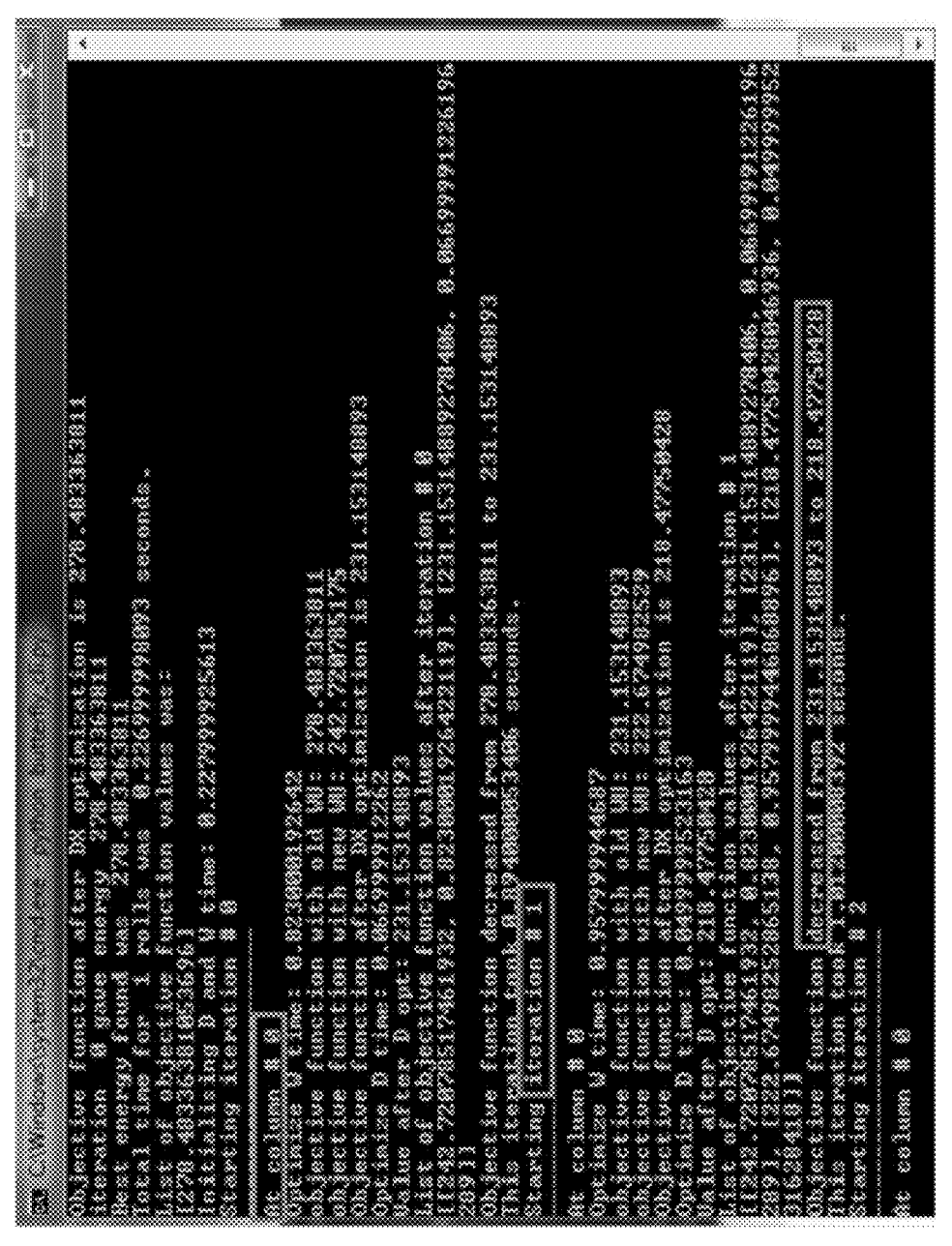

Once sparse coding is running, the user will see the code performing iterations. This process can take a long time to complete depending upon the settings, but printout saying "At column #0" means that sparse coding is running correctly. FIG. 26 shows what to expect when the user runs -sc. For example, if the algorithm appears to be performing a large number of iterations (>150), the user may wish to check the amount by which the objective function is decreasing each time—the algorithm will not exit until the difference falls below the exit_threshold.

When the sparse coding routine finishes, the program should return to the main menu prompt. The program will have saved the run as a learned dictionary (prefix D_) and a set of weights (prefix W_). These can be found in the learning_data/mnist (or cifar)_training/folder. The HDL software framework will also save an objective function descent file (prefix obj_func_val_) and a wallclock time file (prefix wallclock_time_).

Running Visualization Routines

Once sparse coding has run, the user has access to the suite of visualization tools. To run these the user types -v1, -v2, -v3, -v4 or -v5. The user will be prompted as to whether they wish to use the current settings or not. If the user types "y", the values in the parameters.txt file will be used. This means that the last sparse coding run that was performed is the one that is visualized. Note that if you change parameters.txt and then try to re-run a visualization using these current parameters, the system will prompt you to first re-run encoder and sparse coding.

If the user selects "n", the system loads a list of options for data to plot. These are the datasets that have been learned using previous runs. The user can select a previous dataset by typing in the number associated with it (shown to the left of each option).

Visualizations also have the filename in the title of the figure in order to further clarify which data came from which run.

Once a number is selected, (or "y" if using current settings), after a short while, the visualization will appear in a popup window. The user can save the figure as an image if they wish using the figure window menu options. The figure does not save automatically. In order to return to the HDL software framework CLI after a visualization, close the figure window.

Printing Out the Key Results from the Run

Figure 27:
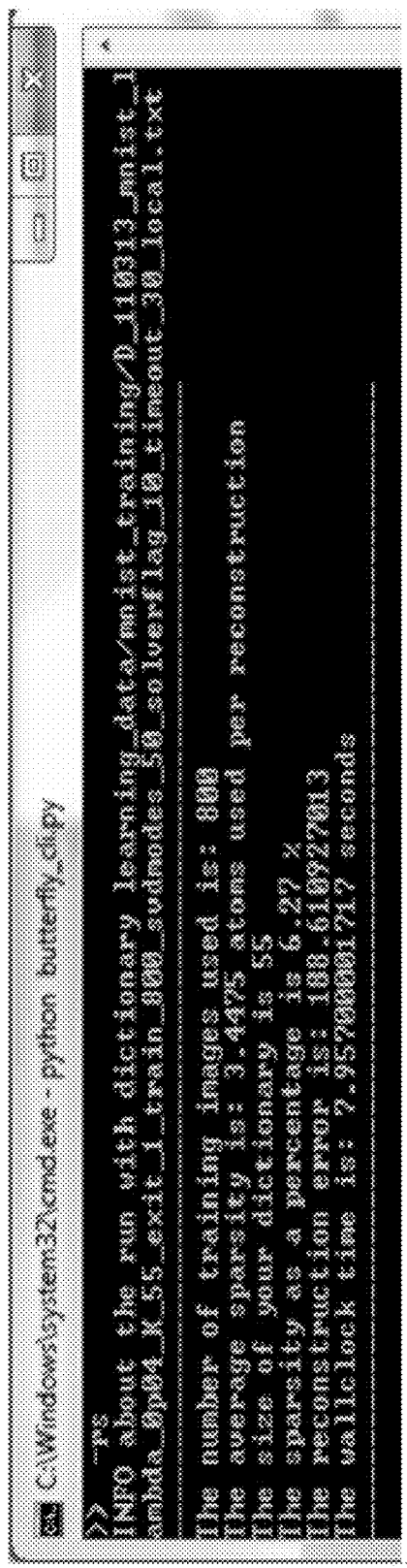
FIG. 27 illustrates an aspect of the associated user interface of the HDL framework, in accordance with at least one embodiment.
Figure 29:
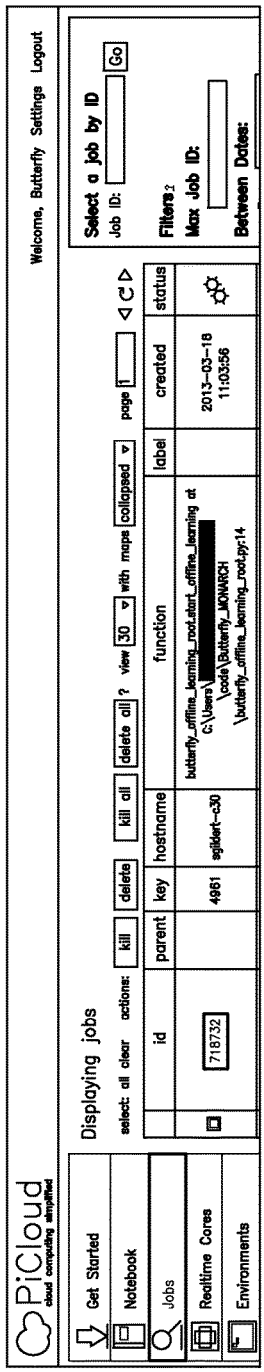
FIG. 29 illustrates an aspect of the associated user interface of the HDL framework, in accordance with at least one embodiment.
Figure 30:
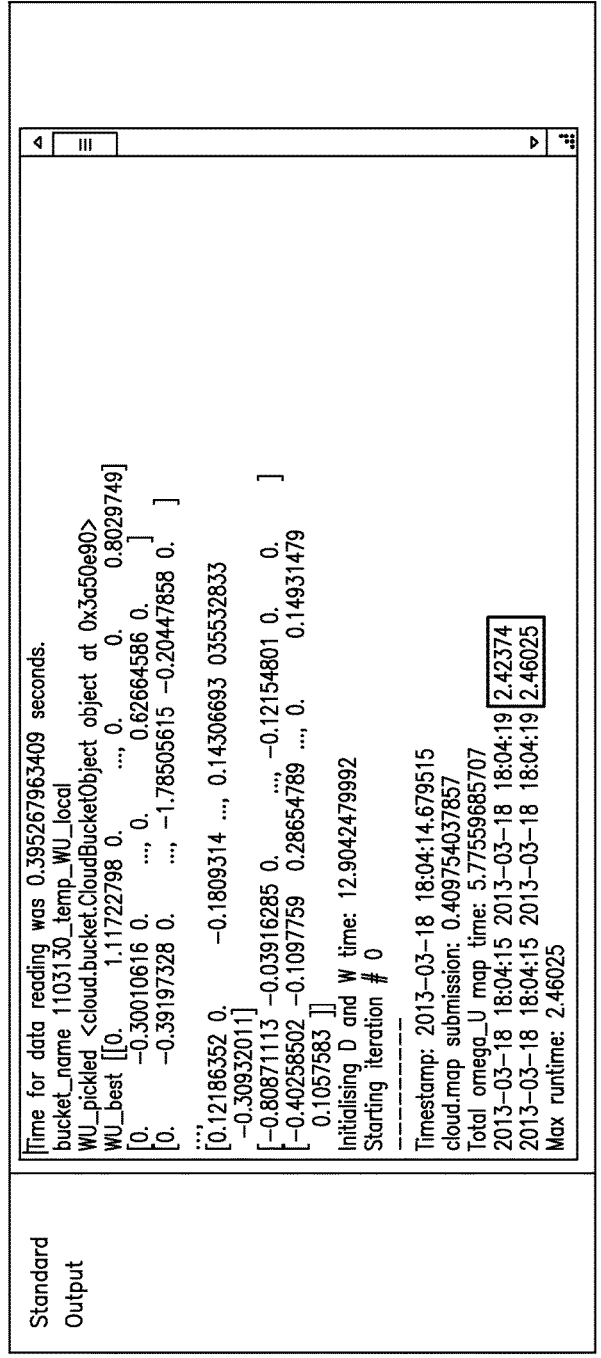
FIG. 30 illustrates an aspect of the associated user interface of the HDL framework, in accordance with at least one embodiment.

In addition to the visualization suite, the user can type -rs to print out a handy table of results from the run. This can be useful if the user is running many experiments and wishes to take note of certain values each time a parameter is changed and the learning is re-run. An example of the results list is shown in FIG. 27.

Running Reconstruction on the Test Set

After running the dictionary learning procedure, the user can choose to run the reconstruction process on the test set. This will use the discovered dictionary to write the test images in the basis of that dictionary. This process is also known as compressive sensing. Reconstruction of the test set is required before classification routines can be run. In order to run reconstruction on the test set, the user should type -rsts. This routine will print out the reconstruction error on the test set, and also save a Wtest matrix to the learning_data/MNIST (or CIFAR)_training folder. Note that as reconstruction requires the solution of optimization problems, the reconstruction process may take some time to perform depending upon the user's settings.

Before the code will run, it will prompt you to check that your lambda in parameters.txt matches that from the saved dictionary you wish to use for the reconstruction.

Running Visualizations of the Test Set Reconstruction

Once -rsts has been run, the test set visualization routines become available. Running either -v2ts or -v3ts will produce v2 and v3 plots but using the test data instead of the training data. If the reconstruction included biolabels, this will automatically be shown in the figure. Note that the test images themselves do not carry biolabels, so the area under the ground truth image (where the biolabel would be found for a training set image) is left deliberately blank in -v2ts and -v3ts.

Running Classification Routines

To run the standard classification routines, the user should type -clf. Note that in order to run classifiers the system must have access to an Wtest matrix, that is, the user must have first run reconstruction on the test set (-rsts). The HDL software framework will automatically detect the W matrix, the Wtest matrix, and the training and test labels, and will run a range of classifiers on these inputs.

In order to run the special biolabel classifiers, the user should type -clfbio. There will be choice between the biolabel pixel magnitude classifier (returns one classification result) and biolabel inpainting as input to a suite of assorted classifiers (returns several classification results as in the standard classifier case). Note that this option may only be available if the user has learned dictionaries with biolabels enabled.

Running on the Cloud

Figure 28:
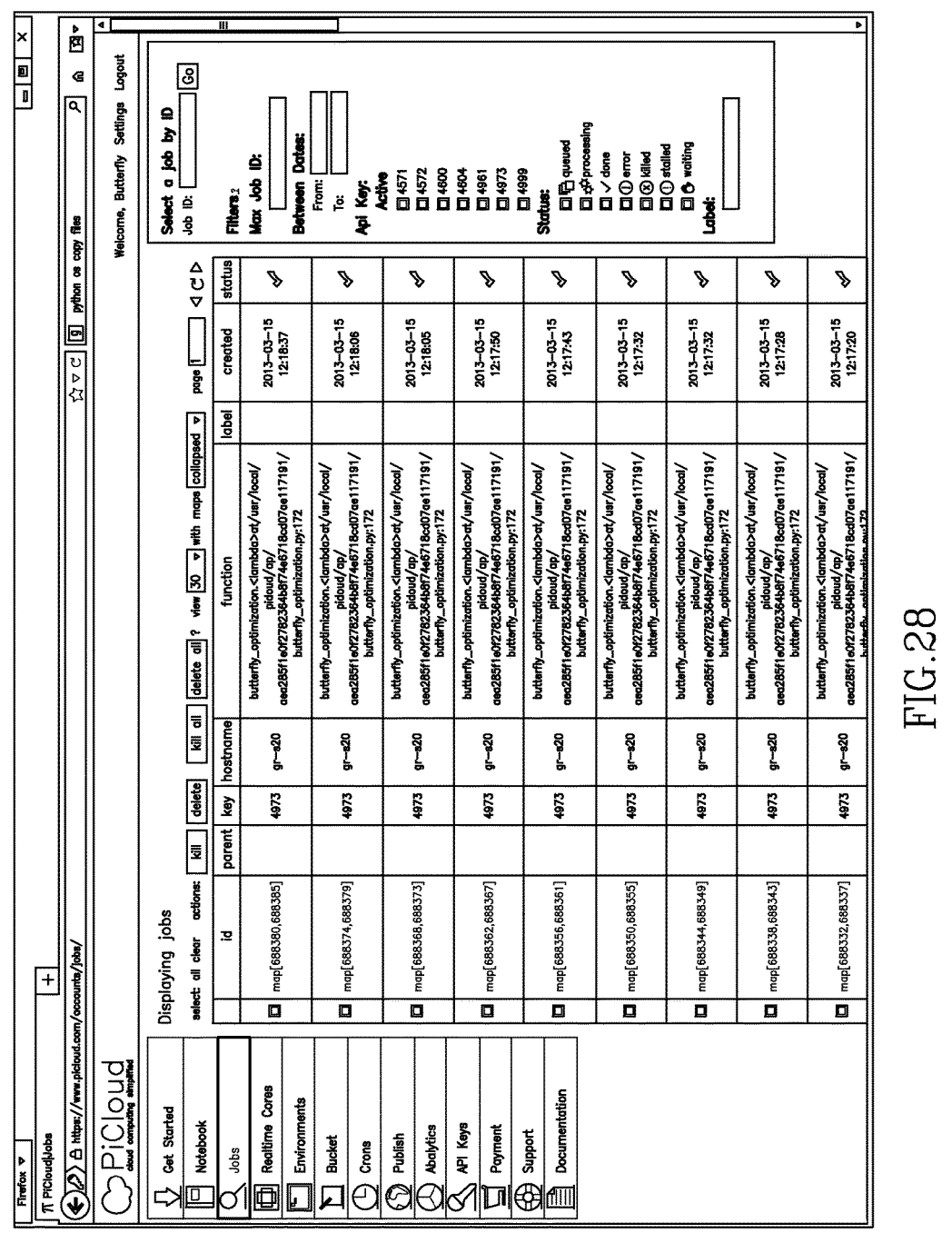

If the user wishes to perform runs on the cloud, the user may first need to set up a Picloud account. To submit jobs to the cloud, simply set the use_cloud flag equal to True in parameters.txt. Jobs will now be sent to the cloud when you run -sc (sparse coding). Once sparse coding is running, there will be no printout in the local Python window. In order to monitor the progress, the user will need to visit the picloud jobs page. To view current jobs, click on the jobs tab on the left hand side of the interface panel (FIG. 28).

The running jobs should be visible. In order to view the Python printout on the cloud, click on the main job. This will be the one with the cogs in the status column (shown in FIG. 29).

Click on the job ID (highlighted in FIG. 29) in order to access the page corresponding to that job. The printout can now be viewed by scrolling down to the area named "standard output" (shown in FIG. 30). The printout should be similar to that which is seen on the command line interface when jobs are running locally.

In order to check that map_jobs_bundle_size is set correctly, scroll down to the printout below the cloud.map submission. Here the user will find printout showing the time each job took to run on the cloud. This is highlighted in FIG. 30. This number should be around 10 (e.g., 10 seconds per job) in order to use the cloud cores most efficiently. The user may need to change map_jobs bundle_ size if this value is not close to 10. Here, the value is 2.4, so map_jobs_bundle_size has been set too low for optimum cloud use.

Figure 32:
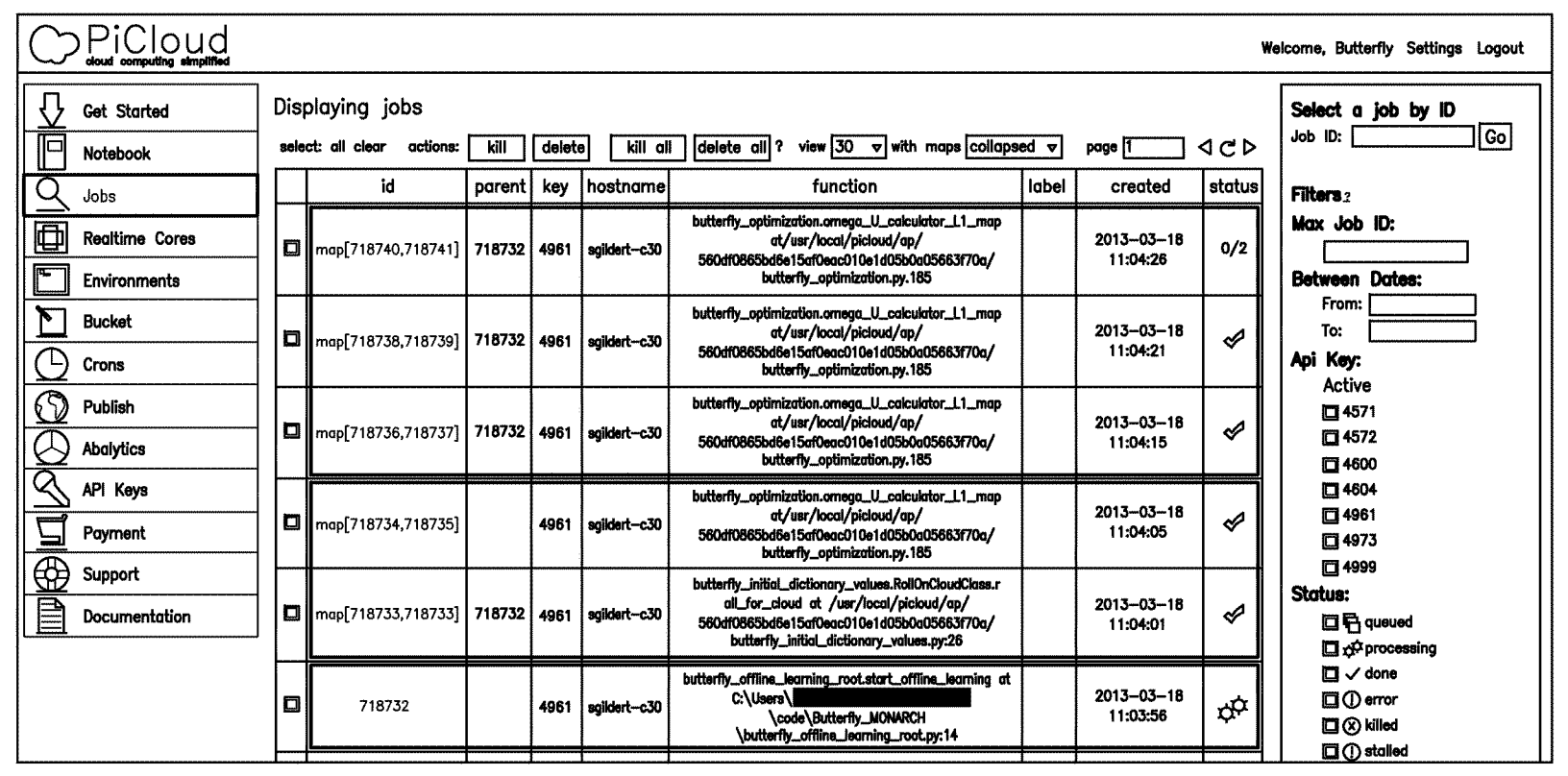

As the cloud jobs continue, the user will see more jobs being spawned. This is illustrated in FIG. 31. The jobs completed will be shown as a fraction of the total number of jobs for each map. The rolls (described earlier) spawn processes separately from the main learning routine. A breakdown of the different types of jobs that are spawned is shown in FIG. 32. Completed jobs are displayed with a tick symbol next to them.

Figure 33:
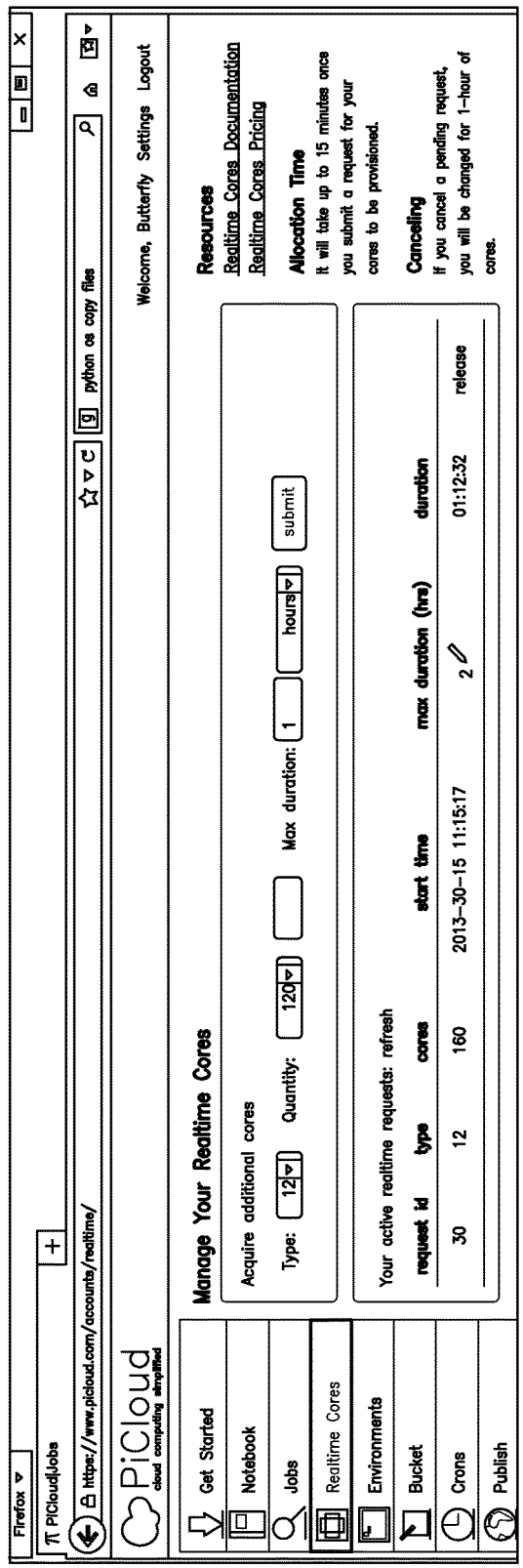
FIG. 33 illustrates an aspect of the associated user interface of the HDL framework, in accordance with at least one embodiment.

If the user is running a large job (e.g., more than 10,000 training images), it is recommended that the user reserve real-time cores for the job to run efficiently. In order to reserve real-time cores, click on the "Realtime cores" tab and select "core type: f2" and then the number of hours for which the user wishes to reserve real-time cores (FIG. 33).

Note: If the user is not sure how long to reserve realtime-cores, the user may reserve them for one hour to test that everything is working properly. It is possible to add more time once the jobs are running. Once the real-time cores are active, run the code in exactly the same way as would be run normally with "use_cloud" set to True. Picloud will automatically detect that the user has real-time cores available and use those preferentially.

One change in modern machine learning is the transition from special purpose tools with narrow applicability—such as spam filters—to architectures that may be able to generalize from one topic to another, like humans do. One of the innovations driving this change is a move toward learning systems that are inherently hierarchical. In these systems, complex concepts are constructed out of simpler concepts. For example, in a computer vision task, it may be useful to be able to re-use simple visual features—such as edges—to represent more complex objects that are formed of edges, but may be semantically quite different (such as human faces and car wheels). These are called deep learning systems.

Sparse coding is a family of related approaches whose objective is to discover ways to represent data concisely. Sparse coding can be used to discover, in an unsupervised setting, special patterns in data that are particularly meaningful. Sparse coding can also be used to find ways to represent, or encode, data in a compressed way. Sparse coding can be naturally used to learn hierarchies of features at multiple scales in data.

Sparse coding algorithms may be run on a conventional computer (i.e., a digital computer), either locally or on a cloud computing system or using a quantum processor. Sparse coding algorithms may be run on any combination of a conventional and/or a quantum processor. Some variants of a sparse coding algorithm implemented according to the present systems and methods include L1-regularized sparse coding, binary sparse coding and binary sparse coding with structured dictionaries.

Binary sparse coding may change the weights in the sparse coding procedure from real numbers to binary. Binary sparse coding with structured dictionaries may constrain the patterns that sparse coding learns in such a way that the binary valued optimization problems generated by the algorithm all have the exact connectivity structure of a given quantum processor. Binary sparse coding may generate fully connected QUBOs and an intervening translator may be used to map these into problems that can be natively solved in quantum hardware. Such translators are described in, for example, PCT Patent Publication 2013-006836. Binary sparse coding with structured dictionaries may modify binary sparse coding such that it only generates problems that can be natively solved by the quantum hardware. Here an advantage is gained by directly using the quantum hardware in its most effective form. The idea is to structure the patterns that sparse coding learns such that many of them are orthogonal.

Sparse coding may be applied to many different types of data. In the discussion presented below, the focus is on image data from three different sources—MNIST, CIFAR-10 and an independently developed natural image dataset. Sparse coding may be applied to many different data types. The focus is on image data in the present disclosure for explanatory purposes, although several other data types (in particular audio and video) may be utilized as well.

Prior to running sparse coding, raw images may be pre-processed. Some non-limiting options for pre-processing the raw images according to the present systems and methods may be:

Option #1—Raw pixel values with brightness and contrast normalization: The mean and standard deviations of the pixel values in each image patch are computed, and the pixel value modified to subtract the mean (brightness normalization) and divide by the standard deviation (contrast normalization). Each of these operations is performed separately on each color channel for RGB images.

Option #2—ZCA Whitening: This option takes data that has undergone brightness and contrast normalization and applies the ZCA whitening operation to it. ZCA whitening decorrelates the pixel values within the data objects, making their covariance matrix equal to the identity matrix. Conceptually, this removal of correlations allows the sparse coding procedure to focus on learning less obvious features within the processed data objects. More information on ZCA is given in Zero phase Component Analysis (ZCA), see Bell and Sejnowski, 1997 "The 'independent components' of natural scenes are edge filters" Vision Research, Vol 37, No. 23, pp. 3327-3338.

Option #3—Dimensionality reduction using PCA: Principal component analysis (PCA), a known mathematical technique. This option determines the principal components of the data (post brightness and contrast normalization) using Singular Value Decomposition. The option then allows a user to select how many of these principal components to keep. This procedure allows a reduction of the dimensionality of the input data vectors, at the cost of being lossy. Although, for images good fidelity can generally be maintained even when a significant fraction of the principal components are thrown away.

Option #4—PCA with Whitening: This option is the same as Option #3, with the addition of a whitening operation that decorrelates the entries of the data objects.

The $j^{th}$ data object $\vec{x}_j$ is an N×1 column vector of real numbers, corresponding to a single image or image patch after the application of one of the preprocessing acts described previously. The total number of data objects used may be defined as S, and concatenate all of these into a single N×S matrix X which may be called the data matrix, whose $j^{th}$ column is $\vec{x}_j$.

The $j^{th}$ dictionary atom $\vec{d}_j$ may be an (initially unknown) N×1 column vector of real numbers. The total number of dictionary atoms may be defied as K, and concatenate all of these into a single N×K matrix D which may be called the dictionary, whose $j^{th}$ column is $\vec{d}_j$.

The $j^{th}$ weight vector $\vec{w}_j$ is an (initially unknown) K×1 column vector, which can consist of either real or binary numbers depending on the sparse coding variant being run. There may be a total of S weight vectors. Concatenate all of these into a single S×K matrix W which may be called the weight matrix, whose $j^{th}$ column may be $\vec{w}_j$.

Lambda (λ) may be a positive real number called the regularization parameter. The larger lambda (λ) is, the fewer dictionary atoms may be involved in the reconstruction of each data object.

The variants of sparse coding previously described may now be further explained.

Variant #1—L1-regularized sparse coding: The first sparse coding variant implemented in using L1-norm regularization. The problem to be solved may be:

$$\text{minimize}_{D,W} \frac{1}{2}\|X - DW\|^2 + \lambda \sum_{i,j} |W_{ij}|$$

subject to $\sum_i D_{i,j}^2 \leq c, \forall j = 1, \ldots, N$

In this case, the weights W are real numbers. "c" is also a real number (e.g., set to c=1 in this implementation). This upper bound on the dictionary size may be used since both dictionary atoms and weights are real numbers, and the regularization term attempts to minimize the size of the weights. Without the upper bound, the optimization would force the weights towards zero while continuing to increase the dictionary magnitude to compensate.

One procedure implemented to solve this minimization problem, and the algorithms for such, is also described in the papery by Honglak Lee et al. discussed above. Algorithm 1 below summarizes the procedure.

Algorithm 1:
1. Select a random initial starting dictionary D.
2. Given that dictionary, find the optimal weights W using the feature-sign search (FSS) algorithm.
3. Given these weights, find the optimal dictionary using the Lagrangian dual.
4. Repeat acts 2-3 until convergence.

This approach of separating the full optimization into an iterative sequence of optimizing over subsets of the problem while holding some of the optimization variables fixed may be called coordinate block descent. All of the sparse coding variants may use this technique. In this case, the original full optimization problem is non-convex, but both acts 2 and 3 in the above approach are convex.

In accordance with the present systems and methods, the user may have the option of running this procedure either locally or on the cloud. In act 2 of the above procedure, there are a total of S independent optimization problems, one for each data object. As the number S can be large (even for the small image sets used here, S~50,000 may be used), these optimizations may be parallelized by using the cloud version. The user may select the number of problems to be sent to a processor core during an iteration.

Variant #2—Binary Sparse Coding:
The second variant may solve the following problem:

$$\text{minimize}_{D,W} \frac{1}{2}\|X - DW\|^2 + \lambda \sum_{i,j} W_{ij}$$

where the weights W are binary. In this case no upper bound on the values of the dictionary is needed, as non-zero weights have magnitudes fixed to be equal to 1. Using binary weights naturally makes the regularization term of the L0 form, penalizing each atom used in a reconstruction by the same amount.

The procedure used to perform the optimization is described in Algorithm 2. This is similar to the procedure used in variant #1. However there are some important differences.

First, the final value of the objective function in this procedure may depend strongly on the initial starting point. The reason for this is may be that, even if each stage of the coordinate block descent procedure is globally optimal, the final result is a local minimum in the joint optimization problem and these local minima can be quite far from the global optimum of the joint problem. While the same could hold for Variant #1, empirically the starting position for Variant #1 may seem to not significantly affect the final outcome.

Because of the dependence on the initial starting point, a number of initial iterations of the procedure from different starting points (act 2) may be run. These may be run in parallel if the cloud option is used. Once these initial descent acts are completed, the best result found to date may be kept, and that result continues the iterative process until convergence.

Algorithm 2:
1. Select a total number of initial starting points, and a search depth P.
2. For each initial starting point:
   a. Select a random initial starting weight matrix W.
   b. Given these weights, find the optimal dictionary using the Lagrangian dual.
   c. Given that dictionary, find the optimal weights W using tabu search.
   d. Repeat acts 2b-2c for P acts.
3. Once act 2 has been completed for each initial starting point:
   a. Select the W, D pair corresponding to the lowest value of the objective function found during the initial phase.
   b. Given these weights, find the optimal dictionary using the Lagrangian dual.
   c. Given that dictionary, find the optimal weights W using tabu search.
   d. Repeat acts 3b-3c until convergence.

The dictionary optimizations in 2b and 3b may be similar to those used in Variant #1.

In acts 2c and 3c, S independent fully connected QUBOs are generated. Conceptually, relatively poor optimization over the weights in the initial descent stage may be accepted as even if a lot of effort may be spent optimizing the answer may get stuck in bad local optima of the joint problem. In fact, in many cases reducing the effort spent in the optimization over the weights in the initial descent may result in better overall optimization.

Variant #3—Binary Sparse Coding with Structured Dictionaries:

The third variant implemented may solve the following problem:

$$\text{minimize}_{D,W} \frac{1}{2}\|X - DW\|^2 + \lambda \sum_{i,j} W_{ij}$$

subject to $\vec{d}_i \cdot \vec{d}_j = 0$ for all pairs i, j $\notin$ G, where G is an adjacency graph representing a user-specified connectivity. The weights W are binary.

These constraints force the optimization problems generated by the algorithm to all have the exact connectivity structure of a given quantum processor. The procedure used to perform the optimization is described in Algorithm 3.

Algorithm 3
1. Select a total number of initial starting points, and a search depth P.
2. For each initial starting point:
   a. Select a random initial starting weight matrix W.
   b. Select a random initial starting dictionary D satisfying the required orthogonality constraints.
   c. Given current weights and dictionary, find the optimal dictionary using Algorithm 4.
   d. Given that dictionary, find the optimal weights W using either tabu search or quantum hardware.
   e. Repeat acts 2c-2d for P acts.
3. Once act 2 has been completed for each initial starting point:
   a. Select the pair W, D corresponding to the lowest value of the objective function found during the initial phase.
   b. Given current weights and dictionary, find the optimal dictionary using Algorithm 4 (see below).
   c. Given that dictionary, find the optimal weights W using either tabu search or quantum hardware.
   d. Repeat acts 3b-3c until convergence.

This is similar to Algorithm 2, with three important differences.

The first is that the dictionary is now constrained. Finding the optimal dictionary (acts 2c and 3b) is now a non-convex optimization problem. While something has been gained by structuring the optimization problems in acts 2d and 3d to match the connectivity of the hardware, as a by-product of this an act has been made which used to be easy into one that is now potentially difficult.

Several strategies were implemented to try to perform this optimization. The implementation according to the present systems and methods is shown in Algorithm 4 (see below).

The second difference is that the dictionary constraints place a lower bound on N, the length of the data vectors being learned over. N may be chosen to be greater than or equal to K, for example, 502 for this algorithm run on a quantum hardware.

In practice, this restriction affects the size of the receptive field that can be chosen (e.g., the receptive field has to be fairly large—for greyscale at least 23×23 pixels and for RGB at least 13×13 pixels), and the amount of dimensionality reduction that can be performed in the preprocessing act.

Algorithm 4
1. Given an initial weight matrix W and dictionary D, perform the following acts:
   a. Optimize D using the Cayley transform.
   b. Optimally rescale each column of D.
   c. For each column of D, find the optimal entries in that column, keeping all other columns fixed.

The third difference is that in acts 2d and 3c, S QUBOs are generated that have the same connectivity structure as the adjacency graph G (which may be set to be the adjacency graph of the quantum processor being used). The user may have the option to solve these using tabu search or using a quantum processor.

Sparse coding can be used to increase performance on classification tasks, by learning representations that allow classification algorithms to better see differences between objects. For image data, the canonical example is the classification of images into categories depending on their semantic content. For MNIST the categories are the ten digits that the images represent. For CIFAR-10 there are also ten categories: airplane, automobile, bird, cat, deer, dog, frog, horse, ship and truck.

In some implementations the present systems and methods use the scikit-learn Python classification package, which include implementations of many classification procedures. The present systems and methods may also implement a semi-supervised inpainting algorithm ("semantic inpainting"), which can be used for classification.

Both MNIST and CIFAR-10 datasets are labeled. Both can therefore be used as part of a pipeline ending in the computation of a classification accuracy. An example pipeline according to the present systems and methods is given as follows:

1. The user chooses a dataset, e.g., MNIST, CIFAR-10, etc.
2. The user chooses preprocessing options, e.g., receptive field, and preprocessing options.
   a. Preprocessing options include: none, brightness and contrast normalization, ZCA whitening, PCA keeping N components to reduce dimensionality, Dimensional reduction plus whitening.
3. The system then computes the data matrix X.
4. The user then selects which sparse coding algorithm and associated hyperparameters to use to learn a dictionary over X.
   a. Options include: L1-regularized sparse coding, Binary sparse coding, Binary sparse coding with structured dictionaries, Binary sparse coding with structured dictionaries running in software, Binary sparse coding with structured dictionaries running in hardware.
   b. Hyperparameters include: tabu parameters, regularization parameter (1), total number of dictionary atoms (K)
5. The system then learns the dictionary over the image patches.
6. The user selects which sparse coding algorithm and associated hyperparameters to use to encode the training or test sets of the chosen dataset using the dictionary.
   a. Options include: L1-regularized sparse coding, Binary sparse coding, Binary sparse coding with structured dictionaries, Binary sparse coding with structured dictionaries running in software, Binary sparse coding with structured dictionaries running in hardware.
   b. Hyperparameters include: tabu parameters, regularization parameter (1), total number of dictionary atoms (K).
7. The system then encodes the training images and in some embodiments the training and test images.
8. The user selects a classification algorithm and its hyperparameters.
   a. Options include: using one of the options for a classifier in the scikit-learn or using an inpainting based classifier.
9. The system learns a classifier over the encoded data.

The system returns the classification and in some embodiments the performance of one or more classifier as well as the classifications.

In the sparse coding component, sparse coding plays two important roles in this pipeline. The first is that it is used to learn a dictionary—a basis for representing image patches. The second is that it is used to encode as yet unseen data, using the previously learned dictionary.

The sparse coding component image encoding procedure:

The sparse coding component allows a user to select an arbitrary receptive field (although note that for the BSD algorithm, the receptive field has to be large enough to generate data objects of dimension at least as large as the number of dictionary atoms). If the receptive field is smaller than the size of the image being classified, then there are many different image patches within the image, and each has an encoding. These encoded image patches may be used to represent the image that they are from. The choice of how to do this affects the quality of the resultant classifier.

Monarch implements an encoding scheme that first asks a user to choose how to segment the images in the dataset. This segmentation "chops" the image into several disjoint regions of the same size. The finest allowed segmentation divides the image into non-overlapping regions of the same size as the receptive field. The coarsest allowed segmentation is the original size of the image. For example, an image may be segmented into four regions.

After this choice is made, each sub-region of the size of the receptive field within each region is encoded using the previously learned dictionary. For example, one such encoding is where a patch is the size of the receptive field. The receptive field is scanned over the entire region with a 1 pixel step (this is a convolution of the encoder with the region).

Once this has been completed, the sparse coding component implements a pooling procedure, which takes all of the vectors from the encodings within each region and maps them into a single vector that then represents the region. There are four options implemented for doing this pooling, which the user can select from. These are:

1. No pooling. In this case, all of the encoded vectors in a region are concatenated.
2. Average pooling. The encoded vector representing the region has real-valued components computed by averaging the components of the sub-region vectors.
3. Max pooling. The encoded vector representing the region has real-valued components corresponding to the largest magnitude values of each of the sub-region vectors.
4. Binary pooling. The encoded vector representing the region has binary components corresponding to the majority values of each of the sub-region vectors.

Note that option 4 above is not available to the L1-regularized variant, whereas options 2 and 3 are not available to the binary variants.

The final encoded representation of the image is obtained by concatenating the vectors from each of the regions. This final encoded representation is then fed into the next act in the pipeline, which applies classification algorithms to it.

Classification Algorithms:

The sparse coding component has access to all of the classification algorithms in the scikit-learn package. In addition an inpainting based classifier has been implemented, which operates in a different way to the scikit-learn classifiers. Described below are the data types that are input into the different classifiers.

Scikit-Learn Classification Inputs:

For all of the classification algorithms in scikit-learn, the input vector representing an image is the vector obtained using the procedure described in the preceding section. The label presented to these algorithms is an integer in the range (0, 9) for both MNIST and CIFAR-10.

The semantic inpainting procedure:

The sparse coding component implements a classification algorithm based on inpainting semantic information. Currently this procedure is enabled only when the receptive field is the size of the entire image, but it may be possible to extend this concept to the case where the receptive field is smaller than the original image.

The procedure works by appending to each image in the training set an image representative of its semantic category, instead of a category label. That is, instead of using a symbolic representation (say the integer 5) to represent the image's category, an actual image representing a canonical version of the image's semantic content is appended to the image. In the sparse coding component, these semantic images are colored squares whose positions represent the category, in similar spirit to a QR code, with white squares used for MNIST and yellow squares for CIFAR-10.

The dictionary learning procedure then learns a dictionary of features over the images in the training set that comprise the original image concatenated with the image representing its semantic content.

Test images are then encoded using the sector of the dictionary learned over the original images, and the sector representing the label sector are inpainted. The images representing semantic content for MNIST and CIFAR-10 in the sparse coding component may have special areas where the pixels are strongly colored for each class (and do not overlap). The inpainted semantic sector can be used as a direct classifier, by looking at the pixel magnitude of each inpainted area corresponding to label categories. In some implementations, the area with the highest pixel magnitude is the predicted label for that test image.

The pixel magnitudes extracted as described above can also form representations which can be used to train a standard scikit-learn classifier model. This is similar to the first classification technique, but using pixel values from the semantic image sector. In this case, a pixel from each "label area" is interrogated to determine its magnitude, and the resulting vector is sent into the classifier as input training data, together with the symbolic representation of the image's category.

These inpainting methods natively support multiple label assignment. However, the above classification methods may behave differently depending upon whether the data has label categories that are mutually exclusive, or whether the data has multiple label categories with correlations between them.

The sparse coding component has five different visualization routines available to the user.

Visualization 1:

The first of these allows the user to see the effects of the preprocessing option used on the input image data. This allows a quick visual check that the choices made in the preprocessing act are sensible given what the user wants to achieve.

Visualization 2:

The second visualization routine allows the user to look at a reasonably large number of the dictionary atoms that have been learned. It also shows reconstructions of the original data using this dictionary, and the originals (ground truths), to gauge by eye how well the reconstruction process is doing. If a dictionary containing semantic image information is chosen, images plus semantic content will be displayed in this figure also. The numbers displayed above the reconstructions denote either the indices of the atoms used (if the numbers are in square parentheses) or the number of atoms used if there are more than 3 atoms per reconstruction (The symbols >># are displayed before the number if this is the case). The average sparsity (number of atoms, on average, used per reconstruction) is also displayed in the plot's title, along with the name of the dictionary file that was used.

Visualization 3:

The third visualization allows the user to take a close look at three of the reconstructions, alongside the original and up to three of the atoms that were used in the reconstruction. The atoms that combine to form the reconstruction are ordered so that the ones with highest absolute magnitude weight are shown in the figure. The index of the atom and the weight are shown above the atoms themselves.

Visualization 4:

The fourth visualization shows the objective function descent during the learning process. This gives the user an idea of how the algorithm is converging upon the best solution. The functional form of the objective function descent can be different for different solvers and data types. This information can be used to determine how fast the objective function descent is converging, to help the user determine whether a more or less aggressive exit threshold is required.

Visualization 5:

The fifth visualization allows the user to visualize the vectors representing the encoded images, sorted by label category. This gives a "fingerprint" of the data. If correlations can be seen with the naked eye, the classifiers should do well.

One objective is to test sparse coding variants run on quantum computing hardware against other alternatives. The sparse coding component's algorithms contain many hyperparameters, whose settings can significantly affect whatever quantity is being measured. In some implementations, the hyperparameters include:

1. Image preprocessing option
2. Number of dictionary atoms
3. Regularization parameter
4. Receptive field size
5. Tabu search parameters
6. Train and test image encoding scheme
7. Classification algorithm The approach to optimizing over these was to do grid searches over each and report the best result found. In all the runs, exactly the same sparse coding algorithms and hyperparameter choices were used for the encoding act as were used in dictionary learning. It was found that larger numbers of dictionary atoms were always better for all the tests performed.

The binary structured dictionaries algorithm was implemented and ran using both the 512 bit quantum computer and tabu search for optimizing over the weights. The following three results were found:

1. For optimizing over the weights, the quantum processor was run in a mode where ten samples were taken per problem instance, with the best one used as the minimizer. This took approximately 55 ms per problem instance. For a typical run using 50,000 data objects, the total time per iteration of the algorithm to solve for the weights, given fixed dictionaries, was approximately 2,750 seconds. The tabu timeout was increased until median optimization quality was similar to that achieved with quantum computer run in this mode, and it was found that a timeout of 800 ms per problem instance gave this performance. While this is a gain of approximately 15× speedup per instance, the tabu search approach is parallelizable. In practice, 100 batches of 500 tabu instances may be run on the cloud, with each batch sent to a different processor core, giving an approximate per iteration runtime of 410 seconds plus the overhead of distributing these jobs. So at a high level exist single thread speedups, but the quantum computer suffers in not supporting parallelization, which can be exploited for sparse coding.

2. For fixed hyperparameter choices, the quality of the result for the Binary Structured Dictionaries (BSD) algorithm was systematically worse than the unconstrained binary sparse coding results. This performance degradation likely arises because of several related issues, including: (a) the constraints on the dictionaries lead to sub-optimal bases, (b) finding an optimal dictionary given fixed weights is a hard non-convex optimization problem where the algorithm used could likely be significantly improved; (c) the orthogonality requirements place a lower bound on the receptive field size, and at least for CIFAR-10, a smaller receptive field size increases classification accuracy (although note that this likely is not an issue with actual natural images—this issue arises because of the tiny size of the CIFAR-10 images).

3. For fixed hyperparameter choices, the overall quality of the classification was systematically better for BSD using the quantum computer than for BSD using tabu search, even after the procedure was implemented to increase the run time of tabu search. The reason for this is not clear, although note that increasing the run time for tabu search to make median performance the same is not the same thing as having equivalent solvers. It is known from benchmarking studies that the performance of the quantum computer on a per-instance basis can be different than competing algorithms—even if the median performance is the same. The quantum computer can provide better minimizers for hard instances, which may be the cause of the performance enhancement. It may be the case that the better optimization provided by the quantum computer may be giving superior encoding performance in the encoding act, and there is evidence from the scientific literature that encoding plays a key role in the performance of classifiers, possibly more important than the dictionary itself.

Classification Accuracy:

The three variants run in software used K=512 dictionary atoms, while the hardware version used K=502 (equal to the number of available qubits on the quantum chip used). These are the best results that could be obtained by varying all the other hyperparameters to maximize classification accuracy on the test set.

Note that it is known that state of the art performance on CIFAR-10 requires many more dictionary atoms than used here—typically on the order of 2,000 are used. The objective of these tests was not to achieve state of the art performance (which would require many more atoms), but to test the relative performance of these algorithms.

Encoding Efficiency:

In the limit where reconstructions are sparse (small numbers of atoms are used in reconstructions), it was found that binary sparse coding systematically requires approximately half the atoms to obtain the same reconstruction error as L1-regularized sparse coding for CIFAR-10, MNIST and the sparse coding component's natural image data sets. This is a substantial improvement in representational power, as not only can less atoms be used to represent an image, the weights are now binary instead of real numbers. If the real-valued weights are represented as eight bit numbers (although note that currently they are stored as 64-bit numbers, although truncating to 8-bit does not harm the reconstruction much), the amount of information required to represent a reconstructed image is approximately reduced from k*8 to (k/2), where k is the number of atoms in the reconstruction. This is an order of magnitude reduction in the amount of information required to obtain the same reconstruction error using these two different approaches.

The BSD algorithms require more atoms than the other variants to get the same reconstruction error for the same image patch size, but gain over the L1 algorithm because of the reduction in bit depth of the encoded vectors.

Resource Consumption:

A dramatic reduction in energy consumption was found for similar end classification performance using BSD in hardware, at the price of significantly increased time and the requirement to have access to a quantum computing system. The reduction in cost for BSD on hardware does not factor in the cost of time on the quantum computing system. These results are encouraging, as there are wins here from using the quantum computing system. It is clear though that to be clearly superior, maturation in terms of lower cost and more processor availability (to reduce wall clock time) may be required.

Applications of Sparse Coding, Run Using Hardware:

Using the BSD algorithm run in hardware, a series of proof of concept (POC) applications were implemented. For all of these, both dictionary learning and encoding were performed exclusively using BSD run on 502 qubits of a quantum processor. Unlike for the tests described in the previous section, systematic comparisons of BSD's performance were not performed on these, and no optimization over hyperparameters specific to these applications was done.

Single Image Super-Resolution:

The sparse coding component's natural image dataset contains 5,000 images, each natively of size 640×480 pixels. One of these was selected. 50,000 randomly sampled image patches of size 40×30 pixels were then selected. A "low definition" version of the image patch was appended to each of these image patches, obtained by applying a blurring transformation to the high definition patches. These composite images are similar to those used in the semantic inpainting classification procedure.

A dictionary was then learned over these composite images. After the dictionary is learned, a low definition version of the image can be reconstructed using the low definition sector of the dictionary, and the high definition sector is inpainted.

Single Image Inpainting and Anomaly Detection:

Inpainting is a capability used in the systems and methods described herein. For this POC, an application for detecting and removing anomalous features from a single image was implemented. As in the previous example, a single image was selected from the sparse coding component's image dataset. Then, a dictionary was learned over 50,000 randomly sampled image patches of size 40×30 pixels from this image.

Then the image was modified, introducing anomalous content. This was done by adding red text to the image, similar in spirit to the known inpainting example that uses an image of a seagull obscured by red text.

The modified image was then reconstructed using the dictionary learned over the original image. As in the previous example, pixel values from overlapping reconstructions are averaged. This reconstruction succeeds at removing some of the anomalous content, as it cannot be reconstructed using the learned dictionary. This procedure can be used for both detection and removal of anomalies—a measure of how anomalous an image is can be obtained by finding the difference between an input image and its reconstruction. This also gives the location of the anomalies in the image.

Image Denoising:

An application that is closely related to anomaly detection and removal is image denoising. In this POC, an image was chosen from the sparse coding component's natural image dataset, and a dictionary was learned over 50,000 randomly sampled patches of size 40×30 pixels. Random noise was added to the image, and the noisy image was reconstructed using the dictionary learned over the original image.

Other Possible Applications:

There are a variety of other possible POCs that could be built using sparse coding on the quantum hardware. These include compression (using the compressed representations that sparse coding provides) and edge detection in images.

The various embodiments described herein provide systems and methods for quantum processing of data, for example imaging data, audio data, etc. In the various embodiments described herein, a digital computer (e.g., classical or digital computer 400) may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing adiabatic quantum computation and/or quantum annealing) to determine a solution to the particular problem and reading out the solution from the quantum processor.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, and foreign patent applications referred to in this specification and/or listed in the Application Data Sheet, including but not limited to U.S. Provisional Patent Application Ser. No. 61/841,129, filed Jun. 28, 2013, and U.S. Provisional Patent Application Ser. No. 61/873,303, filed Sep. 3, 2013 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of using a quantum processor to identify maximally repeating patterns in data via Hierarchical Deep Learning (HDL), the method comprising:
receiving a data set of data elements at a non-quantum processor;
preprocessing the data set of data elements to generate a preprocessed data set;
formulating an objective function based on the preprocessed data set via the non-quantum processor, wherein the objective function includes a loss term to minimize difference between a first representation of the preprocessed data set and a second representation of the preprocessed data set, and includes a regularization term to minimize any complications in the objective function;
casting a first set of weights in the objective function as variables using the non-quantum processor;
setting a first set of values for a dictionary of the objective function using the non-quantum processor, wherein the first set of values for the dictionary is constrained such that the objective function matches a connectivity structure of the quantum processor; and
interacting with the quantum processor, via the non-quantum processor, to minimize the objective function.

2. The method of claim 1 wherein the data set of data elements comprises an image data set of image data elements, and preprocessing the data set of data elements comprises normalizing at least one of a contrast or a brightness of the image data elements of the image data set.

3. The method of claim 2 wherein preprocessing the data set of data elements comprises whitening the normalized image data elements of the image data set.

4. The method of claim 3 wherein whitening the normalized image data elements of the image data set comprises applying zero phase component analysis (ZCA) whitening to the normalized data elements of the image data set.

5. The method of claim 2 wherein preprocessing the data set of data elements comprises reducing a dimensionality of the normalized image data elements of the image data set.

6. The method of claim 5 wherein reducing a dimensionality of the normalized image data elements of the image data set comprises applying principal component analysis (PCA) to the normalized data elements of the image data set.

7. The method of claim 2 wherein preprocessing the data set of data elements comprises reducing a dimensionality of the normalized image data elements of the image data set and whitening the normalized image data elements of the image data set.

8. The method of claim 1 wherein the data set of data elements comprises an image data set of image data elements, the method comprising:
segmenting each of the image data elements into one or more disjoint regions.

9. The method of claim 8, further comprising:
receiving, by the non-quantum processor, a segmentation parameter indicative of a segmentation characteristic, wherein the segmenting each of the image data elements into one or more disjoint regions is at least partially based on the received segmentation parameter.

10. The method of claim 1 wherein formulating an objective function includes formulating the objective function where the regularization term is governed by an L0-norm form.

11. The method of claim 1 wherein formulating an objective function includes formulating the objective function where the regularization term is governed by an L1-norm form.

12. The method of claim 1 wherein the regularization term includes a regularization parameter, and formulating an objective function comprises selecting a value for the regularization parameter to control a sparsity of the objective function.

13. The method of claim 1 wherein receiving a data set of data elements at a non-quantum processor comprises receiving image data and audio data.

14. The method of claim 1 wherein interacting with the quantum processor, via the non-quantum processor, to minimize the objective function comprises:
optimizing the objective function for the first set of values for the weights in the objective function based on the first set of values for the dictionary.

15. The method of claim 14 wherein optimizing the objective function for a first set of values for the weights includes mapping the objective function to a first quadratic unconstrained binary optimization ("QUBO") problem and using the quantum processor to at least approximately minimize the first QUBO problem, wherein using the quantum processor to at least approximately minimize the first QUBO problem includes using the quantum processor to perform at least one of adiabatic quantum computation or quantum annealing.

16. The method of claim 14 wherein interacting with the quantum processor, via the non-quantum processor, to minimize the objective function further comprises optimizing the objective function for a second set of values for the weights based on a second set of values for the dictionary, wherein optimizing the objective function for a second set of values for the weights includes mapping the objective function to a second QUBO problem and using the quantum processor to at least approximately minimize the second QUBO problem.

17. The method of claim 14 wherein interacting with the quantum processor, via the non-quantum processor, to minimize the objective function further comprises optimizing the objective function for a second set of values for the dictionary based on the first set of values for the weights, wherein optimizing the objective function for a second set of values for the dictionary includes using the non-quantum processor to update at least some of the values for the dictionary.

18. The method of claim 17 wherein interacting with the quantum processor, via the non-quantum processor, to minimize the objective function further comprises optimizing the objective function for a third set of values for the dictionary based on the second set of values for the weights, wherein optimizing the objective function for a third set of values for the dictionary includes using the non-quantum processor to update at least some of the values for the dictionary.

19. The method of claim 18, further comprising:
optimizing the objective function for a $t^{th}$ set of values for the weights, where t is an integer greater than 2, based on the third set of values for the dictionary, wherein optimizing the objective function for a $t^{th}$ set of values for the weights includes mapping the objective function to a $t^{th}$ QUBO problem and using the quantum processor to at least approximately minimize the $t^{th}$ QUBO problem; and
optimizing the objective function for a $(t+1)^{th}$ set of values for the dictionary based on the $t^{th}$ set of values for the weights, wherein optimizing the objective function for a $(t+1)^{th}$ set of values for the dictionary includes using the non-quantum processor to update at least some of the values for the dictionary.

20. The method of claim 19, further comprising optimizing the objective function for a $(t+1)^{th}$ set of values for the weights based on the $(t+1)^{th}$ set of values for the dictionary, wherein optimizing the objective function for a $(t+1)^{th}$ set of values for the weights includes mapping the objective function to a (t+1) QUBO problem and using the quantum processor to at least approximately minimize the $(t+1)^{th}$ QUBO problem.

21. The method of claim 19 wherein optimizing the objective function for a $(t+1)^{th}$ set of values for the dictionary based on the $t^{th}$ set of values for the weights and optimizing the objective function for a $(t+1)^{th}$ set of values for the weights based on the $(t+1)^{th}$ set of values for the dictionary are repeated for incremental values t until at least one solution criterion is met.

22. The method of claim 21 wherein the at least one solution criterion includes either convergence of the set of values for the weights or convergence of the set of values for the dictionary.

23. The method of claim 1 wherein minimizing the objective function comprises generating features in a learning problem.

24. The method of claim 23 wherein generating features in a learning problem includes generating features in at least one of: pattern recognition problem, training an artificial neural network problem, and software verification and validation problem.

25. The method of claim 23 wherein generating features in a learning problem includes generating features in at least one of a machine learning problem or an application of artificial intelligence.

26. The method of claim 1 wherein minimizing the objective function includes solving a sparse least squares problem.

27. The method of claim 1 wherein setting a first set of values for the dictionary of the objective function comprises:
generating a matrix of real values wherein each entry of the matrix is a random number between positive one and negative one;
renormalizing each column of the matrix such that a norm for each column is equal to one; and
for each column of the matrix,
computing the null space of the column; and
replacing the column with a column of random entries in the null space basis of the column.

28. The method of claim 1 wherein casting a first set of weights in the objective function as variables using the non-quantum processor comprises casting a first set of weights as Boolean variables using the non-quantum processor.

29. The method of claim 1, further comprising:
incorporating at least one label comprised of at least one label element into the data set, wherein the at least one label is representative of label information which logically identifies a subject represented in the data set at an at least an abstract level or category to which the subject represented in the set of data belongs.

30. The method of claim 29 wherein incorporating at least one label comprises incorporating at least one label representative of label information which logically identifies the subject represented in the data set as at least one of an alphanumeric character, belonging to a defined set of humans, a make and/or model of a vehicle, a defined set of objects, a defined foreign or suspect object, or a type of anatomical feature.

31. The method of claim 29 wherein incorporating at least one label comprises incorporating at least one label representative of label information, and the label information is the same type as the corresponding data element.

32. The method of claim 29 wherein receiving a data set of data elements at a non-quantum processor comprises receiving a data set expressed as image data, and the incorporated at least one label element comprises image data.

33. The method of claim 32 wherein incorporating at least one label comprised of at least one label element into the data set comprises incorporating at least one label comprised of at least one label element, the at least one label element comprises image data, and a spatial position of the label element at least partially encodes the label information.

34. The method of claim 29 wherein formulating an objective function comprises formulating an objective function based on both the data set and the incorporated at least one label.

35. The method of claim 1 wherein receiving a data set of data elements at a non-quantum processor comprises receiving a data set expressed as different types or formats of data.

36. The method of claim 1 wherein the objective function is in the form:

$$G(\hat{W}, \hat{D}; \lambda) = \sum_{s=1}^{S} \left\| \vec{z}_s - \sum_{k=1}^{K} w_{ks} \vec{d}_k \right\|^2 + \lambda \sum_{s=1}^{S} \sum_{k=1}^{K} w_{ks}.$$

* * * * *

UNITED STATES PATENT AND TRADEMARK OFFICE
CERTIFICATE OF CORRECTION

PATENT NO. : 9,727,824 B2
APPLICATION NO. : 14/316372
DATED : August 8, 2017
INVENTOR(S) : Geordie Rose et al.

It is certified that error appears in the above-identified patent and that said Letters Patent is hereby corrected as shown below:

Item (73):
"D-Wave Systems Inc., Burnaby, CA (US)," should read, --D-Wave Systems Inc., Burnaby (CA)--.

Column 76, Line 16:
"includes mapping the objective function to a (t+1) QUBO problem," should read, --includes mapping the objective function to a $(t+1)^{th}$ QUBO problem--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*